US012057774B2

(12) United States Patent
Shkoury et al.

(10) Patent No.: US 12,057,774 B2
(45) Date of Patent: Aug. 6, 2024

(54) METHOD AND APPARATUS TO CONTROL INPUT TO A POWER CONVERTER

(71) Applicant: Solaredge Technologies Ltd., Herzeliya (IL)

(72) Inventors: Roy Shkoury, Rehovot (IL); Gideon Eitan, Haifa (IL); Ohad Gidon, Netanya (IL)

(73) Assignee: Solaredge Technologies Ltd., Herzeliya (IL)

( * ) Notice: Subject to any disclaimer, the term of this patent is extended or adjusted under 35 U.S.C. 154(b) by 47 days.

(21) Appl. No.: 17/567,301

(22) Filed: Jan. 3, 2022

(65) Prior Publication Data

US 2022/0216792 A1    Jul. 7, 2022

Related U.S. Application Data

(60) Provisional application No. 63/221,021, filed on Jul. 13, 2021, provisional application No. 63/133,961, filed on Jan. 5, 2021.

(51) Int. Cl.
*H02M 3/158* (2006.01)
*H02M 1/00* (2007.01)
*H02M 1/32* (2007.01)

(52) U.S. Cl.
CPC ....... *H02M 3/1582* (2013.01); *H02M 1/0058* (2021.05); *H02M 1/327* (2021.05)

(58) Field of Classification Search
CPC ........ H02M 1/32; H02M 1/327; H02M 3/158; H02M 3/1582
See application file for complete search history.

(56) References Cited

U.S. PATENT DOCUMENTS

| | | | | |
|---|---|---|---|---|
| 8,421,400 B1* | 4/2013 | Khanna | ..................... | H02J 7/00 320/101 |
| 11,031,861 B2* | 6/2021 | Adest | ................... | H02H 7/1213 |
| 11,296,650 B2* | 4/2022 | Adest | ....................... | H02J 3/38 |
| 2009/0284998 A1* | 11/2009 | Zhang | ....................... | G05F 1/67 363/55 |
| 2011/0273016 A1* | 11/2011 | Adest | ....................... | G05F 5/00 363/78 |
| 2012/0127764 A1 | 5/2012 | Phadke et al. | | |
| 2014/0145697 A1* | 5/2014 | Manabe | .................. | H02M 1/32 323/283 |
| 2014/0272645 A1 | 9/2014 | McLean et al. | | |

(Continued)

FOREIGN PATENT DOCUMENTS

| | | |
|---|---|---|
| CN | 102868311 A | 1/2013 |
| CN | 108494249 A | 9/2018 |

(Continued)

OTHER PUBLICATIONS

May 30, 2022—EP Search Report—EP App. No. 22150370.9.

(Continued)

*Primary Examiner* — Gustavo A Rosario-Benitez
(74) *Attorney, Agent, or Firm* — Banner & Witcoff, Ltd.

(57) ABSTRACT

Systems, apparatuses, and methods are described for reducing power. The reducing of power may be done to reduce a temperature related to one or more elements of a power system. The reducing of power may depend on the mode of operation of one or more power devices of the power system.

20 Claims, 34 Drawing Sheets

(56) References Cited

U.S. PATENT DOCUMENTS

| | | | | |
|---|---|---|---|---|
| 2014/0313626 A1* | 10/2014 | Wang | ........................ | H02H 9/04 |
| | | | | 361/91.2 |
| 2014/0375131 A1* | 12/2014 | Spanoche | ............. | H02M 7/493 |
| | | | | 323/350 |
| 2015/0288275 A1* | 10/2015 | Jitaru | .................. | H02M 1/4208 |
| | | | | 363/126 |
| 2017/0222542 A1* | 8/2017 | Adest | ...................... | H02H 3/202 |
| 2018/0205374 A1* | 7/2018 | Brinlee | ............. | H02M 3/33592 |
| 2018/0351354 A1* | 12/2018 | Galin | ....................... | H02M 7/42 |
| 2021/0016671 A1* | 1/2021 | Suzuki | .................. | B60L 15/007 |

FOREIGN PATENT DOCUMENTS

| | | | |
|---|---|---|---|
| EP | 3225451 | A1 | 10/2017 |
| EP | 3235670 | A1 | 10/2017 |
| JP | 2016105335 | A | 6/2016 |
| KR | 20170017585 | A | 2/2017 |

OTHER PUBLICATIONS

Nov. 6, 2023—EP Examination Report—EP Application No. 22150370.9.

U. Boeke, "High Efficiency Flyback Converter Technology," 2007 Power Conversion Conference—Nagoya, Japan, May 2007.

\* cited by examiner

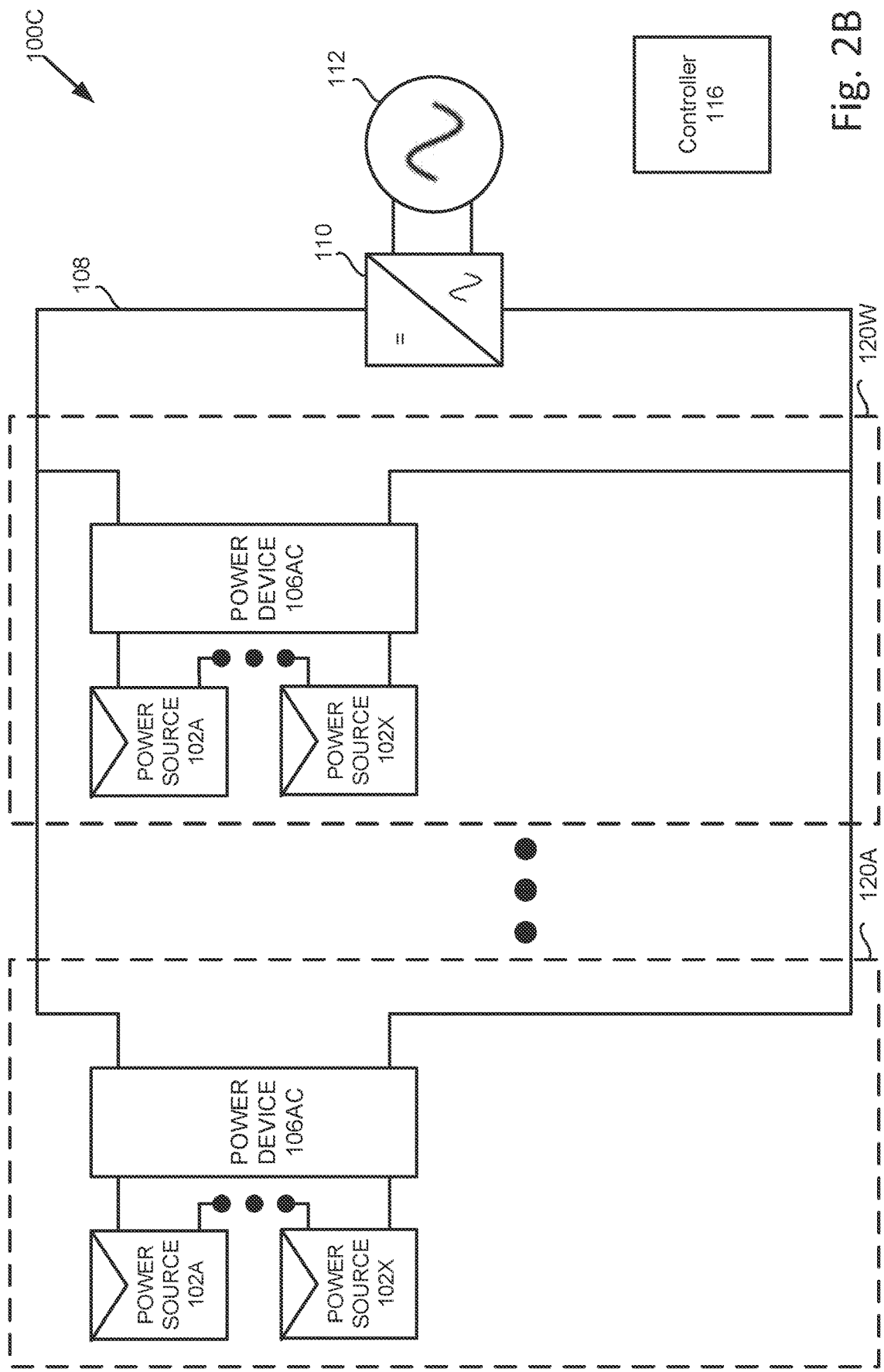

METHOD AND APPARATUS TO CONTROL INPUT TO A POWER CONVERTER

CROSS REFERENCE TO RELATED APPLICATIONS

The present application claims priority to U.S. App. No. 63/221,021, filed Jul. 13, 2021, and U.S. App. No. 63/133,961, filed Jan. 5, 2021, the disclosures of which are incorporated herein by reference in their entirety.

BACKGROUND

A photovoltaic (PV) system is a power system designed to supply solar power by converting sunlight into electricity. PV systems generally include solar panels or "PV modules" (e.g. solar panels or solar shingles). PV modules include a number of solar cells. PV systems are used in commercial and residential applications.

SUMMARY

The following summary presents a simplified summary of certain features. The summary is not an extensive overview and is not intended to identify key or critical elements.

Systems, apparatuses, and methods are described for bypassing or shutting down power devices in a PV system. Bypassing or shutting down the power devices in the PV system may reduce heat in the PV system. Reducing an amount of heat in the PV system may enhance the performance of the PV system and/or extend the lifetime of the components of the PV system. One challenge posed by PV systems is that heat (e.g. from the sun, or from an electrical current flowing through the PV system) may negatively affect the performance of the PV module.

In some examples, the shutdown and/or wakeup after shutdown may be based on the mode of operation of the power device prior to shutdown. For example, if the power device was operating in a buck mode of conversion prior to shutdown then the power device may perform shutdown in a first manner and if the power device was operating in a boost mode of conversion prior to shutdown then the power device may perform shutdown in a second manner. For example, the manner of shutdown may be either shutdown by short circuiting the current (e.g., by short circuiting an input including input terminals of the power device) and reducing the voltage to zero or below zero, or shutdown by open circuiting the voltage (e.g., by open circuiting an input including input terminals of the power device) and reducing the current to zero or below zero.

In some examples, the manner of wakeup may be based on the manner of shutdown. For example, the manner of wakeup may be either wakeup by removing the short circuit of the current (e.g., by opening the short circuit at an input including input terminals of the power device) and increasing the voltage to above zero, or wakeup by removing the open circuit of the voltage (e.g., by closing the open circuit at an input including input terminals of the power device) and increasing the current to above zero. For example, if shutdown was performed by short circuiting the current, then wakeup may be performed by removing the short circuit of the current. If shutdown was performed by open circuiting the voltage, then wakeup may be performed by removing the open circuit of the voltage.

In some examples, the bypass may be performed before the shutdown. This may increase the efficiency of the power device (e.g., by decreasing the losses incurred by the power device), since the bypass mode of operation may incur less losses than a power conversion mode of operation of the power device, and may in turn reduce temperature of the power device.

In some examples, the bypass may be controlled dependent on one or more parameters related to the given power device of the PV system.

In some examples, one or more power device(s) may be configured to change modes of operation. For example, a power converter may be configured to change between a power conversion mode of operation, a bypass mode of operation, a shutdown mode of operation, and a wakeup mode of operation, to help manage reducing an amount of heat of the PV system.

In some examples, actions described herein may be performed by one or more elements of the PV system, for example: one or more power devices, one or more system power devices, one or more controllers, etc.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 2B shows an example power system with a plurality of power devices connected in parallel.

DETAILED DESCRIPTION

Figure 1:
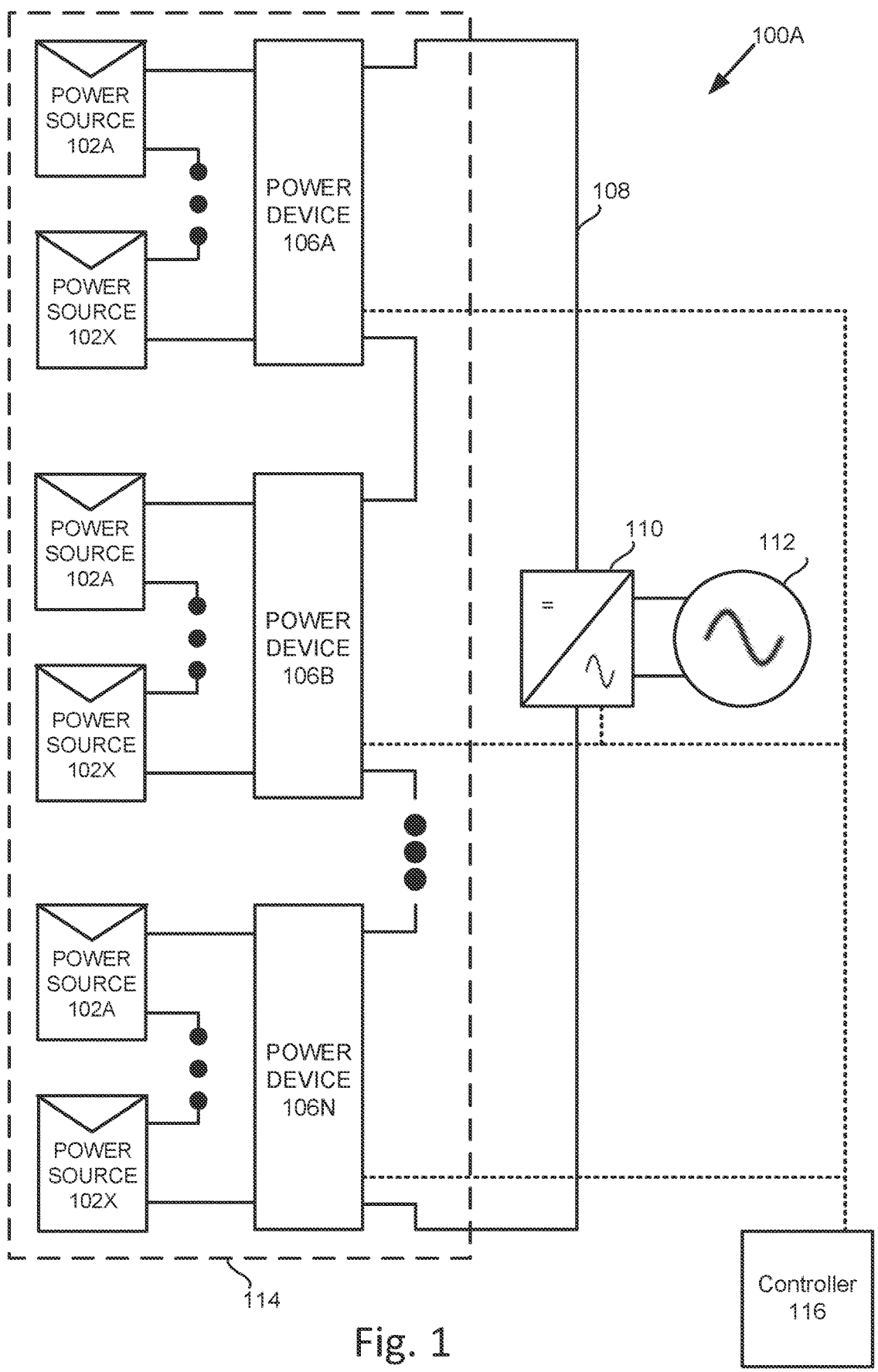
FIG. 1 shows an example power system with a single series string.

The accompanying drawings, which form a part hereof, show examples of the disclosure. It is to be understood that the examples shown in the drawings and/or discussed herein are non-exclusive and that there are other examples of how the disclosure may be practiced.

Systems, apparatuses, and methods are described herein for bypass and shutdown. The shutdown and bypass may be done to reduce a temperature of one or more elements of the power system. Reducing the temperature of the one or more elements of the power system may reduce power losses of the power system and increase efficiency of the power system.

In some examples, the system may include a power device with a power tracking mode of operation and a temperature reduction mode of operation, also referred to herein as a temperature reduction configuration and a power tracking configuration, respectively. In the power tracking configuration the power device may be controlled by an algorithm that tracks a power (for example, a maximum power point tracking [MPPT] algorithm). The temperature reduction mode of operation may include a power reduction mode of operation, a bypass mode of operation, and a shutdown mode of operation, also referred to herein as a power reduction configuration, a bypass configuration, and a shutdown configuration, respectively. The shutdown configuration might not be a complete shutdown of the power device, but may be a standby configuration where power is not converted and/or output and the power device may include a short circuit or an open circuit (e.g., short circuiting input terminals of the power device or open circuiting input terminals of the power device). The power device may also include a wakeup mode of operation, also referred to herein as a wakeup configuration. The power device may have a plurality of conversion modes of operation, also referred to herein as conversion configurations or conversion modes. For example: buck mode, boost mode, buck+boost mode, etc. For example, the power device may use pulse-width modulation (PWM), which controls the conversion by varying ON and OFF times of the converter. The ratio of ON time to the switching period time is the duty cycle. By controlling the duty cycle the power device may control the output relative to the input (e.g., either reduce an input voltage and/or current to a lesser output voltage and/or current, or increase an input voltage and/or current to a greater output voltage and/or current). The power device may also have a bypass mode of operation, also referred to herein as a bypass configuration. The term configuration used herein may also refer to an operational configuration.

The power reduction configuration may be dependent on one or more parameters related to the power device. For example, the power reduction configuration may be dependent on whether a current value related to the power device (e.g., related to an output current of the power device) is above a current threshold. As another example, the power reduction configuration may be dependent on whether a power value related to the power device (e.g., related to an output power of the power device) is below a power threshold. The power threshold may be dependent on one or more other power devices and a total power of the power system (for example, a string power related to a series string of power devices).

For example, when the output current of the power device is above a first threshold then the power device may operate in a bypass configuration. When the output current of the power device is above a second threshold then the power device may operate in a shutdown configuration. Controlling the power device in the bypass configuration and the shutdown configuration may be done to reduce a temperature related to one or more elements of the power device.

In some examples, the power device may change conversion modes while in the temperature reduction configuration. For example, the power device may change between the buck mode of conversion and the boost mode of conversion, and/or vice versa. Both the buck mode of conversion and the boost mode of conversion are power conversion configurations. As another example, the power device may change to a bypass configuration where the input voltage and current of the power device is about equal to the output voltage and current of the power device. The bypass configuration is a non-power conversion configuration. In some examples, the power device may change to a bypass configuration when transitioning between a buck mode and a boost mode, and vice versa. The temperature reduction configuration may also include a shutdown configuration which is also a non-power conversion configuration. For example, the power device may change between the bypass configuration and the shutdown configuration and vice versa. The power device may include a wakeup configuration when changing from the shutdown configuration to a different configuration.

In some examples, the power device may change between the power tracking configuration and the temperature reduction configuration in response to one or more sensed parameters related to a temperature. The temperature may be related to one or more elements of the system, for example: a switch, an inductor, a capacitor, etc. The parameter may be a sensed temperature or another parameter related to temperature. For example, the parameter may be an electrical parameter, such as: current, voltage, power, etc. The parameter may be sensed at an input or an output of the power device or of the element. The parameter may be indicative of a functionality of one or more elements of the system, for example: inductance, capacitance, resistance, etc. For example, the temperature related to a switch, or the temperature related to a circuit board including one or more switches, may be directly measured. The temperature may be directly measured using a temperature sensor (e.g., a thermometer). As mentioned below, the switch may be any appropriate switch (e.g., a transistor, such as, MOSFET, BJT, etc.). As another example, the temperature related to a switch, or the temperature related to a circuit board including one or more switches, may be determined using an approximation function to calculate an approximate temperature.

In some examples, the power device may change between the different configurations of the temperature reduction configuration in response to one or more sensed parameters related to the temperature. For example, in response to a first temperature the power device may operate in a bypass configuration. In response to a second temperature the power device may operate in a shutdown configuration.

In some examples, the temperature of the power device may be reduced. In some examples, the system includes a power device with a temperature reduction mode of operation and a power tracking mode of operation, also referred to herein as a temperature reduction configuration and a power tracking configuration, respectively. The temperature reduction mode of operation may include a power reduction mode of operation, also referred to herein as a power reduction configuration. The power device may have a plurality of conversion modes of operation, also referred to herein as conversion configurations or conversion modes. For example, the plurality of conversion modes may include: buck mode, boost mode, buck+boost mode, etc. The power device may also have a bypass mode of operation, also referred to herein as a bypass configuration. The term configuration used herein may also refer to an operational configuration.

The power reduction configuration may be dependent on the conversion configuration of the power device. For example, the power reduction configuration may be dependent on whether the power device is operating in a buck mode of conversion or in a boost mode of conversion. As an example, when the power device is in the buck mode of conversion, the power reduction configuration may reduce a power at an input of the power device by reducing a voltage at the input of the power device or by increasing a current at the input of the power device. This may increase the efficiency of (e.g., by decreasing the losses incurred by) the power device, since a buck converter may incur losses positively correlated with input voltage, and may in turn reduce temperature of the power device. As another example, when the power device is in the boost mode of conversion, the power reduction configuration may reduce the power at the input of the power device by increasing the voltage at the input of the power device or by reducing the current at the input of the power device. This may increase the efficiency of (e.g., by decreasing the losses incurred by) the power device, since a boost converter may incur losses negatively correlated with input voltage, and may in turn reduce temperature of the power device. It will be appreciated that although only one of the input current or input voltage may be actively controlled (e.g., actively reduced or actively increased), controlling the input voltage may have an effect on the input current, and vice versa. For example, controlling the input voltage by reducing the input voltage may have the effect of increasing the input current, and vice versa. Similarly, controlling the input voltage by increasing the input voltage may have the effect of reducing the input current, and vice versa. Which one of the inputs (e.g., current or voltage) is controlled may be dependent upon the arrangement of the power system. For example, some power systems may have a relatively fixed output current, whereas some power systems may have a relatively fixed output voltage. The fixed output current or the fixed output voltage may be controlled by one or more system power devices or one or more controllers of the power system. In some examples, controlling the input (e.g., current or voltage) of a power device may have a direct effect on the output (e.g., current or voltage) of the power system. For example, controlling an input current (e.g., by reducing or increasing) of the power device may affect an output current (e.g., by reducing or increasing) of the system. Controlling an input voltage (e.g., by reducing or increasing) of the power device may affect an output voltage (e.g., by reducing or increasing) of the power system.

In some examples, the power device may change conversion modes while in the temperature reduction configuration. For example, the power device may change between the buck mode of conversion and the boost mode of conversion and vice versa. As another example, the power device may change to a bypass mode of operation where the input of the power device may be about equal to the output of the power device. In some examples, the power device may change to a bypass mode of operation when transitioning between a buck mode and a boost mode, and vice versa.

In some examples, the power device may change between the temperature reduction configuration and the power tracking configuration in response to one or more sensed parameters related to a temperature. The temperature may be related to one or more elements of the system, for example: a switch, an inductor, a capacitor, etc. The parameter may be a sensed temperature value or another parameter related to temperature. For example, the parameter may be an electrical value or electrical parameter, such as: current, voltage, power, etc. The parameter may be sensed at an input or an output of the power device or of the element.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, power source 102A and power source 102X, which are shown as separate units (shown, for example, in FIG. 1), may have their functionalities and/or components combined into a single unit.

It is also noted that the teachings of the presently disclosed subject matter are not bound by the flow charts shown in the figures, and the shown operations may occur out of the shown order. For example, operations that are shown in succession may be executed substantially concurrently or in reverse order. It is also noted that while the flow charts are described with reference to elements shown herein, this is by no means binding, and the operations may be performed by elements other than those described herein.

It is also noted that like references in the various figures may refer to like elements throughout the application. Similar reference numbers may also connote similarities between elements. For example, it is to be understood that power device 106A shown in FIG. 1 may be similar to, or the same as, other power devices described and shown herein, and vice versa. Throughout the application certain general references may be used to refer to any of the specific related elements. For example, power source 102 may refer to any of the various power sources, power device 106 may refer to any of the various power devices, power system 100 may refer to any of the various power systems, etc.

It is also noted that all numerical values given in the examples of the description are provided for purposes of example only and are by no means binding.

The terms "substantially" and "about" are used herein to indicate variations that are equivalent for an intended purpose or function (e.g., within a permissible variation range). Certain values or ranges of values are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides a substantial equivalent of the specifically recited number.

The term "controller" used herein may include a computer and/or other appropriate processing circuitry and memory. The terms "computer" or "processor" or variations thereof should be expansively construed to cover any kind of hardware-based electronic device with data processing capabilities including, by way of non-limiting example, a digital processing device (e.g., digital signal processor (DSP), microcontroller, field programmable circuit, application-specific integrated circuit (ASIC), etc.), a device which comprises or is operatively connected to one or more processing devices, and/or an analog circuit implementing control logic. The terms "memory" or "data storage device" used herein should be expansively construed to cover any volatile or non-volatile computer memory suitable to the presently disclosed subject matter. The above may include, by way of non-limiting example, the one or more controllers 116 disclosed in the present application.

Figure 2A:
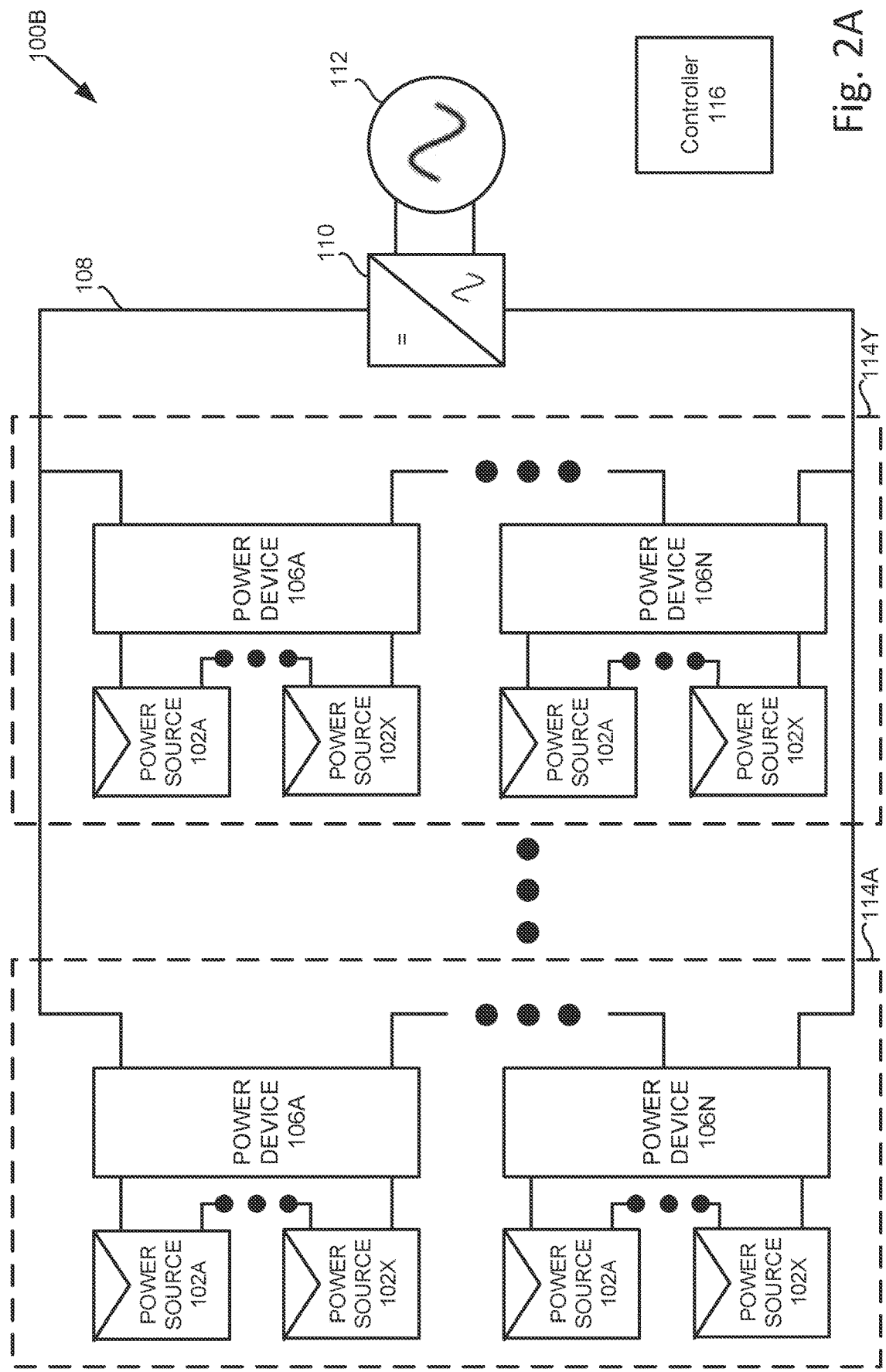
FIG. 2A shows an example power system with a plurality of series strings.

FIG. 1, FIG. 2A, and FIG. 2B show examples of various power systems 100 with power devices 106 according to examples of the present subject matter.

Reference is now made to FIG. 1, which shows a power system 100A according to examples of the present subject matter. Power system 100A may include a plurality of power devices 106A, 106B . . . 106N, where N is any appropriate number. The term "appropriate" as used here may include variations that are within a permissible range of variations such that they provide an equivalent purpose or function. For example, 106N may refer to 1, 3, 5, 15, or 40 additional power devices beyond power devices 106A and 106B.

Power devices 106A, 106B . . . 106N are also referred to herein as "power devices 106", and a respective device of power devices 106 is also referred to herein as "power device 106". Each power device 106 may be connected to one or more power sources 102A . . . 102X, where X is any appropriate number. Each power device (e.g., power device 106A, power device 106B . . . ) may have a different number of attached power sources 102A . . . 102X. The one or more power sources 102A . . . 102X are also referred to herein as "power sources 102", and a respective power source of power sources 102 is also referred to herein as "power source 102". In some examples, a single power source 102 may be connected to a respective single power device 106.

As an example, power system 100A may be a photovoltaic (PV) power system, and power sources 102 may be PV generators. For example, power sources 102 may be one or more photovoltaic cells, strings of substrings of photovoltaic cells, or one or more photovoltaic panels, or strings of photovoltaic panels. Although power sources are described herein in the context of PV generators, it will be appreciated that the term power source may include other types of appropriate power sources, such as wind turbines, hydro-turbines, fuel cells, or batteries.

When the one or more power sources 102A . . . 102X connected to a particular power device 106 are a plurality of power sources 102, then the plurality of power sources 102 may be connected to the respective power device 106 in series, parallel, or any other suitable arrangement with respect to each other. Each power device 106 may include a plurality of terminals configured to connect the power sources 102 to the power device 106.

The power devices 106 may include one or more converters. For example, the power devices 106 may include one or more DC to DC converters. The one or more converters may include, for example, one or more: buck converters, boost converters, buck/boost converters, buck+boost converters, flyback converters, etc.

The power devices 106 may be configured to operate in one or more of the different modes of operation in response to one or more obtained signals, or in response to one or more determinations made based on one or more obtained parameters. The one or more signals may be received from one or more controllers 116, described in further detail below. The one or more parameters may be sensed by one or more sensors or determined by one or more of the controllers 116. The different modes of operation may include the modes of operation listed above and described in detail below. For example, the different modes of operation may include: a temperature reduction mode of operation, a power tracking mode of operation, a power reduction mode of operation, a plurality of conversion modes of operation (e.g., a buck mode, a boost mode, a buck boost mode, etc.), a bypass mode of operation, etc.

The power devices 106 may be connected to one or more system power devices 110. The power devices 106 may be connected to one another in series or in parallel. For example, the power devices 106 may be connected to one another at their outputs, with at least one output terminal of a first power device being connected to at least one other output terminal of a second power device. The power devices 106 are shown in FIG. 1 as being connected in a series connection forming a series string 114 of power devices. However, other system arrangements are possible. For example, power devices 106 may be connected in parallel (e.g., a plurality of positive outputs of the power devices 106 may be connected, and a plurality of negative outputs of the power devices 106 may be connected). Series string 114 may be connected to the one or more system power devices 110 (e.g., at one or more outputs) via a bus 108 (e.g., a DC bus). DC bus 108 may have a high side connected to the positive input of system power device 110, and a low side connected to the negative input of system power device 110. In the example of FIG. 1, power device 106A may be connected to the high side of DC bus 108 at the "top" of series string 114. Power device 106N may be connected to the low side of DC bus 108 at the "bottom" of series string 114. Each of the power devices 106A . . . 106N of the series string 114 may have a similar output current. The output current of the plurality of power devices 106A . . . 106N may be controlled by the one or more system power devices 110 or one or more controllers 116.

The one or more system power devices 110 may be, for example, one or more: DC to DC converters (e.g., buck converters, boost converters, buck/boost converters, buck+ boost converters, etc.), DC to AC converters (also referred to as inverters), combiner and/or monitoring boxes, etc. The one or more system power devices 110 may be an inverter for one or more phases (e.g., one phase inverter, two phase inverter, three phase inverter, etc.), or may include lines or phases that are not shown herein for the sake of simplicity.

The one or more system power devices 110 may be connected to one or more loads 112. The one or more loads 112 may include, for example, one or more: electrical grids (e.g., AC electrical grid), storage devices (e.g., batteries), resistive devices (e.g., resistors), AC devices (e.g., motors), etc.

Power system 100A may include one or more controllers 116. The one or more controllers 116 may be configured to transmit and receive one or more signals. The one or more signals may be transmitted/received between different controllers 116, or between one or more controllers 116 and one or more other elements of power system 100A. The one or more signals may include one or more instructions related to power conversion. The one or more instructions may instruct the power devices 106, and/or the one or more system power devices 110, to perform functionality consistent with the methods and systems described herein. One or more of the controllers 116 may be designated as a master controller. In some instances, one or more of the power devices 106 may comprise one or more internal controllers 116 (which may replace, or supplement, one or more external controllers 116), and one or more of those internal controllers 116 may be designated as the master controller. For simplicity, FIG. 1 shows controller 116 as a central controller external to power devices 106 and the one or more system power devices 110. However, further to the above, it should be understood that any appropriate number of controllers 116 may exist, and one or more of the one or more controllers 116 may be fully or partially implemented in one or more power devices 106.

The one or more controllers 116 may include processing circuits and memory. The one or more controllers 116 may be configured to access data and make determinations.

One or more sensors may be configured to obtain one or more parameters and/or parameter data related to power system 100A. For example, the one or more sensors may be configured to detect a physical phenomenon and determine a digital value or parameter representing the intensity of the phenomenon. The value or parameter may be transmitted to one or more controllers 116. In some examples, the value or parameter may be further processed (e.g., into processed data). The value or parameter may be an electrical value or electrical parameter, such as a: current, voltage, power, temperature, irradiance, etc.

As mentioned above, the one or more controllers 116 of power system 100A may be configured to transmit or receive instructions (e.g., as signals) to or from one or more other elements of the power system. In some examples, power devices 106, system power devices 110, and/or one or more sensors may be communicatively and/or operably connected to the one or more controllers 116. These connections are shown in FIG. 1 as dashed lines. For example, the one or more sensors may provide data to the one or more controllers 116. Further, controllers 116 may be connected to any other component of power system 100A, such as the system power devices 110, load 112, power sources 102, etc.

As an example, the one or more controllers 116 of power system 100A may include and/or be coupled to one or more communication units. The one or more communication units may be configured to transmit or receive one or more communication signals related to a mode of operation of the power device 106. For example, one or more communication units may be included in the power device 106 operating in a bypass mode of operation or a shutdown mode of operation. A communication signal that the power device 106 is operating in the bypass mode of operation may also be referred to herein as a bypass signal. A communication signal that the power device 106 is operating in the shutdown mode of operation may also be referred to herein as a shutdown signal. The one or more communication units may be configured to communicate using any appropriate communication methods and devices, for example: wired communication such as Power Line Communication (PLC) or over a dedicated communication wire, or wireless communication such as ZIGBEE™, Bluetooth™, Wi-Fi, etc.

FIG. 2A shows a power system 100B according to examples of the present subject matter. Power system 100B may be similar to other power systems 100 shown and described herein. For example, power system 100B may comprise the same components as power system 100A, wherein one or more additional series strings of power devices 106 are connected in parallel. Series strings 114A . . . 114Y of power devices 106 may be connected in parallel via the bus 108. Y may be any appropriate number. The plurality of series strings 114A . . . 114Y may be connected to the one or more system power devices 110 via the bus 108. Each series string 114A . . . 114Y may include one or more power devices 106A . . . 106N that have one or more power sources 102A . . . 102X, connected to them. N may be a different number for each set of power devices 106A . . . 106N. X may be a different number for each set of power sources 102A . . . 102X.

FIG. 2B shows a power system 100C according to examples of the present subject matter.

Power system 100C may be similar to other power systems 100 shown and described herein. For example, power system 100C may comprise similar components as power system 100A or power system 100B. In power system 100C a plurality of arrangements 120A . . . 120W of a single power device 106AC are connected in parallel. The plurality of arrangements 120A . . . 120W of a single power devices 106AC may be connected in parallel to each other via the bus 108. W may be any appropriate number. The plurality of arrangements 120A . . . 120W may be connected to the one or more system power devices 110 via the bus 108. Each arrangement 120A . . . 120W includes a single power devices 106AC that has one or more power sources 102A . . . 102X, connected to them.

X may be a different number for each set of power sources 102A . . . 102X. Each arrangement 120A . . . 120W may have a similar output voltage. The output voltage of the plurality of arrangements 120A . . . 120W may be controlled by the one or more system power devices 110 or the one or more controllers 116. In power system 100C, the power devices 106AC may operate mainly in a boost mode of operation, but may be buck+boost converters that may have their inputs controlled depending on the mode of operation of the power device 106AC.

Figure 3A:
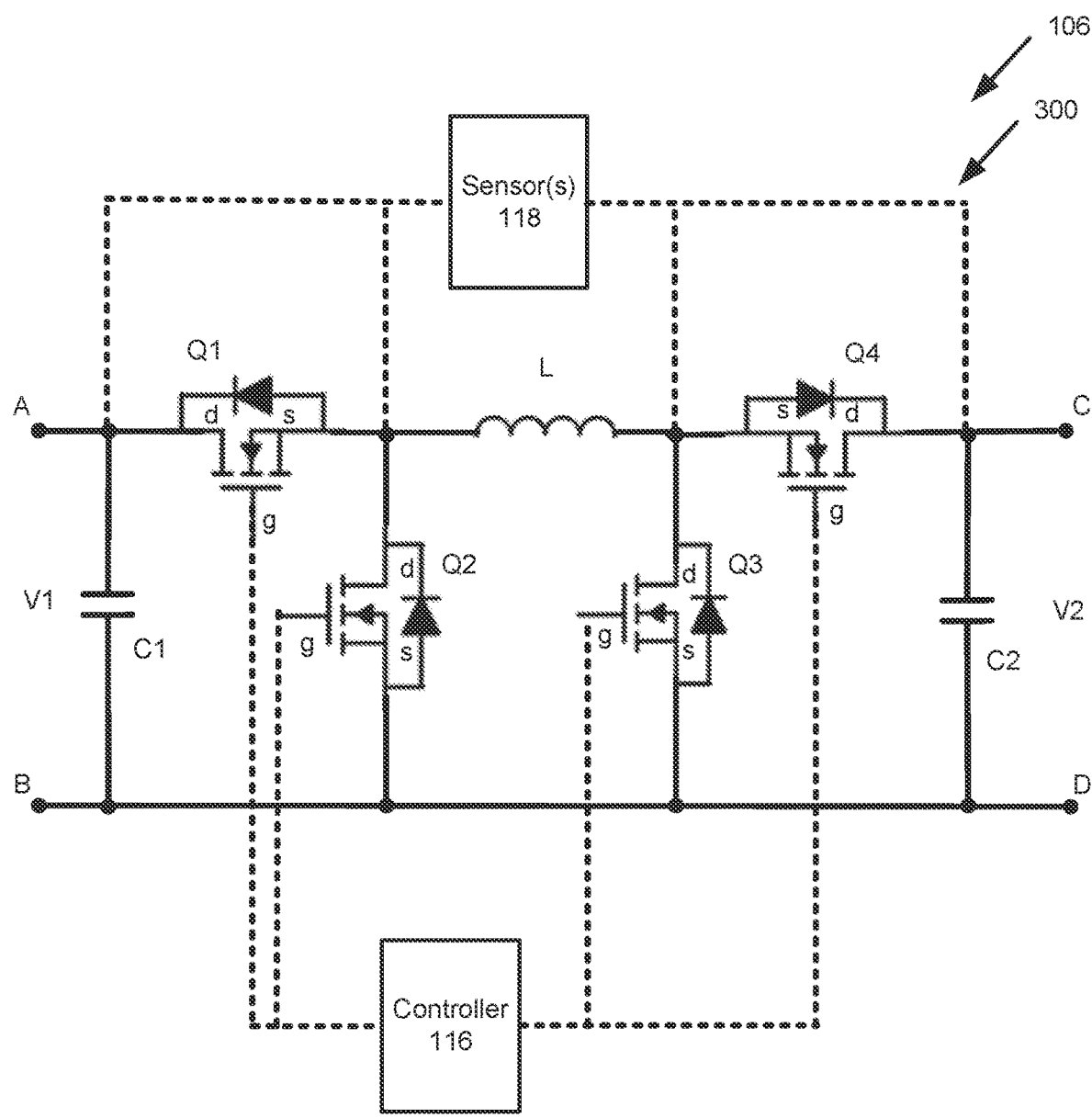
FIG. 3A shows an example power device.
Figure 3B:
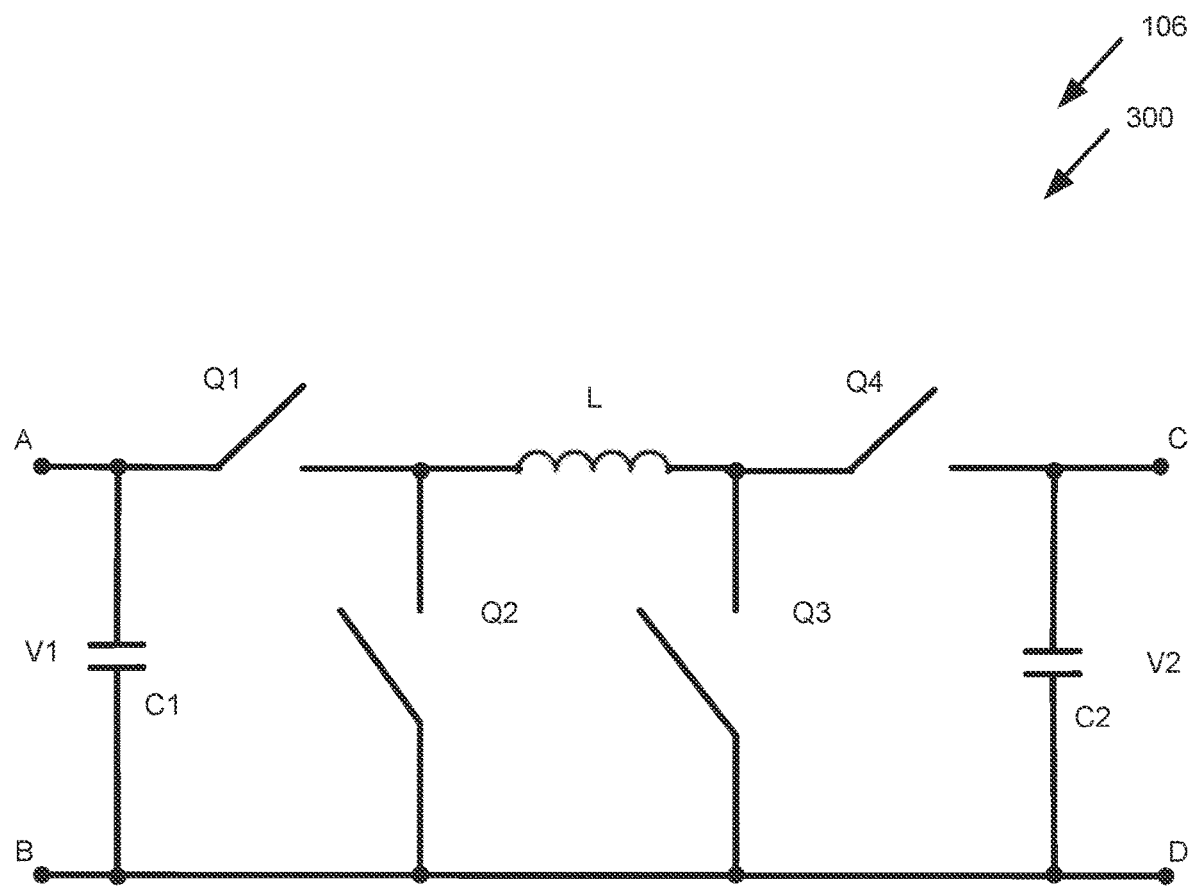
FIG. 3B shows an example power device with generalized switches.
Figure 3C:
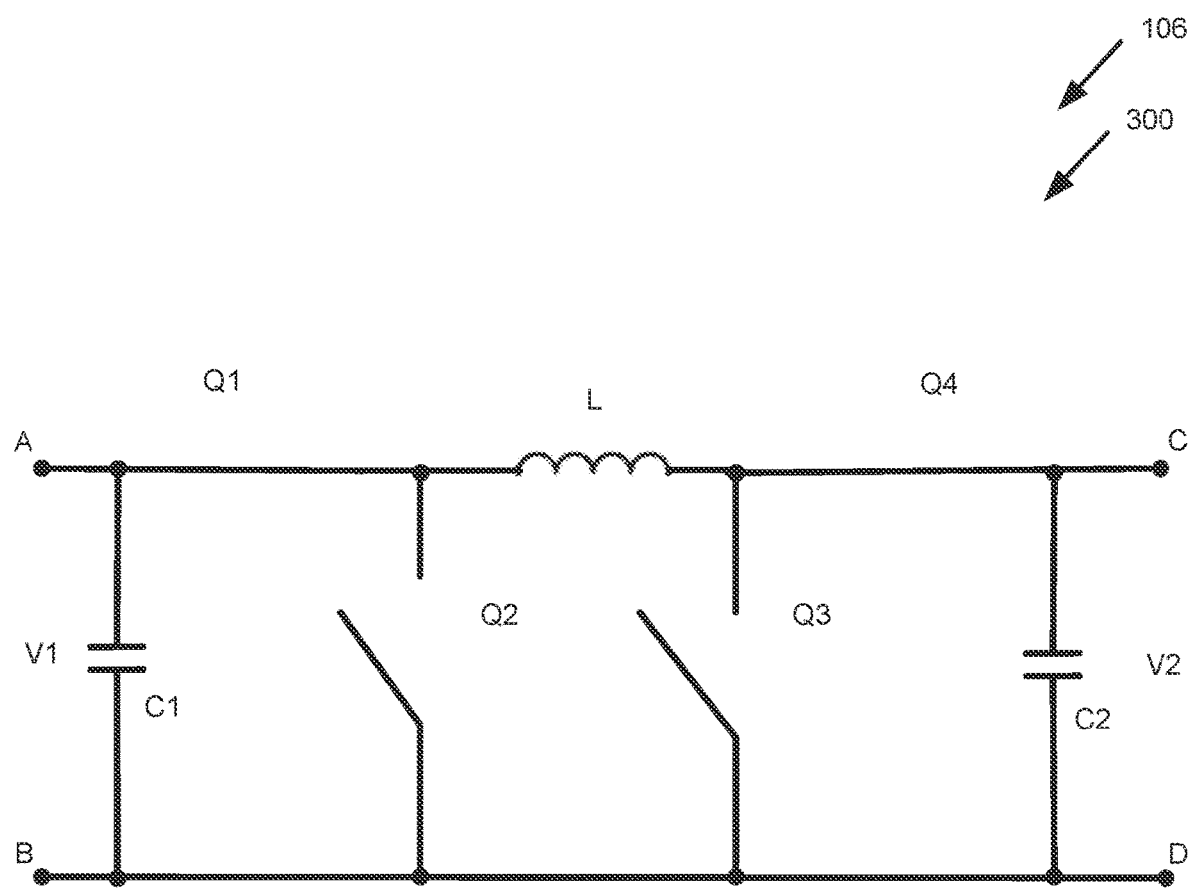
FIG. 3C shows an example power device in a bypass mode of operation.

FIGS. 3A to 3C show examples of power devices 106 that may be part of a power system 100 according to examples of the present subject matter.

With reference to FIG. 3A, in some examples, power device 106 may be a power converter, such as a buck+boost converter 300, or some other power convertor. Power device 106 may be a buck+boost converter 300 receiving input power on a first plurality of terminals. The first plurality of terminals may be a pair of terminals A and B which may receive an input voltage V1 from power source 102. Power device 106 converts voltage V1 to a second output voltage V2 across a second plurality of terminals. The second plurality of terminals may be a pair of terminals C and D.

The buck+boost converter 300 (also known as a four-switch buck-boost converter, or a cascaded buck-boost converter) may be a buck (step-down) converter combined with a boost (step-up) converter. The buck+boost converter 300 may operate in a buck mode, or a boost mode, or, in some cases, in a combined buck-boost mode. The second voltage V2 may be of the same polarity as the first voltage V1. The second voltage V2 may have a voltage value that is either lesser or greater than the first voltage V1. The buck+boost converter may use a single inductor L which is used for both the buck mode and the boost mode. The buck+boost converter 300 may also operate in a bypass mode where the second voltage V2 may be substantially equal to the first voltage V1.

In the buck+boost implementation of the power device 106, the first voltage V1 may be applied across the first pair of terminals A and B. The drain (d) of switch Q1 may connect to terminal A and/or a first terminal of capacitor C1. Terminal B may connect to a second terminal of capacitor C1, the source (s) of switch Q2, the source (s) of switch Q3, a first terminal of capacitor C2, and/or to terminal D. The drain (d) of switch Q2 may connect to the source (s) of switch Q1 and/or a first terminal of inductor L. A second terminal of inductor L may connect to the drain (d) of switch Q3 and/or to the source (s) of switch Q4. The drain of switch Q4 may be connected to a second terminal of capacitor C2, and/or terminal C.

Switches Q1-Q4 may be active switches (e.g., MOSFETs where switch Q2 is controlled to be ON when switch Q1 is OFF, and switch Q3 is controlled to be ON when switch Q4 is OFF, etc.), relays, and/or the like. Switches Q1-Q4 may be, for example: a field effect transistor (FET), a metal-oxide-semiconductor field-effect transistor (MOSFET), a bipolar junction transistor (BJT), an insulated-gate bipolar transistor (IGBT), a silicon carbide (SiC) switch, a gallium nitride (GaN) switch, etc. In some examples, switches Q2 and Q4 may be replaced with diodes corresponding to the parasitic diodes shown as part of switches Q2 and Q4.

In some examples, the buck+boost converter 300 may include or be connected to one or more controllers 116. The one or more controllers 116 may be connected to the gates of the switches Q1-Q4. The controller 116 may control the operational configuration of the power device 106. As an example, the controller 116 may control the duty cycle of the switches Q1-Q4 which may determine the conversion mode of the power device 106. Controller 116 may also change the power device 116 from a power tracking configuration to a power reduction configuration, and vice versa.

In some examples, the buck+boost converter 300 may include or be connected to one or more sensors 118. The one or more sensors 118 may be configured to sense a parameter related to a temperature of one or more elements of the power device 106. In some examples, the one or more sensors 118 may be connected to the controller 116. The one or more sensors may be or include any appropriate sensor, for example: a temperature sensor, a current sensor, a voltage sensor, etc.

With reference to FIG. 3B, buck+boost converter 300 is shown with switches Q1-Q4 depicted as generalized switches. This depiction will help show the bypass mode of operation of the power device 106 that is shown in FIG. 3C.

With reference to FIG. 3C, the buck+boost converter 300 of power device 106 is shown in the bypass mode of operation. In the bypass mode of operation, the high side buck switch Q1 and the high side boost switch Q4 may both be turned ON. The low side buck switch Q2 and the low side boost switch Q3 may both be turned OFF. In the bypass mode of operation the input terminal A may be connected to the output terminal C via the inductor L. The input terminal B may be directly connected to the output terminal D.

The term "high side switches" may refer to the switches Q1 and Q4 that are connected between input terminal A and output terminal C. The term "low side switches" may refer to the switches Q2 and Q3 that have a terminal connected to input terminal B and output terminal D. Other arrangements may also be possible. For example, an "upside down converter" may be where the input terminal A is connected directly to the output terminal C, and the input terminal B may be connected to the output terminal D via one or more switches.

Figure 4A:
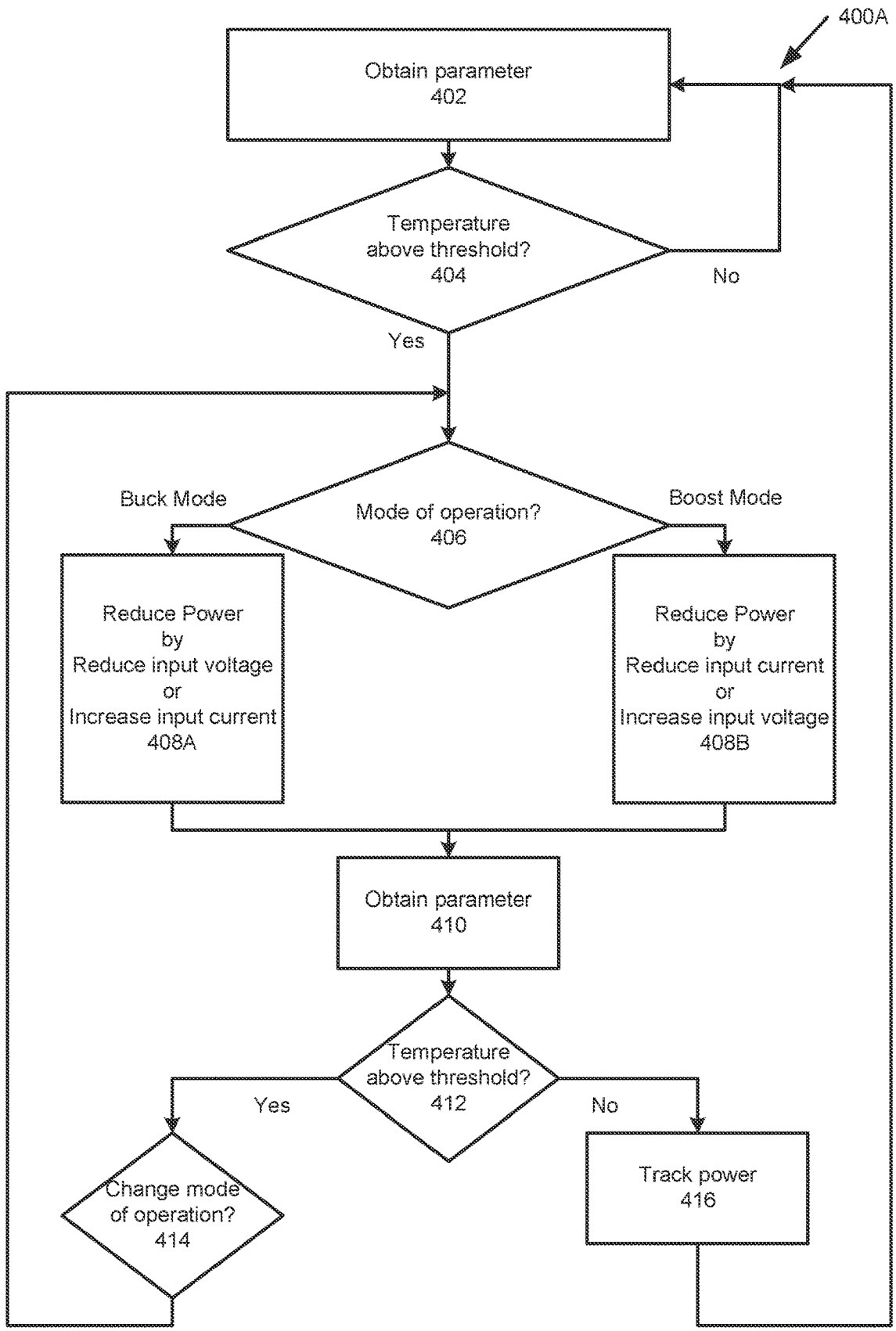
FIG. 4A shows an example flow chart of a method.

FIG. 4A shows an example flow chart 400A of a method for reducing power.

In step 402, a parameter may be obtained. This step may be performed using one or more power devices 106 and/or one or more controllers 116 of the power system 100. The parameter may be dependent on a temperature (such as, related to or indicating a temperature) of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into processed data). The value or parameter may be an electrical value or electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106.

In step 404, a decision may be made whether the parameter indicates a temperature value above a threshold. This step may be performed using one or more power devices 106 and/or one or more controllers 116 of the power system 100. As an example, the parameter may be a temperature value related to or indicative of a temperature of a switch Q of the power device 106 and the temperature value may be above a threshold. As another example, the parameter may be an electrical value related to or indicative of a current at an output of the inductor and the value of the current may indicate that a temperature or a temperature value related to the inductor is above a threshold. The temperature value being above the threshold may negatively affect the performance of the power device, or element of the power device (e.g., inductor).

If in step 404 the decision is that the temperature value is not above the threshold, then the process 400A may return to step 402.

If in step 404 the decision is that the temperature value is above the threshold, then the process 400A may proceed to step 406.

In step 406, a decision may be made regarding which mode of operation the power device is operating in. This step may be performed using one or more power devices 106 and/or one or more controllers 116 of the power system 100. For example, the decision may be whether the power device is operating in a buck mode of conversion or a boost mode of conversion.

If in step 406 the decision is that the power device is operating in a buck mode of conversion, then the process 400A may proceed to step 408A.

If in step 406 the decision is that the power device is operating in a boost mode of conversion, then the process 400A may proceed to step 408B.

In step 408A, power may be reduced according to the mode of operation of the power device. This step may be performed using one or more power devices 106 and/or one or more controllers 116 of the power system 100. Reducing the power maybe done to reduce the temperature of one or more elements of the power device in a relatively smooth and gradual manner over a period of time. For example, in step 408A the power may be reduced by reducing a voltage at an input of the power device or by increasing a current at the input of the power device. Reducing the voltage at the input of the power device or increasing the current at the input of the power device may reduce a power at the input of the power device. Reducing the power at the input of the power device may reduce a temperature of one or more elements of the power device.

In step 408B, power may be reduced according to the mode of operation of the power device. This step may be performed using one or more power devices 106 and/or one or more controllers 116 of the power system 100. Reducing the power maybe done to reduce the temperature of one or more elements of the power device in a relative smooth and gradual manner over a period of time. For example, in step 408B the power may be reduced by reducing a current at an input of the power device or by increasing a voltage at the input of the power device. Reducing the current at the input of the power device or increasing the voltage at the input of the power device may reduce a power at the input of the power device. Reducing the power at the input of the power device may reduce a temperature of one or more elements of the power device.

In step 410, a parameter may be obtained. This step may be performed using one or more power devices 106 and/or one or more controllers 116 of the power system 100. This step may be similar to what was described above with relation to step 402.

In step 412, a decision may be made whether the parameter indicates a temperature value above the threshold. This step may be performed using one or more power devices 106 and/or one or more controllers 116 of the power system 100. This step may be similar to what was described above with relation to step 404.

If in step 412 the decision is that the temperature value is above the threshold, then the process 400A may proceed to step 414.

If in step 412 the decision is that the temperature value is not above the threshold, then the process 400A may proceed to step 416.

In step 414, a decision may be made whether the mode of operation of the power device should be changed. This step may be performed using one or more power devices 106 and/or one or more controllers 116 of the power system 100. As an example, if there is a decrease in output current such that the input current is greater than the output current, then the power device may switch from a buck mode of conversion to a boost mode of conversion. In the buck mode of conversion, the input voltage may be greater than the output voltage, whereas in the boost mode of conversion the output voltage may be greater than the input voltage. In some examples, the power device may change to the boost mode of operation by first changing to a bypass mode of operation and then changing to the boost mode of operation. In some examples, the output current may be the string current of a plurality of power devices connected in series. In some examples, the system power device 112 and/or one or more controllers 116 of the power system 100 may control the output current. The process may then return to step 406.

As mentioned above, if in step 412 the decision is that the temperature value is not above the threshold, then the process 400A may proceed to step 416.

In step 416, the power device may be changed from a power reduction configuration to a power tracking configuration. This step may be performed using one or more power devices 106 and/or one or more controllers 116 of the power system 100. For example, if the temperature or temperature value of the one or more elements of the power device are no longer above the threshold, then the power device may return to a power tracking configuration where the power converter may be controlled by an algorithm that tracks a power (for example, a maximum power point tracking [MPPT] algorithm). In some examples, if the temperature or temperature value is not reduced by the process 400A, but rather exceeds an even greater threshold, then the power device may take steps to shut down the power device in order to reduce the temperature of one or more elements of the power device.

After step 416 the process 400A may begin again at step 402.

Figure 4B:
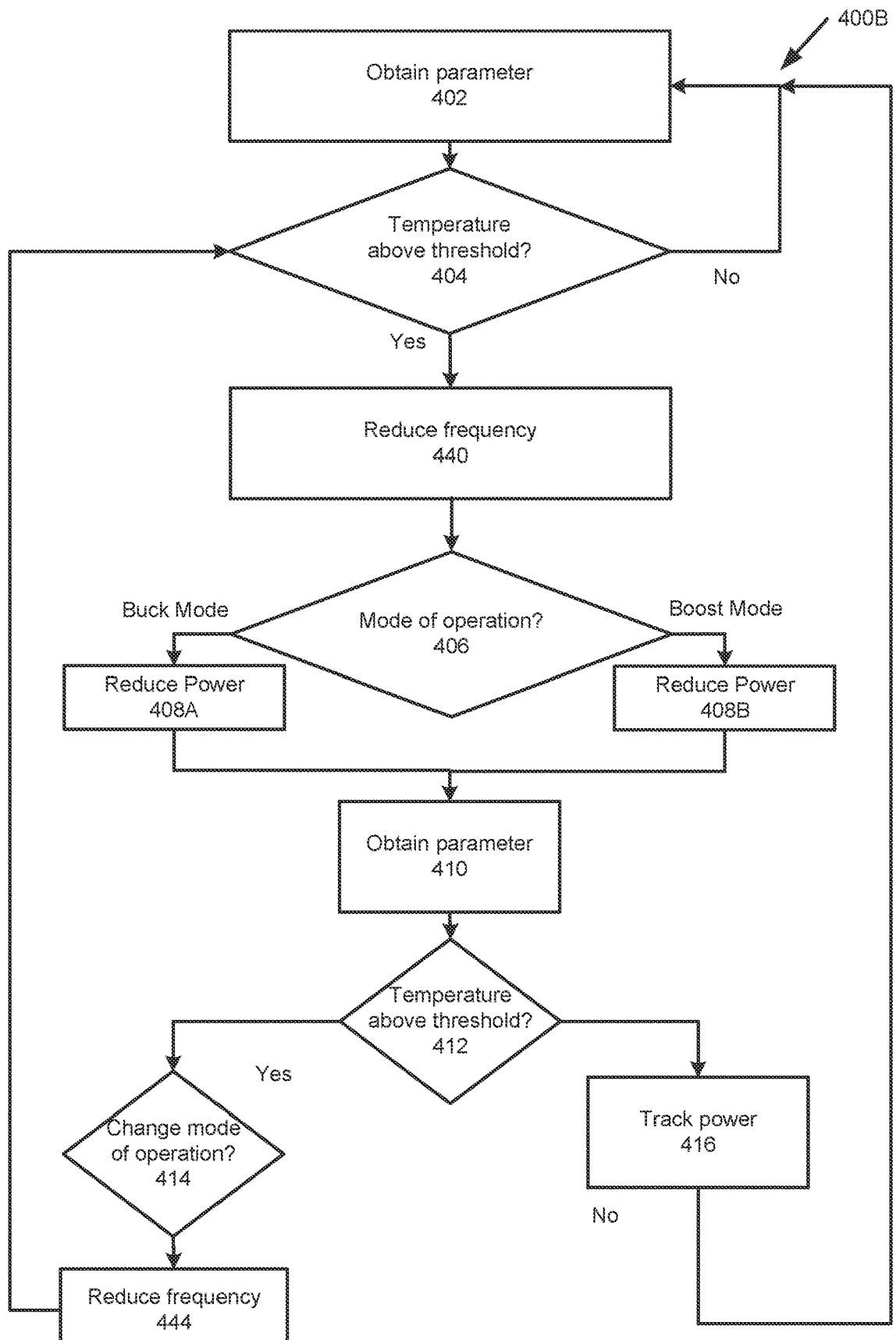
FIG. 4B shows an example flow chart of a method.

FIG. 4B shows an example flow chart 400B of a method for reducing power. Process 400B may be similar to process 400A, except that process 400B may include steps 440 and 444 for reducing a frequency of the power device. These steps may be performed using one or more power devices 106 and/or one or more controllers 116 of the power system 100. The frequency may relate to a switching frequency of one or more switches of the power device. Reducing the frequency may be done to reduce power losses of the power device. Reducing the power losses of the power device may lower a temperature of the power device. Although reducing the frequency may increase an output ripple of the power device, reducing the frequency may also reduce a heat generated in the power device and prevent a temperature value related to the power device from increasing above a threshold (e.g., a bypass threshold of the power device or a shutdown threshold of the power device). As an example, the frequency may be reduced from about 200 kHz to about 133 kHz.

FIGS. 5-16 show examples of various graphs of the current and voltage curve 500 (I-V curve) of a power device according to examples of the present subject matter. It is also noted that FIGS. 5-16 may refer to elements that are dependent on the referenced figure. The specific points and axes values may be unique for each given figure, but common terms may be used to refer to elements that vary among the different figures based on the circumstance depicted. For example, the operating point OP1 of FIG. 5 may be different than the operating point OP1 of FIG. 6, but in both figures the element OP1 refers to an operating point. The term "operating point" may refer to a point within an operation characteristic of a device or system described herein. For example, operating point may refer to an operating point that includes an input voltage (Vin) and an input current (Iin), or an operating point that includes an output voltage (Vout) an output current (Iout).

Figure 5:
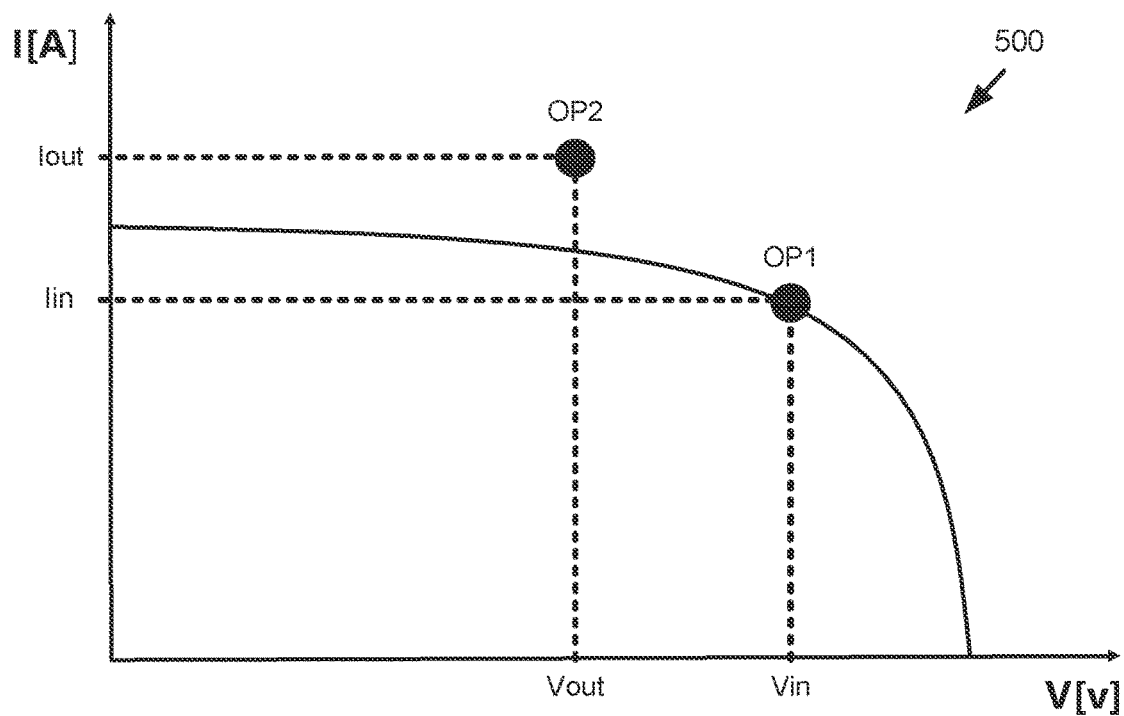
FIG. 5 shows an example graph of a current and voltage curve.

FIG. 5 shows an example of the power device operating in power tracking mode and not power reduction mode. In the example of FIG. 5, the power device is operating in a buck mode of conversion. The input voltage (Vin) is greater than the output voltage (Vout), and the output current (Iout) is greater than the input current (Iin). The operating point OP1 (Vin, Iin) may be determined by an algorithm such as an MPPT algorithm.

Figure 6:
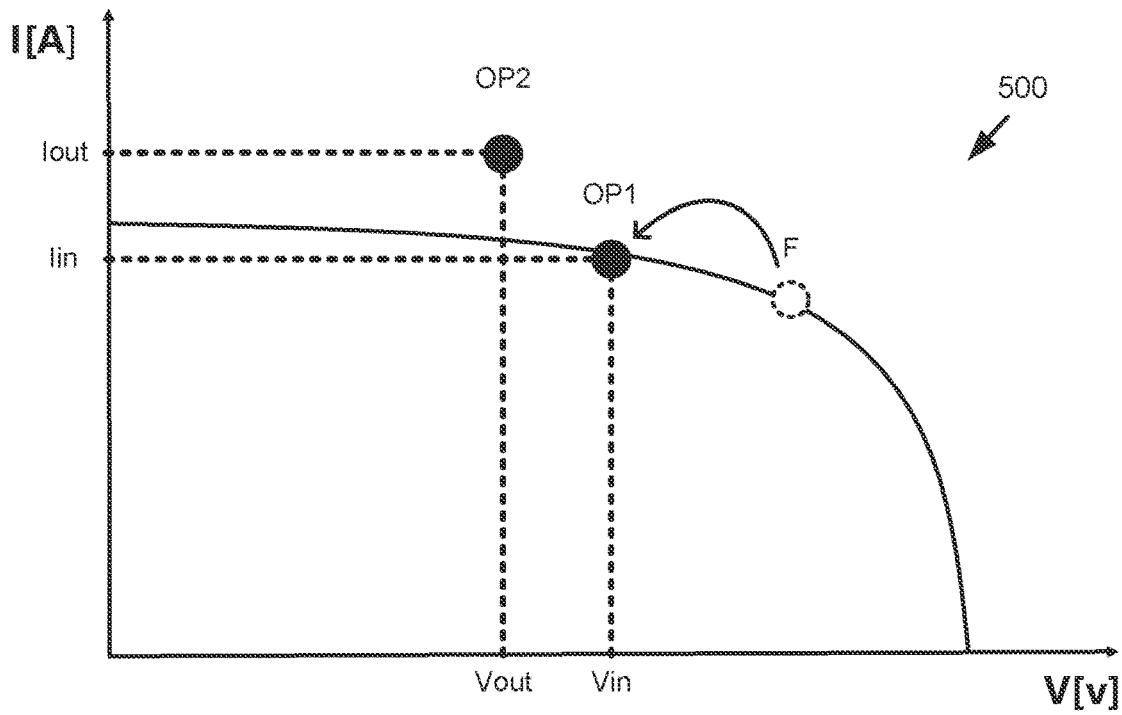
FIG. 6 shows an example graph of a current and voltage curve.

FIG. 6 shows an example of the power device operating in power reduction mode and not maximum power tracking mode. For example, after a determination that a temperature value is above a threshold (as may be shown in step 404) and a determination that the power device is operating in buck mode of conversion (as may be shown in step 406), then power (e.g., the input power (Pin)) may be reduced by reducing input voltage (Vin) or increasing input current (Iin) (as may be shown in step 408A). As a result, the operating point OP1 may move to the left of the I-V curve 500 (as may be indicated by the arrow and former operating point F). The output current (Iout) may remain about constant, which may cause a decrease in power. As the power device may be operating in buck mode, the output voltage (Vout) may be less than the input voltage (Vin). For example, in a case where the input power (Pin) is about 60 w (e.g., Vin is about 12 V and Iin is about 5 A) the power (Pin) may be reduced to about 48 w (e.g., Vin is reduced to about 9 V and Iin is increased to about 5.33 A, Iout stays around constant about 6 A, and Vout is decreased from about 10 V to about 8 V, which is less than the input voltage Vin). Reducing the power may be done to reduce a temperature related to one or more elements of the power device. The output current (Iout) may remain about constant, since the power device 106 may be connected in a series string 114 having a plurality of power devices 106 (for example, shown in FIG. 1). In such an example, the output voltage may be reduced by a reduction in output power caused by the reduction in input power. In an example where a plurality of arrangements 120 each having a single power device 106 are connected in parallel (for example, shown in FIG. 2B), then the output voltage (Vout) may remain about constant. In such an example, the output current may be actively controlled (increased).

Figure 7:
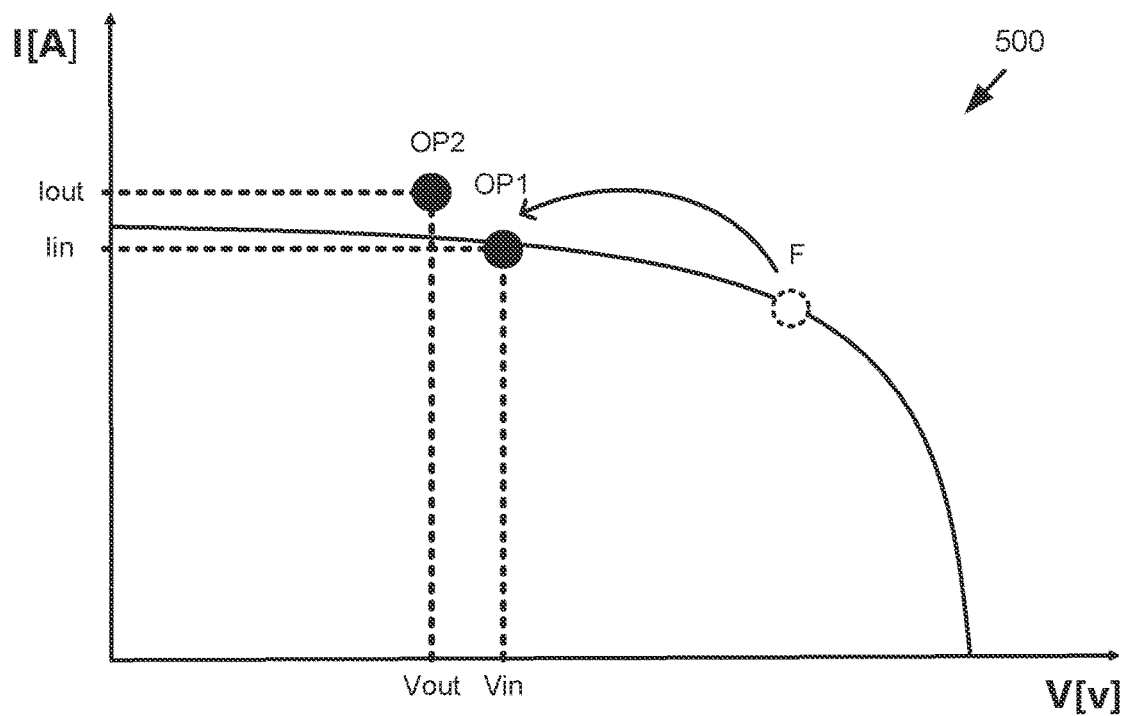
FIG. 7 shows an example graph of a current and voltage curve.

FIG. 7 shows an example of the power device operating in power reduction mode. For example, after a determination that the mode of operation should not be changed (as shown in step 414), then power (e.g., the input power (Pin)) may be further reduced by further reducing the input voltage (Vin) or further increasing the input current (Iin) (as may be shown in step 408A). As a result the operating point OP1 will move further to the left of the I-V curve 500 (as may be indicated by the arrow and former operating point F). The output current (Iout) may still remain about constant, which may cause a decrease in power. Since the power device is operating in buck mode, the output voltage (Vout) may be less than the input voltage (Vin). For example, in a case where the input power (Pin) is about 48 w (e.g., Vin is about 9 V and Iin is about 5.33 A), the power (Pin) may be reduced to about 42 w (e.g., Vin is reduced to about 7.42 V and Iin is increased to about 5.66 A, Iout stays around constant about 6 A, and Vout is decreased from about 8 V to about 7 V, which is less than the input voltage Vin). Reducing the power further may be done to further reduce the temperature related to one or more elements of the power device.

Figure 8:
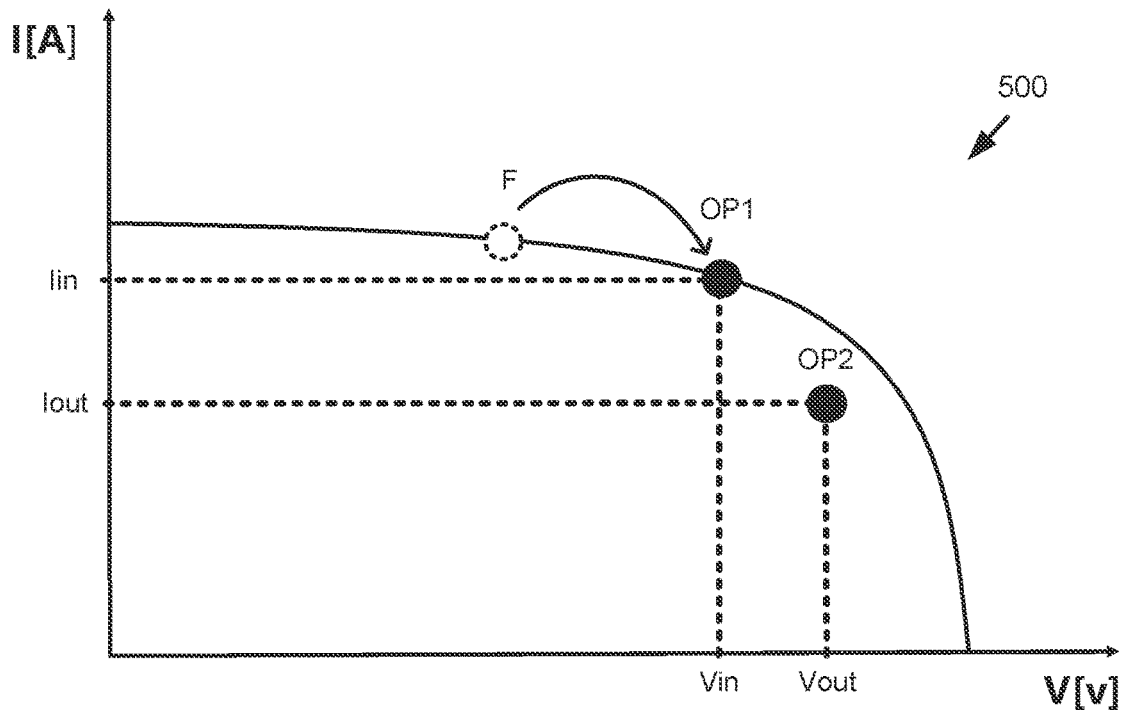
FIG. 8 shows an example graph of a current and voltage curve.

FIG. 8 shows an example of the power device operating in power reduction mode but changes modes of conversion. For example, after a decrease in the output current (Iout) and a determination that the mode of operation should be changed (as shown in step 414), then the power device may change modes of operation (e.g., from buck mode to boost mode) and the power (e.g., the input power (Pin)) may be reduced by reducing the input current (Iin) or increasing the input voltage (Vin) (as may be shown in step 408B). As a result, the operating point OP1 may move to the right of the I-V curve 500 (as indicated by the arrow and former operating point F). The output current (Iout) may then remain about constant (after the decrease), which may cause a decrease in power. When the power device is now operating in boost mode, the output voltage (Vout) may be greater than the input voltage (Vin). For example, in a case where the input power (Pin) is about 42 w (e.g., Vin is about 7.42 V and Iin is about 5.66 A), and the output current (Iout) is decreased from about 6 A to about 4 A, the power (Pin) may be reduced to about 40 w with the power device in boost mode instead of buck mode (e.g., Vin is increased to about 8 V and Iin is reduced to about 5 A, Iout stays around constant about 4 A, and Vout is increased from about 7 V to about 10 V, which is greater than the input voltage Vin). Reducing the power further may be done to further reduce the temperature related to one or more elements of the power device.

Figure 9:
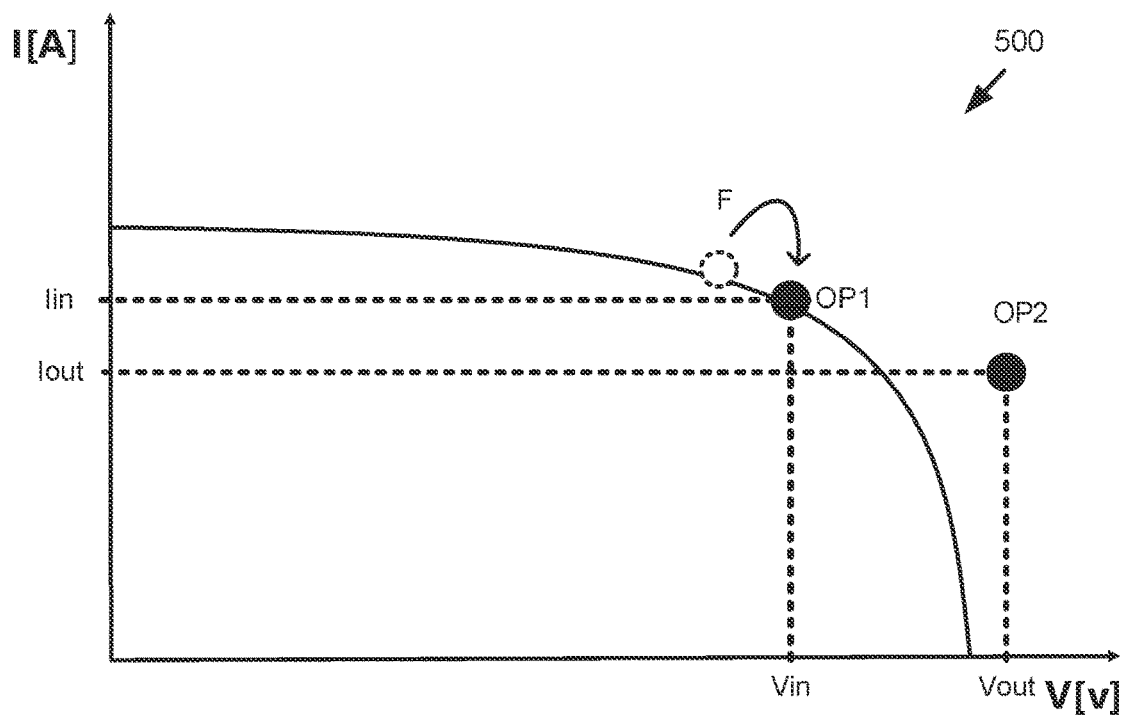
FIG. 9 shows an example graph of a current and voltage curve.

FIG. 9 shows an example of the power device operating in power reduction mode. For example, after a determination that the mode of operation should not be changed (as shown in step 414), then power (e.g., the input power (Pin)) may be further reduced by further reducing the input current (Iin) or further increasing the input voltage (Vin) (as may be shown in step 408B). As a result, the operating point OP1 may move further to the right of the I-V curve 500 (as indicated by the arrow and former operating point F). The output current (Iout) may still remain about constant, which may cause a decrease in power. When the power device is operating in boost mode, the output voltage (Vout) may be greater than the input voltage (Vin). For example, in a case where the input power (Pin) is about 40 w (e.g., Vin is about 8 V and Iin is about 5 A), the power (Pin) may be reduced to about 36 w (e.g., Vin is increased to about 8.5 V and Iin is reduced to about 4.2 A, Iout stays around constant about 4 A, and Vout is decreased from about 10 V to about 9 V, which is still greater than the input voltage Vin which is about 7 V). Reducing the power further may be done to further reduce the temperature related to one or more elements of the power device.

Figure 10:
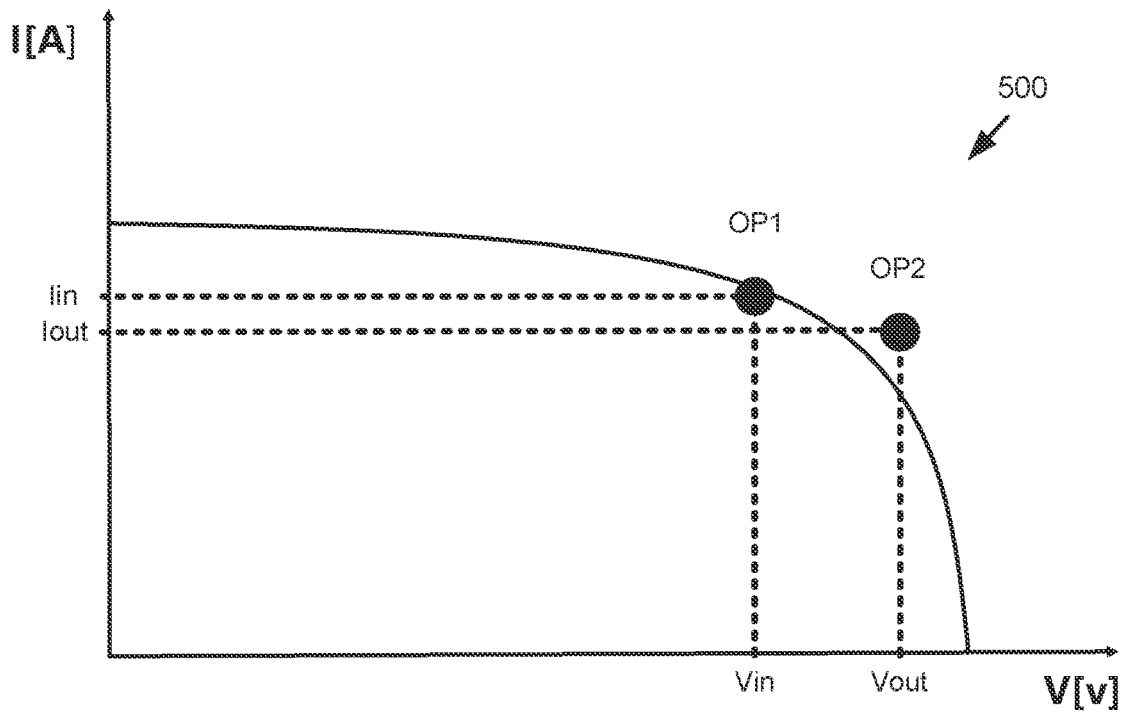
FIG. 10 shows an example graph of a current and voltage curve.

FIG. 10 shows an example of the power device operating in power tracking mode and not power reduction mode. For example, after a determination that a temperature value is below a threshold (as may be shown in step 414), then the power device may change modes of operation (e.g., from power reduction mode to power tracking mode) (as may be shown in step 416). As shown in FIG. 10, the power device may be operating in a boost mode of conversion. The output voltage (Vout) may be greater than the input voltage (Vin), and the input current (Iin) is greater than the output current (Iout). The operating point OP1 (Vin, Iin) may be determined by an algorithm such as an MPPT algorithm. When the temperature value is below the threshold, then it may not negatively affect the operation of the power device to the same degree as a temperature value above the threshold. Therefore, the power device may operate relatively effectively in the power tracking configuration. As mentioned above, in some cases where reducing the power does not reduce the temperature or temperature value adequately, then the power device may shut down instead of changing to power tracking mode.

Figure 11:
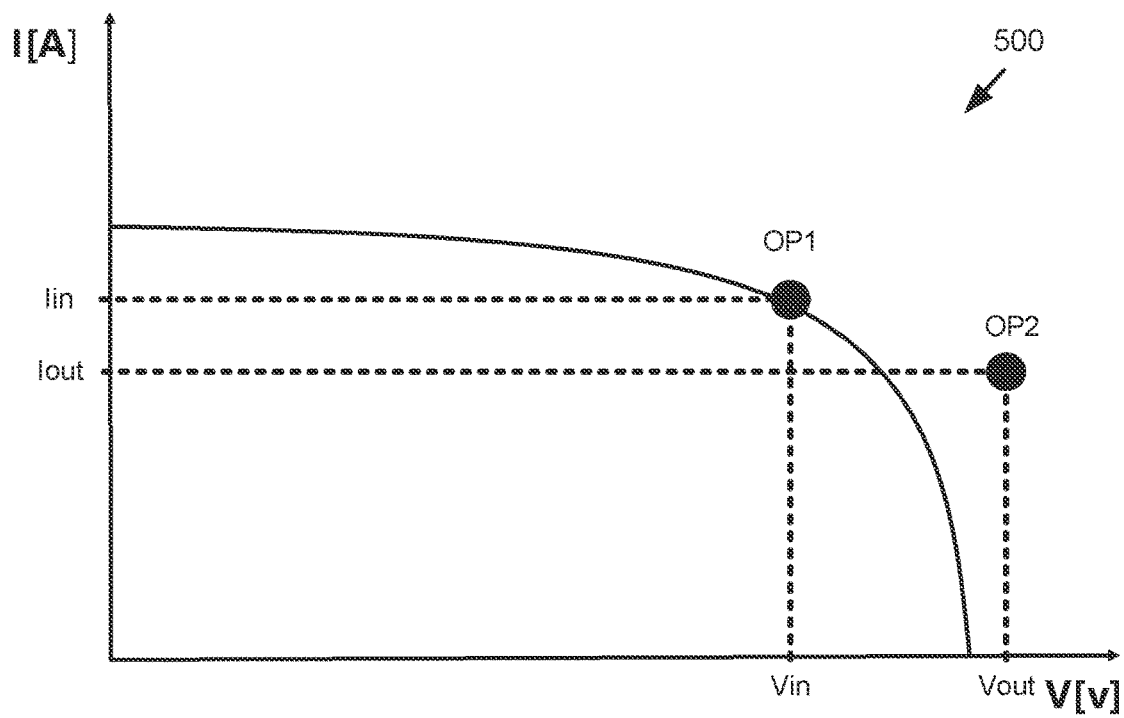
FIG. 11 shows an example graph of a current and voltage curve.

FIG. 11 shows an example of a decrease in output current (Iout) (relative, for example, to FIG. 10). The decrease in output current (Iout) may be indicative of a temperature of one or more elements of the power device being above a threshold.

Figure 12:
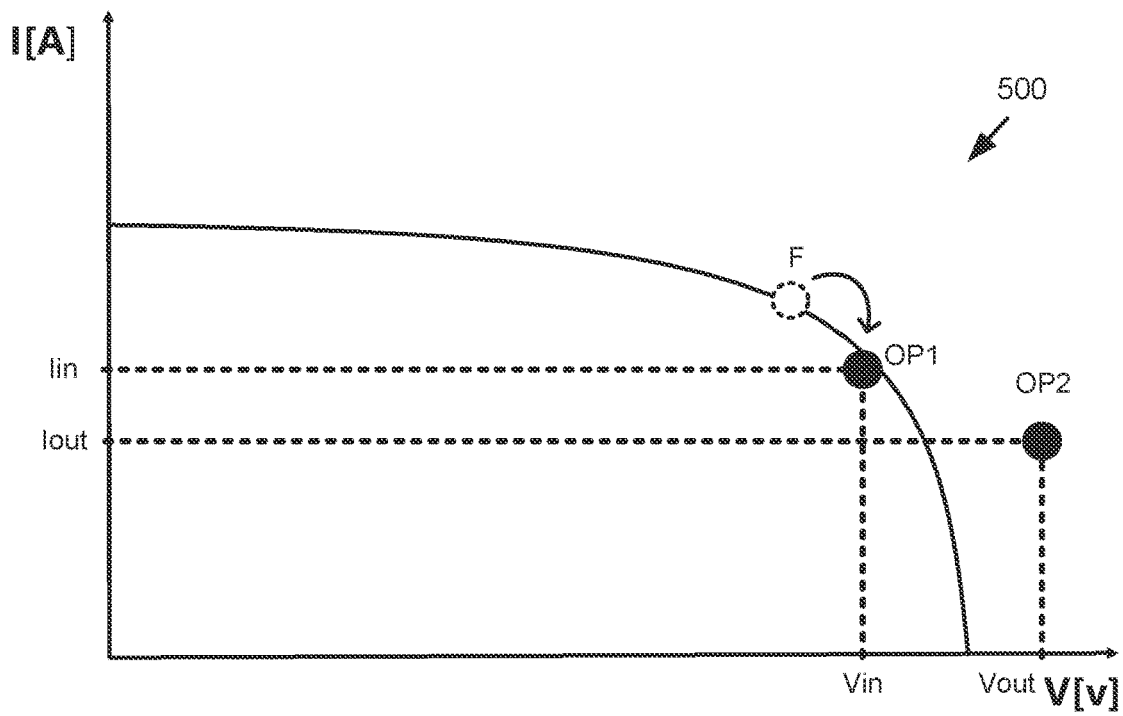
FIG. 12 shows an example graph of a current and voltage curve.

FIG. 12 shows an example of the power device operating in power reduction mode and not power tracking mode. For example, after a determination that a temperature value is above a threshold (as may be shown in step 404) (e.g., after a decrease of output current (Iout)) and a determination that the power device is operating in boost mode of conversion (as may be shown in step 406), then power (e.g., the input power (Pin)) may be reduced by reducing input current (Iin) or increasing input voltage (Vin) (as may be shown in step 408B). As a result, the operating point OP1 may move to the right of the I-V curve 500 (as may be indicated by the arrow and former operating point F). The output current (Iout) may remain about constant, which may cause a decrease in power. Since the power device may be operating in boost mode the output voltage (Vout) may be greater than the input voltage (Vin). For example, in a case where the input power (Pin) is about 60 w (e.g., Vin is about 10 V and Iin is about 6 A), the power (Pin) may be reduced to about 54 w (e.g., Vin is increased to about 11 V and Iin is reduced to about 4.9 A, Iout may stay around constant about 4 A, and Vout is decreased from about 15 V to about 13.5 V, which is still greater than the input voltage Vin which is about 11 V.) Reducing the power may be done to reduce a temperature related to one or more elements of the power device.

Figure 13:
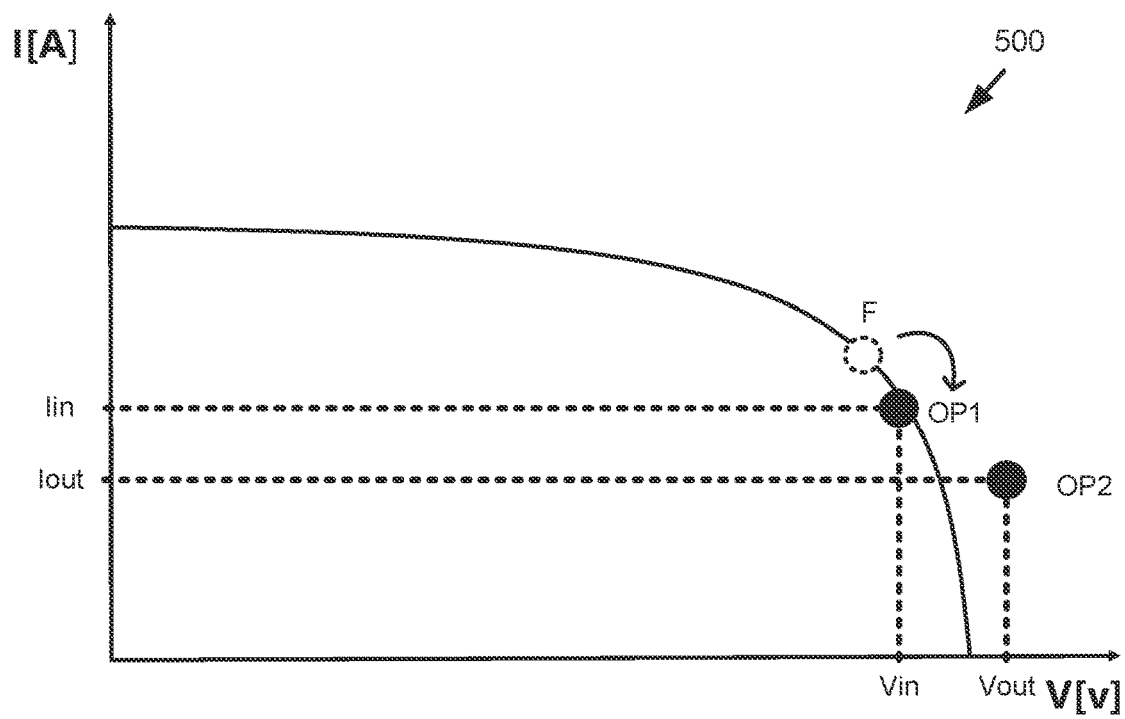
FIG. 13 shows an example graph of a current and voltage curve.

FIG. 13 shows an example of the power device operating in power reduction mode. For example, after a determination that the mode of operation should not be changed (as shown in step 414), then power (e.g., the input power Pin) may be further reduced by further reducing the input current (Iin) or further increasing the input voltage (Vin) (as may be shown in step 408B). As a result, the operating point OP1 may move further to the right of the I-V curve 500 (as may be indicated by the arrow and former operating point F). The output current (Iout) may still remain about constant, which may cause a decrease in power.

As the power device is operating in boost mode, the output voltage (Vout) may be greater than the input voltage (Vin). For example, in a case where the input power (Pin) is about 54 w (e.g., Vin is about 11 V and Iin is about 4.9 A), the power (Pin) may be reduced to about 48 w (e.g., Vin is increased to about 11.5 V and Iin is reduced to about 4.17 A, Iout stays around constant about 4 A, and Vout is decreased from about 13.5 V to about 12 V, which is still greater than the input voltage Vin which is about 11.5 V). Reducing the power further may be done to further reduce the temperature related to one or more elements of the power device.

Figure 14:
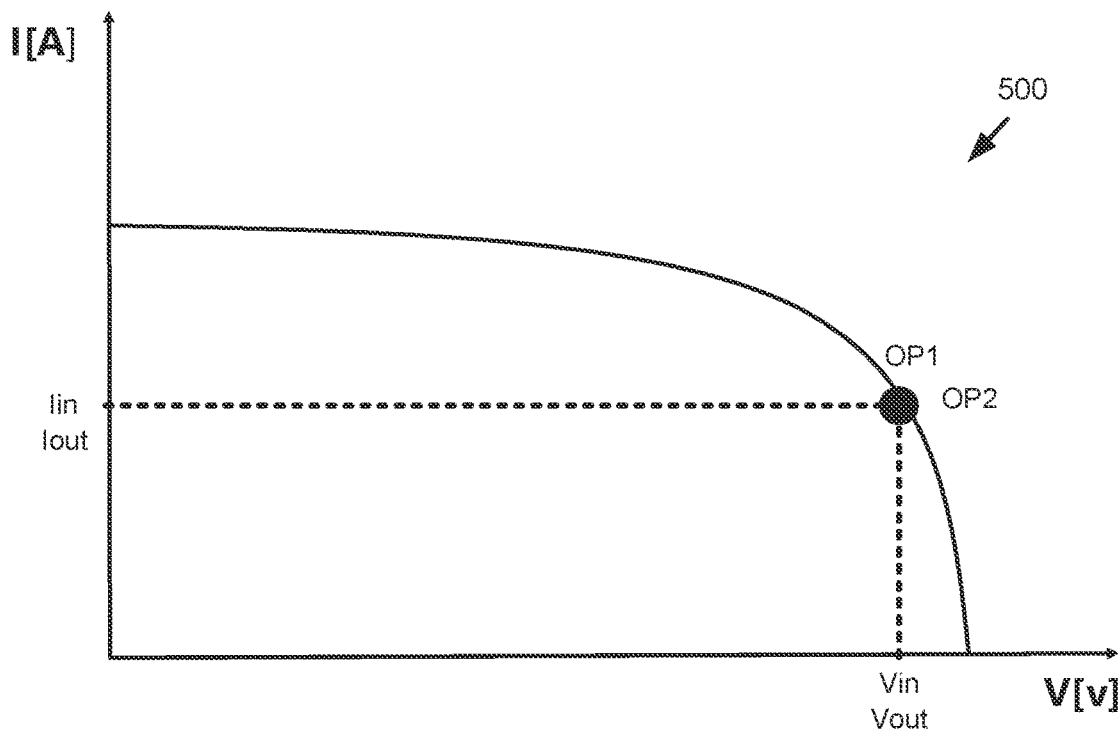
FIG. 14 shows an example graph of a current and voltage curve.

FIG. 14 shows an example of the power device operating in a bypass mode of operation. For example, the power device may operate in bypass mode while changing between a boost mode of operation to a buck mode of operation, and vice versa. In bypass mode, the input voltage (Vin) may be about equal to the output voltage (Vout), and the input current (Iin) may be about equal to the output current (Iout). In some examples, the power device may change to bypass mode after an increase of output current. For example, if the input power (Pin) is about 48 w and an output current (Iout) increases from about 4 A to about 4.17 A then the input voltage (Vin) may be about equal to the output voltage (Vout) (e.g., both Vin and Vout are about 11.5 V) and the input current (Iin) may be about equal to the output current (Iout) (e.g., both Iin and Iout are about 4.17 A).

Figure 15:
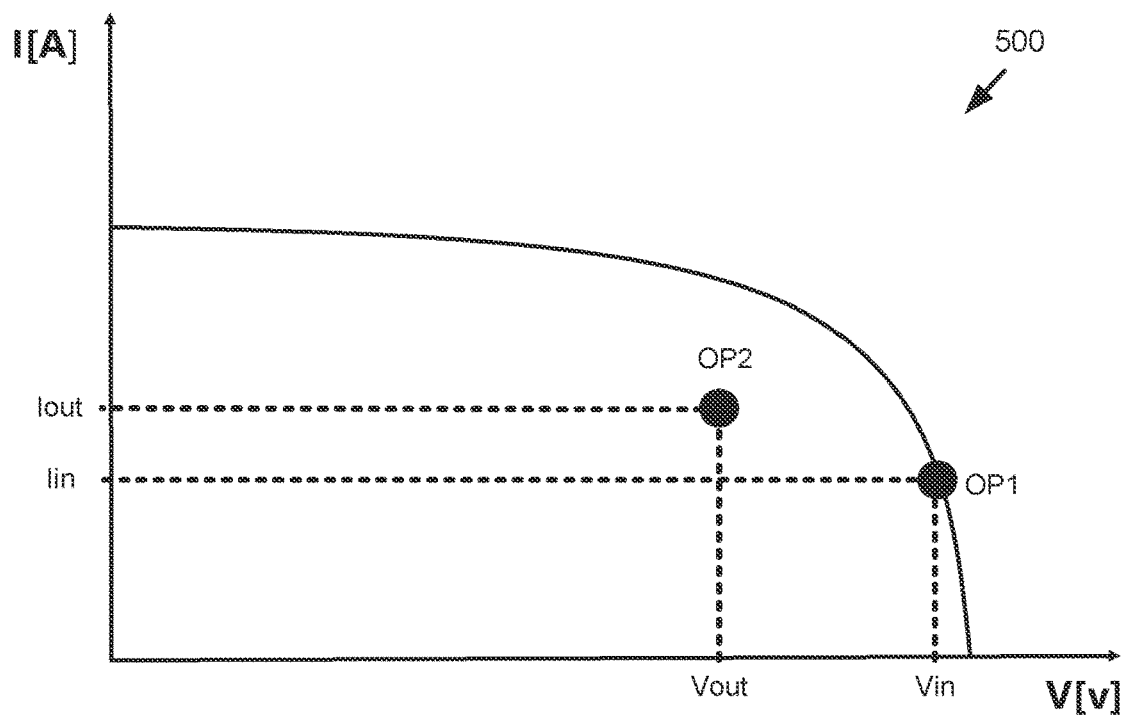
FIG. 15 shows an example graph of a current and voltage curve.

FIG. 15 shows an example of the power device operating in power reduction mode and changes modes of conversion. For example, after the input current (Iin) is decreased in boost mode past a certain point on the I-V curve 500 (e.g., past the point where the output voltage Vout is greater than or about equal to the input voltage Vin), then the power device may change modes of operation (e.g., to buck mode). For example, if the input power (Pin) is about 48 w and the input current (Iin) decreases from about 4.17 A to about 3 A then the power device may change to a buck mode of operation where the output voltage (Vout) may be less than the input voltage (Vin). For example, in a case where the input power (Pin) is about 48 w (e.g., Vin is about 11.5 V and Iin is about 4.17 A) and the power device is in bypass mode, and the input current (Iin) is decreased from about 4.17 A to about 3 A, the power device may change to buck mode. When the input current (Iin) is decreased from about 4.17 A to about 3 A, then the input power (Pin) may be reduced to about 30 w (e.g., Vin is reduced to about 10 V and Iin is about 3 A, Iout stays around constant about 4.17 A, and Vout is decreased from about 11.5 V to about 7.19 V, which is less than the input voltage Vin). Decreasing the input current may be done to reduce the power (Pin), and to reduce a temperature related to one or more elements of the power device. In some examples, the power device may change to a buck mode of operation following a further increase of output current (e.g., from about 4.17 A to about 6 A).

Figure 16:
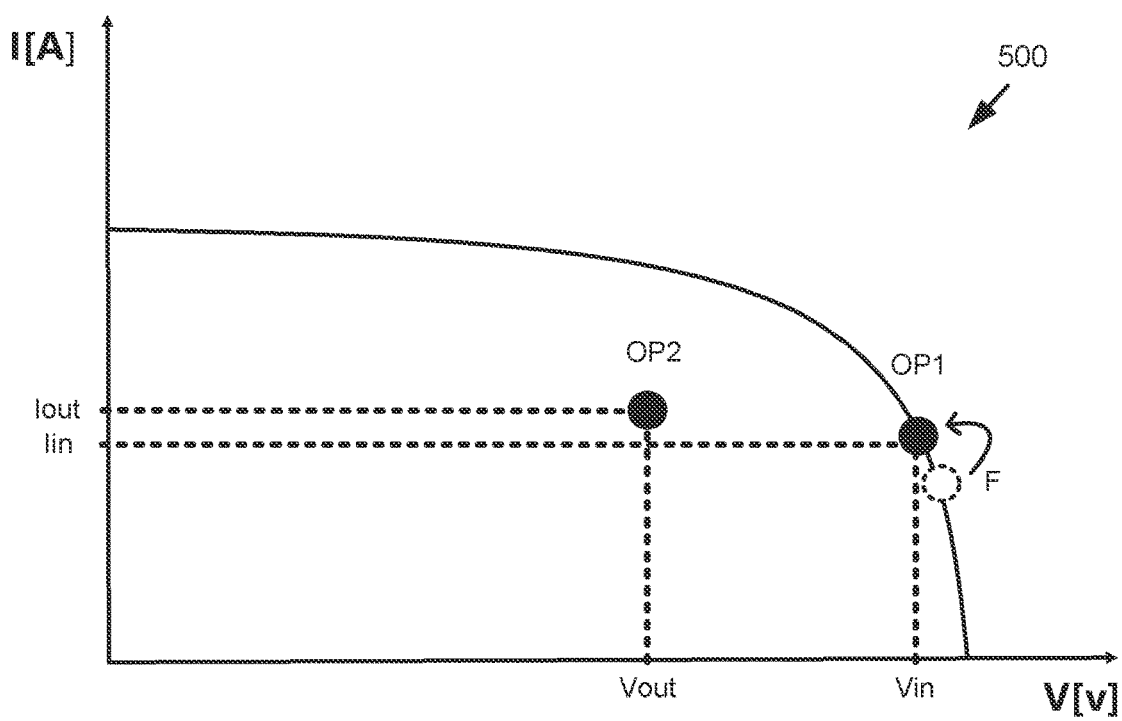
FIG. 16 shows an example graph of a current and voltage curve.

FIG. 16 shows an example of the power device operating in power reduction mode. For example, after a determination that the mode of operation should not be changed (as may be shown in step 414), then power (e.g., the input power (Pin)) may be reduced by reducing the input voltage (Vin) or increasing the input current (Iin) (as shown in step 408A). As a result, the operating point OP1 may move to the left of the I-V curve 500 (as indicated by the arrow and former operating point F). The output current (Iout) may remain about constant, which may cause a decrease in power. Since the power device is operating in buck mode the output voltage (Vout) may be less than the input voltage (Vin). For example, in a case where the input power (Pin) is about 30 w (e.g., Vin is about 10 V and Iin is about 3 A) the power (Pin) may be reduced to about 28 w (e.g., Vin is reduced to about 8 V and Iin is increased to about 3.5 A, Iout stays around constant about 4.17 A, and Vout is decreased from about 7 V to about 6.7 V, which is less than the input voltage Vin). Reducing the power further may be done to further reduce the temperature related to one or more elements of the power device. In some cases where reducing the power does not reduce the temperature adequately, then the power device may shut down instead of changing modes of power conversion.

In some examples, the I-V curve 500 may be dynamic and not constant. The power device 106 may include a power tracking mode of operation that operates concurrently with the power reduction mode of operation. This power tracking mode of operation that occurs while the power device is also operating in a power reduction mode of operation may be arranged to track a power point that is not the maximum power point (e.g., a sub-optimal power point) according to one or more algorithms. This power tracking mode may be arranged to track a power point when the I-V curve 500 (e.g., the input from the one or more power sources 102) is dynamic. This power tracking mode may be arranged to track a power point due to one or more thermal considerations.

Figure 17:
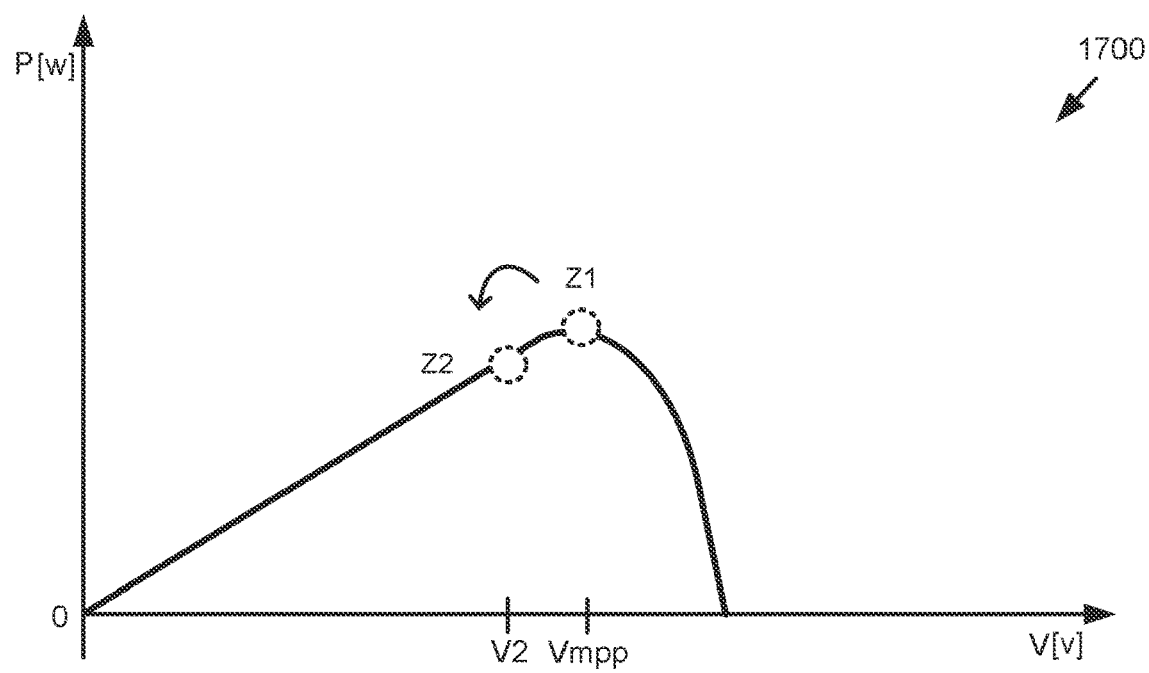
FIG. 17 shows an example graph of a power and voltage curve.
Figure 18:
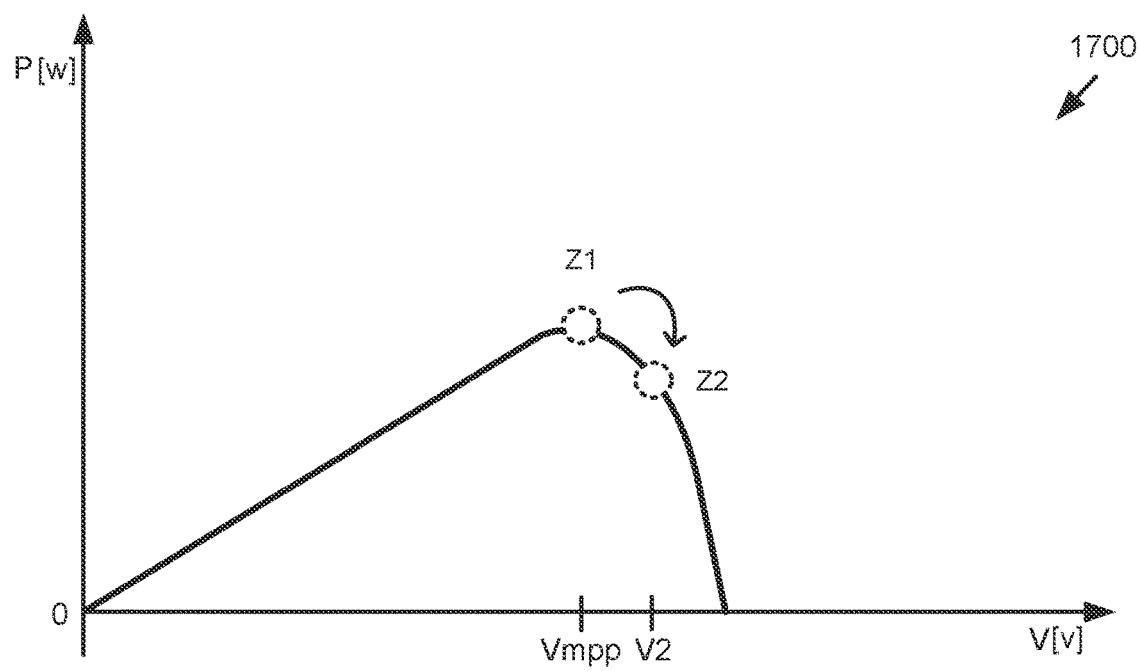
FIG. 18 shows an example graph of a power and voltage curve.

FIGS. 17-18 show examples of various graphs of the power and voltage curve 1700 (P-V curve) of a power device (e.g., according to the input power Pin of the power device) according to examples of the present subject matter.

FIG. 17 shows an example of the power device operating in power reduction mode and the input voltage being reduced to reduce the power (e.g., when the power device may be operating in a buck mode of operation). Point Z1 may represent the maximum power point of the P-V curve 1700. When in power tracking mode, the power (e.g., the input power (Pin)) may be about the maximum power point Z1. The power point Z1 may be determined by an algorithm such as an MPPT algorithm. When the power device changes to operating in power reduction mode and not power tracking mode, for example, after a determination that a temperature value is above a threshold (as shown in step 404) and a determination that the power device is operating in buck mode of conversion (as shown in step 406), then power may be reduced from the power point Z1 to a lesser power point Z2. In FIG. 17, the lesser power point Z2 may be on the left side of the P-V curve 1700, e.g., because the power may be reduced by reducing the input voltage (Vin) from the voltage Vmpp to the voltage V2 (as shown in step 408A). As another example, power may be reduced from the power point Z1 to the lesser power point Z2 by increasing input current (Iin) (as also shown in step 408A). Reducing the power may be done to reduce a temperature or temperature value related to one or more elements of the power device.

FIG. 18 shows an example of the power device operating in power reduction mode and the input voltage being increased to reduce the power (e.g., when the power device may be operating in a boost mode of operation). Point Z1 may represent the maximum power point of the P-V curve. When in power tracking mode, the power (e.g., the input power (Pin)) may be about the maximum power point Z1. The power point Z1 may be determined by an algorithm such as an MPPT algorithm. When the power device changes to operating in power reduction mode and not power tracking mode, for example, after a determination that a temperature value is above a threshold (as shown in step 404) and a determination that the power device is operating in boost mode of conversion (as shown in step 406), then power may be reduced from the power point Z1 to a lesser power point Z2. In FIG. 18, the lesser power point Z2 may be on the right side of the P-V curve 1700, e.g., because the power may be reduced by increasing the input voltage (Vin) from the voltage Vmpp to the voltage V2 (as shown in step 408B). As another example, power may be reduced from the power point Z1 to the lesser power point Z2 by reducing input current (Iin) (as also shown in step 408B). Reducing the power may be done to reduce a temperature or temperature value related to one or more elements of the power device.

FIGS. 19-24 and 50 show example flow charts of methods for changing modes of operation.

Figure 19:
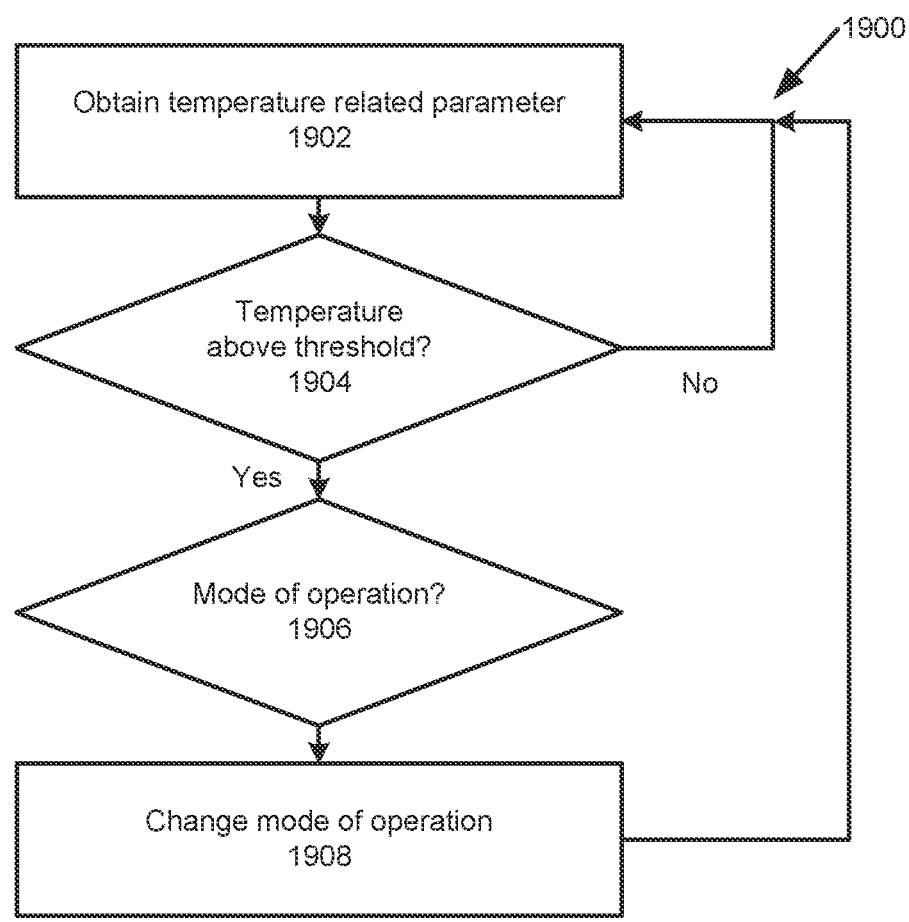
FIG. 19 shows a flow chart of a method for changing modes of operation.

With reference to FIG. 19, a method 1900 is shown for changing the mode of operation of a power device. The steps of the method may be performed by one or more elements of a power system: e.g., one or more power devices, or one or more system power devices, one or more controllers, etc.

In step 1902, a temperature related parameter may be obtained. Step 1902 may be performed using a power device 106 and/or a controller 116 of the power system 100. The temperature related parameter may be a temperature or be correlated with and/or dependent on a temperature of one or more elements of the power system 100 (such as a function of a temperature and/or correlated with a temperature of one or more elements of the power system 100). For example, the one or more sensors 118 may be configured to detect a physical phenomenon related to one or more elements of the power system 100 and determine a digital or analog representation of the intensity of the phenomenon. The one or more sensors 118 may be configured to further determine a digital value or parameter based on the determined representation. The value or parameter may be transmitted to one or more controllers 116. In some examples, the value or parameter may be further processed (e.g., into parameter data). The value or parameter may be a temperature parameter, such as: degrees Celsius, degrees Fahrenheit, degrees Kelvin, etc. The value or parameter may be an electrical parameter, such as a: current, voltage, power, irradiance, etc. The one or more elements of the power system 100 may, for example, be a switch (e.g., one of Q1-Q4), an inductor L, or other component of the power device 106. The one or more sensors 118 may be configured to detect the physical phenomenon at an input, or an output, or another location in the power device 106 or the element of the power device 106.

In step 1904, a decision may be made whether the temperature related parameter indicates a temperature value above a threshold. This step may be performed using a power device 106 and/or a controller 116 of the power system 100. As an example, the temperature related parameter may be a temperature of a switch (e.g., one of Q1-Q4) of the power device 106 and the value of the temperature may be above a threshold. As another example, the temperature related parameter may be a current value at a terminal of the inductor and the value of the current may indicate that a temperature related to the inductor is above a threshold. The temperature value being above the threshold may negatively affect the performance of the power device, or element of the power device (e.g., inductor).

When in step 1904, if the decision is that the temperature value is not above the threshold, then there may be a return to step 1902.

When in step 1904, if the decision is that the temperature value is above the threshold, then the next step may be step 1906.

In step 1906, a decision is made regarding the mode of operation of the power device. This step may be performed using a power device 106 and/or a controller 116 of the power system 100. For example, the decision may be whether the power device should be changed from one mode of operation to another mode of operation, such as, a bypass mode of operation, a shutdown mode of operation, etc. This decision may be based on the present mode of operation of the power device. This decision may be based on how much the temperature is above the threshold and/or whether the temperature is above a second threshold. For example, if the temperature is above a first threshold but not a second threshold then the decision may be made to change to a bypass mode of operation. As another example, if the temperature is above a first threshold and a second threshold then the decision may be made to change to a shutdown mode of operation.

In step 1908, the mode of operation of the power device may be set. This step may be performed using a power device 106 and/or a controller 116 of the power system 100. For example, in step 1908 the mode of operation of the power device may be changed from a first mode of operation to a second mode of operation. Changing the mode of operation of the power may be done to reduce the temperature of one or more elements of the power device. For example, in step 1908 the temperature may be reduced by changing the mode of operation of the power device to a bypass mode of operation or a shutdown mode of operation. The bypass mode of operation and the shutdown mode of operation may be non-power conversion modes of operation. Operating the power device in a non-power conversion mode of operation may enable one or more elements of the power device to reduce a temperature of that element.

As an example, a controller 116 associated with a power device 106 having a power converter 300 may obtain a temperature value (e.g., from a device such as: a sensor, a memory associated with a processor, etc.). The temperature value may be indicative of the temperature of one or more elements of the power device 106. The temperature value may be a sensed temperature value related to an ambient temperature around one or more elements of the power device 106. The controller 116 associated with the power device 106 may determine whether the temperature value is greater than a temperature threshold. The temperature threshold may be set in order to prevent a degraded operation of the power device 106, or to prevent inoperability of the power device 106 (e.g., due to overheating or even destruction of one or more elements of the power device due to excessive heat). If the temperature value is not above the temperature threshold then the power device 106 and power converter 300 may continue operating in a power tracking configuration, and not change to a temperature reduction configuration. If the temperature value is above the temperature threshold then the controller 116 may make a decision whether to change the configuration of the power device 116. If the controller 116 decides not to change the configuration of the power device 116, then the power device 106 and power converter 300 may continue operating in a power tracking configuration, and not change to a temperature reduction configuration. If the controller 116 decides to change the configuration of the power device 116, then the power device 106 and power converter 300 change to a temperature reduction configuration. The controller 116 may continue to obtain temperature values and evaluate whether the power device 106 and power converter 300 should operate in the temperature reduction configuration.

Figure 20:
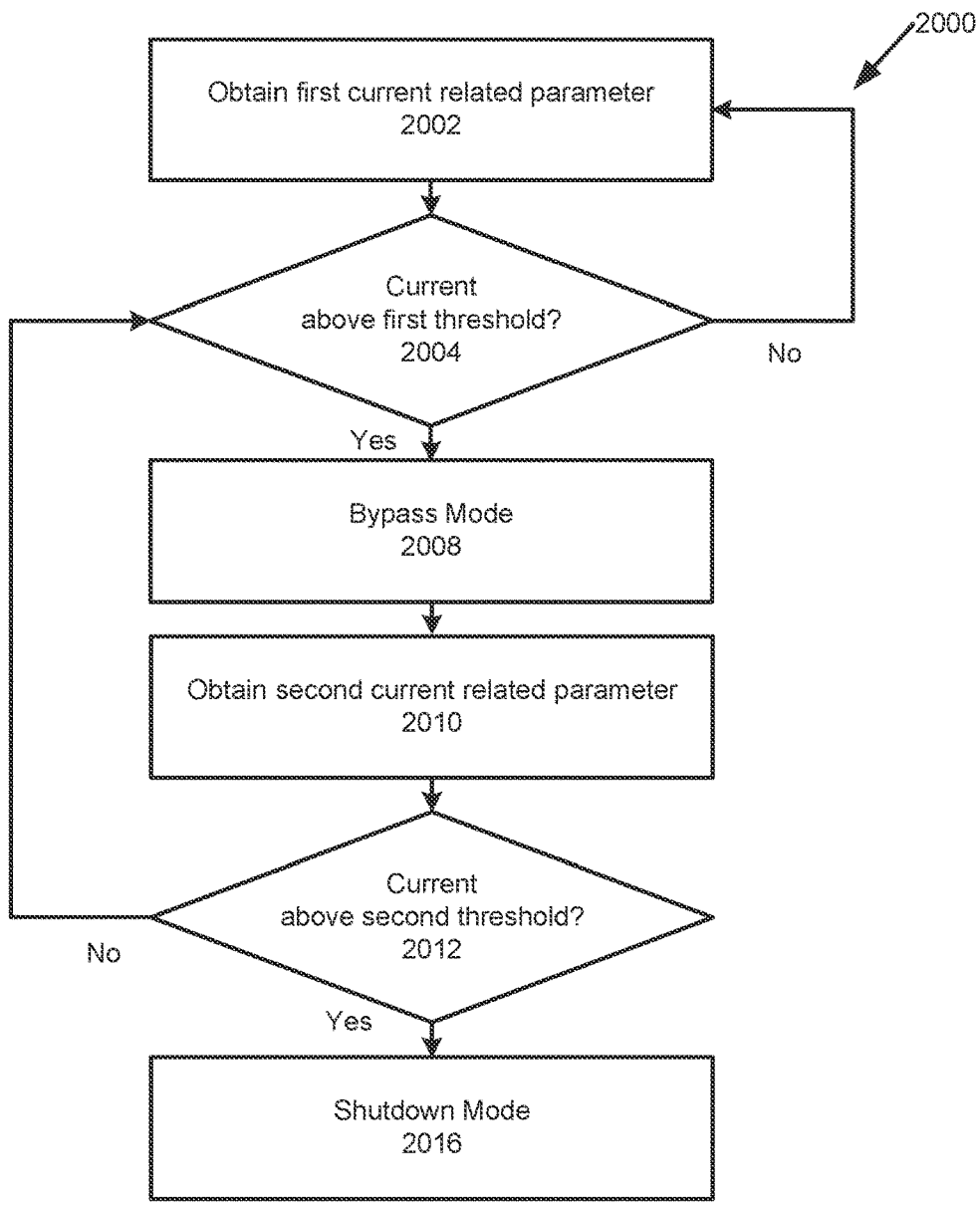
FIG. 20 shows a flow chart of a method for changing to a bypass mode of operation and to a shutdown mode of operation.

With reference to FIG. 20, a method 2000 is shown for changing the mode of operation of a power device to a bypass mode of operation or a shutdown mode of operation. The method 2000 shown in FIG. 20 may be part of the method 1900 shown in FIG. 19. For example, one or more steps of method 1900 may be part of step 1906 or step 1908 of method 1900.

In step 2002, a current related parameter may be obtained. This step may be performed using a power device 106 and/or a controller 116 of the power system 100. The current related parameter may be a current or relate to a current of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may quantify an electrical parameter, such as a: current, voltage, power, irradiance, etc. The one or more elements of the power system 100 may be, for example, a switch Q or an inductor L of the power device 106. The one or more sensors 118 may be configured to detect the physical phenomenon either at an input or an output of the power device 106 or the element of the power device 106. As an example, the current related parameter may be an output current of the power device 106. In some examples the current related parameter may be the same as the temperature related parameter.

In step 2004, a decision may be made whether the current related parameter indicates a current value above a current threshold. This step may be performed using a power device 106 and/or a controller 116 of the power system 100. As an example, the current related parameter may be an output current of the power device 106 that is above or below the current threshold. As another example, the current related parameter may be a voltage of the power device 106 (e.g., an output voltage) and the value of the voltage may indicate that a current related to the power device 106 is above or below a threshold. The current value being above the threshold may indicate that the temperature related to the power device 106 may need to be managed by changing the power device 106 to a bypass mode of operation. This may be after the power device has already been changed from a power tracking mode of operation to operate in a power reduction mode of operation (e.g., a temperature management mode of operation).

When in step 2004, if the decision is that the current value is not above the current threshold, then there may be a return to step 2002.

When in step 2004, if the decision is that the current value is above the current threshold, then the next step may be step 2008.

In step 2008, the mode of operation of the power device may be changed to bypass mode. This step may be performed using a power device 106 and/or a controller 116 of the power system 100. Changing the mode of operation of the power device 106 to the bypass mode of operation may be done to reduce the temperature of one or more elements of the power device, and may be done to avoid the shutdown mode of operation if possible. For example, in step 2008 the power device 106 may be changed to the bypass mode of operation by turning ON the high side switches Q1 and Q4 of the power converter 300.

In step 2010, a second current related parameter may be obtained. This step may be performed using a power device 106 and/or a controller 116 of the power system 100. The second current related parameter may be a current or relate to a current of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may be an electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106. As an example, the current related parameter may be an output current of the power device 106.

In step 2012, a decision may be made whether the current related parameter indicates a current value above a second current threshold. This step may be performed using a power device 106 and/or a controller 116 of the power system 100. As an example, the current related parameter may be an output current of the power device 106 that is above or below the second current threshold. As another example, the current related parameter may be a voltage of the power device 106 (e.g., an output voltage) and the value of the voltage may indicate that a current related to the power device 106 is above or below a second threshold. The current value being above the second threshold may indicate that the temperature related to the power device 106 may need to be managed by changing the power device 106 to a shutdown mode of operation. This may be after the power device was changed to operate in a bypass mode of operation.

When in step 2012, if the decision is that the current value is not above the second current threshold, then there may be a return to step 2004.

When in step 2012, if the decision is that the current value is above the second current threshold, then the next step may be step 2016.

In step 2016, the mode of operation of the power device may be changed to shutdown mode. This step may be performed using a power device 106 and/or a controller 116 of the power system 100. Changing the mode of operation of the power device 106 to the shutdown mode of operation may be done to reduce the temperature of one or more elements of the power device. For example, in step 2016 the power device may be changed to the shutdown mode of operation by turning OFF all of the switches Q1-Q4 of the power converter 300.

As an example, a controller 116 associated with a power device 106 having a power converter 300 may obtain a first current value (e.g., from a device such as: a sensor, a memory associated with a processor, etc.). The first current value may be indicative of the current flowing through one or more elements of the power device 106. The controller 116 associated with the power device 106 may determine whether the first current value is greater than a first current threshold. The first current threshold may be set in order to prevent a degraded operation of the power device 106, or to prevent inoperability of the power device 106 (e.g., due to overheating or even destruction of one or more elements of the power device due to excessive heat). If the first current value is not above the first current threshold then the power device 106 and power converter 300 may continue operating in a non-bypass configuration, and not change to a bypass configuration. Changing the mode of operation of the power device 106 to the bypass mode of operation may be done to reduce the temperature of one or more elements of the power device, and may be done to avoid the shutdown mode of operation if possible. If the first current value is above the first current threshold then the controller 116 may change the power device 106 and power converter 300 to a bypass configuration. The controller 116 associated with the power device 106 may then obtain a second current value (e.g., from a device such as: a sensor, a memory associated with a processor, etc.). The second current value may be indicative of the current flowing through one or more elements of the power device 106. The controller 116 associated with the power device 106 may determine whether the second current value is greater than a second current threshold. The second current threshold may be greater than the first current threshold. The second current threshold may also be set in order to prevent a degraded operation of the power device 106, or to prevent inoperability of the power device 106 (e.g., due to overheating or even destruction of one or more elements of the power device due to excessive heat). If the second current value is not above the second current threshold then the power device 106 and power converter 300 may continue operating in the bypass configuration, and not change to a shutdown configuration. If the second current value is above the second current threshold then the controller 116 may change the power device 106 and power converter 300 to a shutdown configuration. Changing the mode of operation of the power device 106 to the shutdown mode of operation may be done to reduce the temperature of one or more elements of the power device.

Figure 21:
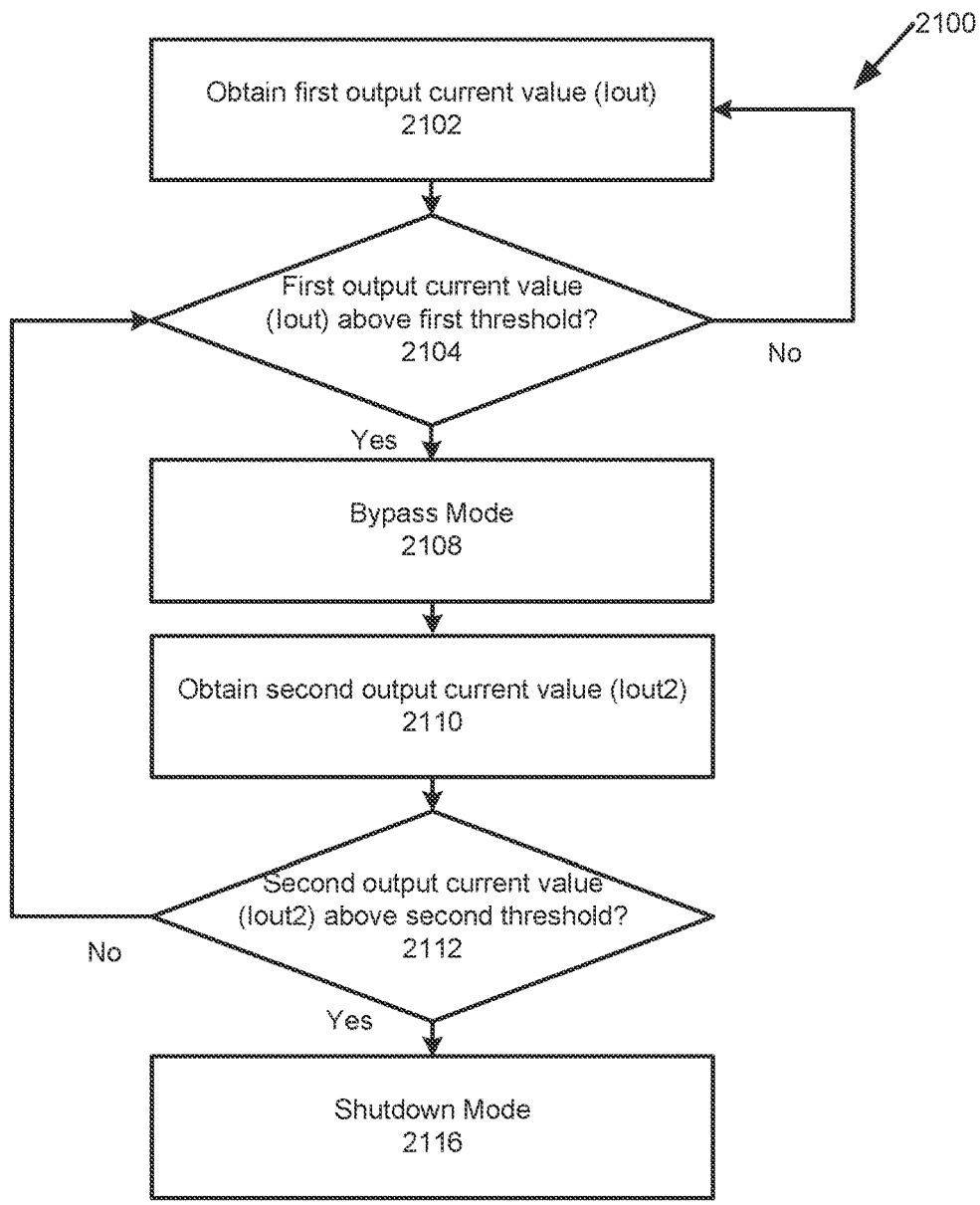
FIG. 21 shows a flow chart of a method for changing to a bypass mode of operation and to a shutdown mode of operation.

With reference to FIG. 21, a method 2100 is shown for changing the mode of operation of a power device to a bypass mode of operation or a shutdown mode of operation. The method 2100 shown in FIG. 21 may be part of the method 1900 shown in FIG. 19. For example, one or more steps of method 1900 may be part of step 1906 or step 1908 of method 1900. FIG. 21 may show a more specific example of method 2000 of FIG. 20 where the current related parameter is an output current value (Iout).

As an example, a controller 116 associated with a power device 106 having a power converter 300 may obtain a first output current value. The first output current value may be indicative of the current at an output terminal of a converter 300 of the power device 106. The controller 116 associated with the power device 106 may determine whether the first output current value is greater than a first current threshold. If the first output current value is not above the first current threshold then the power device 106 and power converter 300 may continue operating in a non-bypass configuration, and not change to a bypass configuration. Changing the mode of operation of the power device 106 to the bypass mode of operation may be done to reduce the temperature of one or more elements of the power device, and may be done to avoid the shutdown mode of operation if possible. If the first output current value is above the first current threshold then the controller 116 may change the power device 106 and power converter 300 to a bypass configuration. The controller 116 associated with the power device 106 may then obtain a second output current value. The second output current value may be indicative of the current at an output terminal of a converter 300 of the power device 106. The controller 116 associated with the power device 106 may determine whether the second output current value is greater than a second current threshold. If the second output current value is not above the second current threshold then the power device 106 and power converter 300 may continue operating in the bypass configuration, and not change to a shutdown configuration. If the second output current value is above the second current threshold then the controller 116 may change the power device 106 and power converter 300 to a shutdown configuration. Changing the mode of operation of the power device 106 to the shutdown mode of operation may be done to reduce the temperature of one or more elements of the power device.

Figure 22:
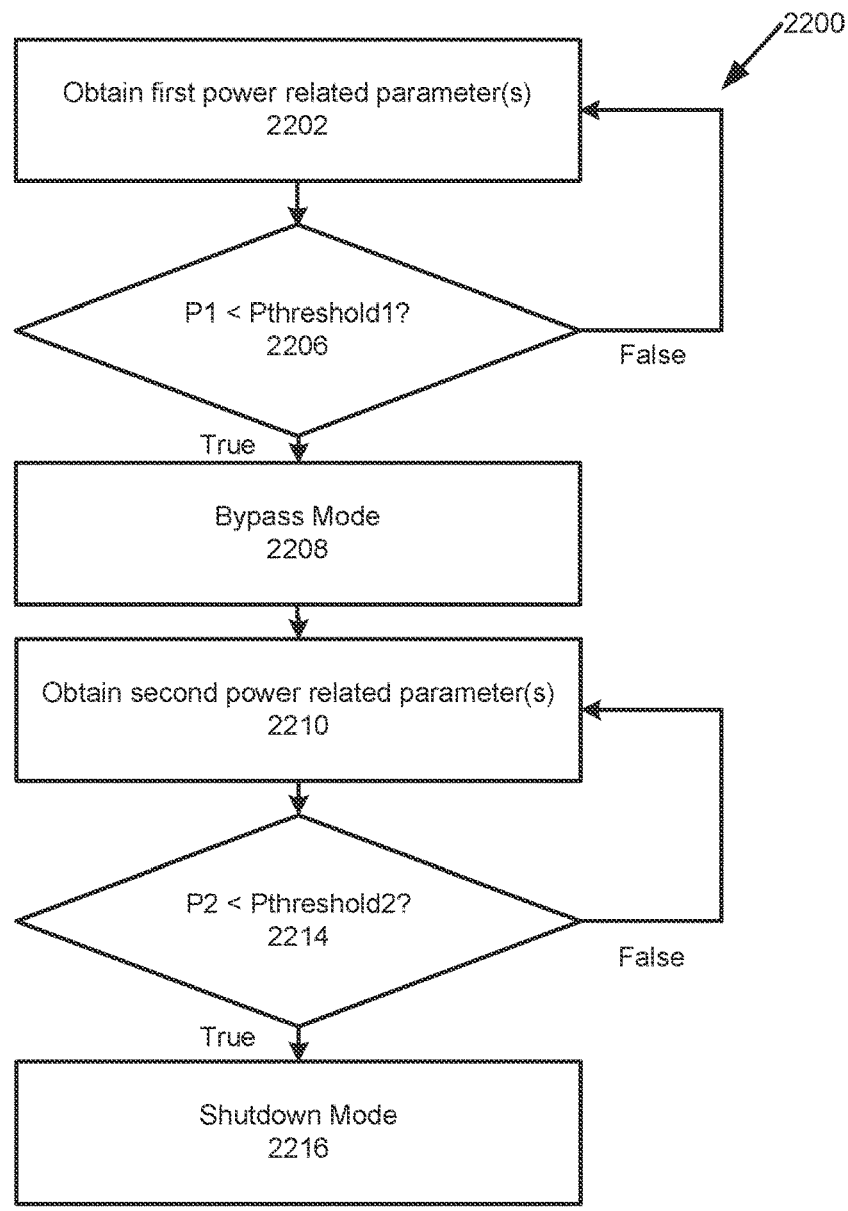
FIG. 22 shows a flow chart of a method for changing to a bypass mode of operation and to a shutdown mode of operation.

With reference to FIG. 22, a method 2200 is shown for changing the mode of operation of a power device to a bypass mode of operation or a shutdown mode of operation. The method 2200 shown in FIG. 22 may be part of the method 1900 shown in FIG. 19. For example, one or more steps of method 2200 may be part of step 1906 or step 1908 of method 1900.

In step 2202, a power related parameter may be obtained. This step may be performed using a power device 106, system power device 110, and/or a controller 116 of the power system 100. The power related parameter may be a current or relate to a current of one or more elements of the power system 100. For example, the one or more sensors 118 may be configured to detect a physical phenomenon (such as a change in temperature, color, shape, size, volume, etc.) related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may quantify an electrical parameter, such as a: current, voltage, power, irradiance, etc. The one or more elements of the power system 100 may be a switch Q or an inductor L of the power device 106 or the system power device 110. The one or more sensors 118 may be configured to detect the physical phenomenon either at an input or an output of the power device 106 or system power device 110, or the element of the power device 106 or system power devices 110. As an example, the power related parameter may be an output current of a string of power devices 106. In some examples the power related parameter may be the same as the temperature related parameter.

In step 2206, a determination may be made whether the power related parameter indicates a power value below a power threshold or not. This step may be performed using a power device 106, a system power device 110, and/or a controller 116 of the power system 100.

When in step 2206 the determination is that the power value is not below the power threshold, then there may be a return to step 2202.

When in step 2206 the determination is that the power value is below the power threshold, then the next step may be step 2208.

In step 2208, the mode of operation of the power device may be changed to bypass mode. This step may be performed using a power device 106 and/or a controller 116 of the power system 100. Changing the mode of operation of the power device 106 to the bypass mode of operation may be done to reduce the temperature of one or more elements of the power device, and may be done to avoid the shutdown mode of operation if possible. For example, in step 2208 the power device 106 may be changed to the bypass mode of operation by turning ON the high side switches Q1 and Q4 of the power converter 300.

In step 2210, a second power related parameter may be obtained. This step may be performed using a power device 106, a system power device 110, and/or a controller 116 of the power system 100. The second current related parameter may be a current or relate to a current of one or more elements of the power system 100. This step may be similar to step 2202.

In step 2214, a determination may be made whether the power related parameter indicates a power value below a second power threshold. The second power threshold may be less than the first power threshold. This step may be performed using a power device 106, a system power device 110, and/or a controller 116 of the power system 100. This step may be similar to step 2206.

When in step 2214 the determination is that the power value is not below the second power threshold, then there may be a return to step 2210.

When in step 2214 the determination is that the power value is below the second power threshold, then the next step may be step 2214.

As an example, the power value may be the output power of a power device and the power threshold may be a total power of a plurality of power devices. In step 2214, a decision may be made regarding whether the output power of the power device is significantly less than the total power. The total power may be of a plurality of power devices 106 that are connected in series, and that includes the given power device 106. This step may be performed using a power device 106 and/or a controller 116 of the power system 100. For example, the output power of the given power device 106 may be the second current related parameter obtained in step 2210. As another example, the output power of the given power device 106 may be determined using the second current related parameter obtained in step 2210. For example, the total power of the plurality of power devices 106 may be the second current related parameter obtained in step 2210. As another example, the total power of the plurality of power devices 106 may be determined using the second current related parameter obtained in step 2210.

When in step 2214, if the decision is that the output power of the power device is significantly less than the total power, then the next step may be step 2216.

When in step 2214, if the decision is that the power device is not significantly less than the total power, then there may be a return to step 2210.

In step 2216, the mode of operation of the power device may be changed to shutdown mode. This step may be performed using a power device 106, a system power device 110, and/or a controller 116 of the power system 100. Changing the mode of operation of the power device 106 to the shutdown mode of operation may be done to reduce the temperature of one or more elements of the power device. For example, in step 2216 the power device may be changed to the shutdown mode of operation by turning OFF all of the switches Q1-Q4 of the power converter 300.

In some examples, steps of method 2200 may be performed using a controller 112 or system power device 110 that is configured to communicate with and control one or more power devices 106.

As an example, a controller 116 associated with a power device 106 having a power converter 300 may obtain a first power related parameter (e.g., from a device such as: a sensor, a memory associated with a processor, etc.). The first power related parameter may be indicative of a power related to the power device 106 (e.g., an output power of the power device 106). The controller 116 associated with the power device 106 may determine whether the first power related parameter is less than a first power threshold. The first power threshold may be set in order to prevent a degraded operation of the power device 106, or to prevent inoperability of the power device 106 (e.g., due to overheating or even destruction of one or more elements of the power device due to excessive heat). If the first power related parameter is not below the first power threshold then the power device 106 and power converter 300 may continue operating in a non-bypass configuration, and not change to a bypass configuration. If the first power related parameter is below the first power threshold then the controller 116 may change the power device 106 and power converter 300 to a bypass configuration. The controller 116 associated with the power device 106 may then obtain a second power related parameter (e.g., from a device such as: a sensor, a memory associated with a processor, etc.). The second power related parameter may be indicative of a power related to the power device 106 (e.g., an output power of the power device 106). The controller 116 associated with the power device 106 may determine whether the second power related parameter is less than a second power threshold. The second power threshold may be less than the first power threshold. The second power threshold may also be set in order to prevent a degraded operation of the power device 106, or to prevent inoperability of the power device 106 (e.g., due to overheating or even destruction of one or more elements of the power device due to excessive heat). If the second power related parameter value is not below the second power threshold then the power device 106 and power converter 300 may continue operating in the bypass configuration, and not change to a shutdown configuration. If the second power related parameter is below the second power threshold then the controller 116 may change the power device 106 and power converter 300 to a shutdown configuration.

As an example, a controller 116 associated with a system power device 110 that is connected to a plurality of power devices 106 each having a power converter 300 may obtain a first power related parameter (e.g., from a device such as: a sensor, a memory associated with a processor, etc.). The first power related parameter may be indicative of a power related to one of the power devices 106 (e.g., an output power of that power device 106). The controller 116 associated with the system power device 110 may determine whether the first power related parameter is less than a first power threshold. The first power threshold may be set in accordance with a total power output of a plurality of power devices 106. For example, if there are 10 power devices 106 in a string 400, and the total output power is about 250 watts, the first power threshold may be set according to the total power/number of power devices (e.g., 250/10=25 watts), which is the average power per power device 106. As an example, the first power threshold may be less than the average power per device (and much less than the total power), for example, the first power threshold in this example may be about 5 watts. If the first power related parameter is not below the first power threshold then the power device 106 and power converter 300 may continue operating in a non-bypass configuration, and not change to a bypass configuration. If the first power related parameter is below the first power threshold then the controller 116 may change the power device 106 and power converter 300 to a bypass configuration. Changing the mode of operation of the power device 106 to the bypass mode of operation may be done to reduce the temperature of one or more elements of the power device, and may be done to avoid the shutdown mode of operation if possible. The controller 116 associated with the power device 106 may then obtain a second power related parameter (e.g., from a device such as: a sensor, a memory associated with a processor, etc.). The second power related parameter may be indicative of a power related to the one power device 106 (e.g., an output power of that power device 106). The controller 116 associated with the power device 106 may determine whether the second power related parameter is less than a second power threshold. The second power threshold may be less than the first power threshold. The second power threshold may also be set in order to prevent a degraded operation of the power device 106, or to prevent inoperability of the power device 106 (e.g., due to overheating or even destruction of one or more elements of the power device due to excessive heat). The second power threshold may also be set in accordance with a total power output of a plurality of power devices 106. Continuing the example above, if there are 10 power devices 106 in a string 400, and the total output power is about 250 watts, the second power threshold may be set according to the total power/number of power devices (e.g., 250/10=25 watts), which is the average power per power device 106. As an example, the second power threshold may be less than the first power threshold and much less than the average power per device (and much, much less than the total power), for example, the second power threshold in this example may be about 1 watt. If the second power related parameter value is not below the second power threshold then the power device 106 and power converter 300 may continue operating in the bypass configuration, and not change to a shutdown configuration. If the second power related parameter is below the second power threshold then the controller 116 may change the power device 106 and power converter 300 to a shutdown configuration. Changing the mode of operation of the power device 106 to the shutdown mode of operation may be done to reduce the temperature of one or more elements of the power device.

Figure 23:
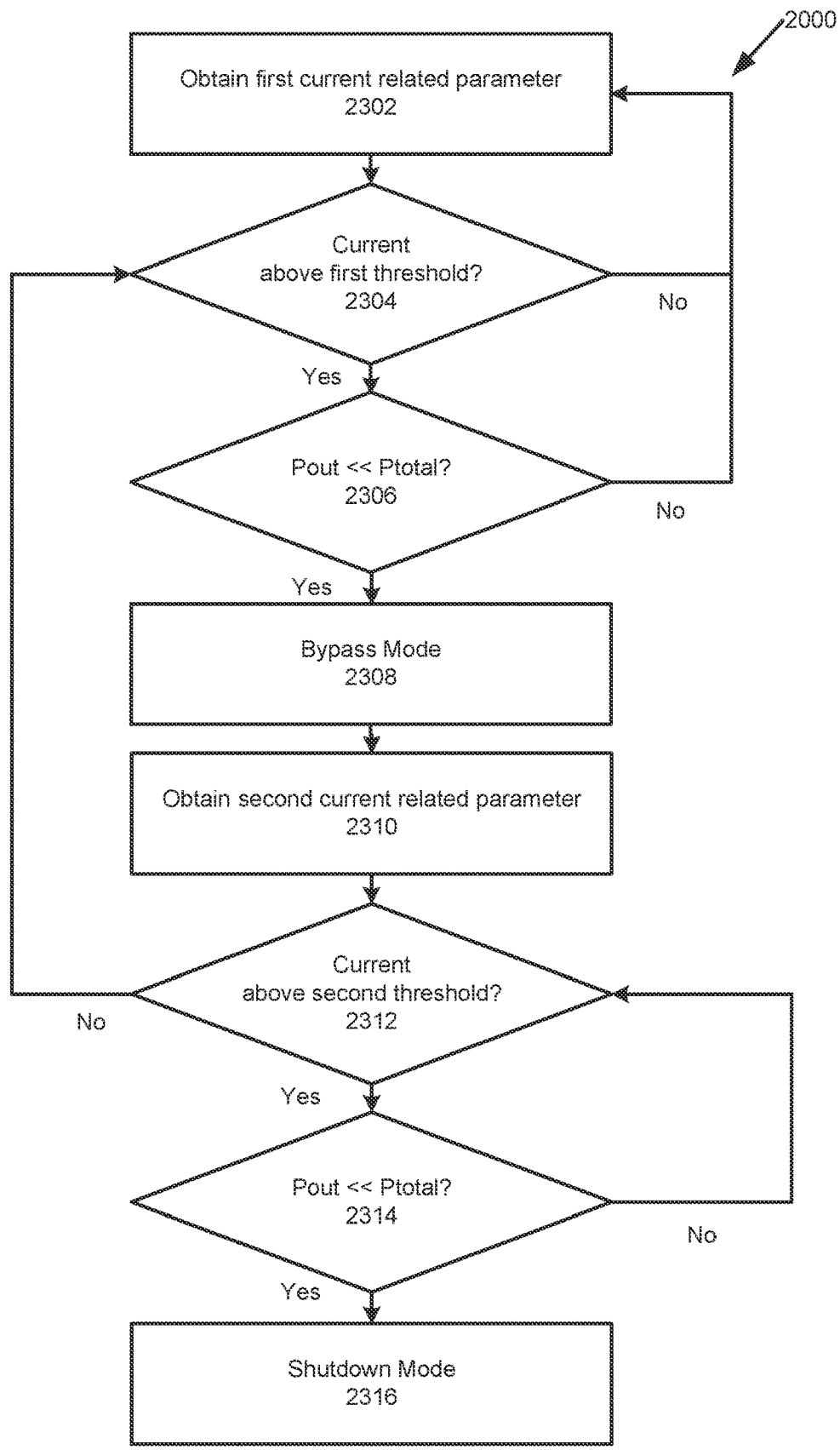
FIG. 23 shows a flow chart of a method for changing to a bypass mode of operation and to a shutdown mode of operation.

With reference to FIG. 23, a method 2300 is shown for changing the mode of operation of a power device to a bypass mode of operation or a shutdown mode of operation. The method 2300 shown in FIG. 23 may be part of the method 1900 shown in FIG. 19. For example, one or more steps of method 2300 may be part of step 1906 or step 1908 of method 1900.

In step 2302, a current related parameter may be obtained. This step may be performed using a power device 106 and/or a controller 116 of the power system 100. The current related parameter may be a current or relate to a current of one or more elements of the power system 100. For example, the one or more sensors 118 may be configured to detect a physical phenomenon (such as a change in temperature, color, shape, size, volume, etc.) related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may quantify an electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106. As an example, the current related parameter may be an output current of the power device 106. In some examples the current related parameter may be the same as the temperature related parameter.

In step 2304, a decision may be made whether the current related parameter indicates a current value above a current threshold. This step may be performed using a power device 106 and/or a controller 116 of the power system 100. As an example, the current related parameter may be an output current of the power device 106 that is above or below the current threshold. As another example, the current related parameter may be a voltage of the power device 106 (e.g., an output voltage) and the value of the voltage may indicate that a current related to the power device 106 is above or below a threshold. The current value being above the threshold may indicate that the temperature related to the power device 106 may need to be managed by changing the power device 106 to a bypass mode of operation. This may be after the power device has already been changed from a power tracking mode of operation to operate in a power reduction mode of operation (e.g., a temperature management mode of operation).

When in step 2304, if the decision is that the current value is not above the current threshold, then there may be a return to step 2302.

When in step 2304, if the decision is that the current value is above the current threshold, then the next step may be step 2306.

In step 2306, a decision may be made regarding whether the output power of the power device is significantly less than a total power. The total power may be of a plurality of power devices 106 that are connected in series, and that includes the given power device 106. This step may be performed using a power device 106 and/or a controller 116 of the power system 100. For example, the output power of the given power device 106 may be the parameter obtained in step 2302. As another example, the output power of the given power device 106 may be determined using the parameter obtained in step 2302. For example, the total power of the plurality of power devices 106 may be the parameter obtained in step 2302. As another example, the total power of the plurality of power devices 106 may be determined using the parameter obtained in step 2302. As an example, the decision whether the output power of the power device is significantly less than a total power may include determining whether a power value (e.g., the output power Pout of the power device 106) is below a power threshold.

When in step 2306, if the decision is that the output power of the power device is significantly less than the total power, then the next step may be step 2308.

When in step 2306, if the decision is that the power device is not significantly less than the total power, then there may be a return to step 2302.

In step 2308, the mode of operation of the power device may be changed to bypass mode. This step may be performed using a power device 106 and/or a controller 116 of the power system 100. Changing the mode of operation of the power device 106 to the bypass mode of operation may be done to reduce the temperature of one or more elements of the power device, and may be done to avoid the shutdown mode of operation if possible. For example, in step 2308 the power device 106 may be changed to the bypass mode of operation by turning ON the high side switches Q1 and Q4 of the power converter 300.

In step 2310, a second current related parameter may be obtained. This step may be performed using a power device 106 and/or a controller 116 of the power system 100. The second current related parameter may be a current or relate to a current of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may be an electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106. As an example, the current related parameter may be an output current of the power device 106.

In step 2312, a decision is made whether the current related parameter indicates a current value above a second current threshold. This step may be performed using a power device 106 and/or a controller 116 of the power system 100. As an example, the current related parameter may be an output current of the power device 106 that is above or below the second current threshold. As another example, the current related parameter may be a voltage of the power device 106 (e.g., an output voltage) and the value of the voltage may indicate that a current related to the power device 106 is above or below a second threshold. The current value being above the second threshold may indicate that the temperature related to the power device 106 may need to be managed by changing the power device 106 to a shutdown mode of operation. This may be after the power device was changed to operate in a bypass mode of operation.

When in step 2312, if the decision is that the current value is not above the second current threshold, then there may be a return to step 2304.

When in step 2312, if the decision is that the current value is above the second current threshold, then the next step may be step 2314.

In step 2314, a decision may be made regarding whether the output power of the power device is significantly less than a total power. The total power may be of a plurality of power devices 106 that are connected in series, and that includes the given power device 106. This step may be performed using a power device 106 and/or a controller 116 of the power system 100. For example, the output power of the given power device 106 may be the second current related parameter obtained in step 2310. As another example, the output power of the given power device 106 may be determined using the second current related parameter obtained in step 2310. For example, the total power of the plurality of power devices 106 may be the second current related parameter obtained in step 2310. As another example, the total power of the plurality of power devices 106 may be determined using the second current related parameter obtained in step 2310.

When in step 2314, if the decision is that the output power of the power device is significantly less than the total power, then the next step may be step 2316.

When in step 2314, if the decision is that the power device is not significantly less than the total power, then there may be a return to step 2310.

In step 2316, the mode of operation of the power device may be changed to shutdown mode. This step may be performed using a power device 106 and/or a controller 116 of the power system 100. Changing the mode of operation of the power device 106 to the shutdown mode of operation may be done to reduce the temperature of one or more elements of the power device. For example, in step 2316 the power device may be changed to the shutdown mode of operation by turning OFF all of the switches Q1-Q4 of the power converter 300.

As an example, a controller 116 associated with a power device 106 having a power converter 300 may obtain a first output current value. The first output current value may be indicative of the current at an output terminal of a converter 300 of the power device 106. The controller 116 associated with the power device 106 may determine whether the first output current value is greater than a first current threshold. If the first output current value is not above the first current threshold then the power device 106 and power converter 300 may continue operating in a non-bypass configuration, and not change to a bypass configuration. If the first output current value is above the first current threshold then the controller 116 may determine whether a first power related parameter is less than a first power threshold. If the first power related parameter is not below the first power threshold then the power device 106 and power converter 300 may continue operating in a non-bypass configuration, and not change to a bypass configuration. If the first power related parameter is below the first power threshold then the controller 116 may change the power device 106 and power converter 300 to a bypass configuration. The controller 116 associated with the power device 106 may then obtain a second output current value. The second output current value may be indicative of the current at an output terminal of a converter 300 of the power device 106. The controller 116 associated with the power device 106 may determine whether the second output current value is greater than a second current threshold. If the second output current value is not above the second current threshold then the power device 106 and power converter 300 may continue operating in the bypass configuration, and not change to a shutdown configuration. If the second output current value is above the second current threshold then the controller 116 associated with the power device 106 may determine whether a second power related parameter is less than a second power threshold. The second power threshold may be less than the first power threshold. If the second power related parameter value is not below the second power threshold then the power device 106 and power converter 300 may continue operating in the bypass configuration, and not change to a shutdown configuration. If the second power related parameter is below the second power threshold then the controller 116 may change the power device 106 and power converter 300 to a shutdown configuration.

As another example, a controller 116 associated with a system power device 110 may obtain a first output current value. The first output current value may be indicative of the current at an output terminal of a converter 300 of the power device 106. The controller 116 associated with the system power device 110 may determine whether the first output current value is greater than a first current threshold. If the first output current value is not above the first current threshold then the power device 106 and power converter 300 may continue operating in a non-bypass configuration, and not change to a bypass configuration. If the first output current value is above the first current threshold then the controller 116 may determine whether a first power related parameter is less than a first power threshold. If the first power related parameter is not below the first power threshold then the power device 106 and power converter 300 may continue operating in a non-bypass configuration, and not change to a bypass configuration. If the first power related parameter is below the first power threshold then the controller 116 may change the power device 106 and power converter 300 to a bypass configuration. The controller 116 associated with the system power device 110 may then obtain a second output current value. The second output current value may be indicative of the current at an output terminal of the converter 300 of the power device 106. The controller 116 associated with the system power device 110 may determine whether the second output current value is greater than a second current threshold. If the second output current value is not above the second current threshold then the power device 106 and power converter 300 may continue operating in the bypass configuration, and not change to a shutdown configuration. If the second output current value is above the second current threshold then the controller 116 associated with the power device 106 may determine whether a second power related parameter is less than a second power threshold. The second power threshold may be less than the first power threshold. If the second power related parameter value is not below the second power threshold then the power device 106 and power converter 300 may continue operating in the bypass configuration, and not change to a shutdown configuration. If the second power related parameter is below the second power threshold then the controller 116 may change the power device 106 and power converter 300 to a shutdown configuration.

As another example, a controller 116 associated with a power device 106 having a power converter 300 may obtain a first output current value. The first output current value may be indicative of the current at an output terminal of a converter 300 of the power device 106. The controller 116 associated with the power device 106 may determine whether the first output current value is greater than a first current threshold. If the first output current value is not above the first current threshold then the power device 106 and power converter 300 may continue operating in a non-bypass configuration, and not change to a bypass configuration. If the first output current value is above the first current threshold then a controller 116 associated with the system power device 110 may determine whether a first power related parameter (e.g., an output power of the power device 106) is less than a first power threshold (e.g., related to a total output power of a plurality of power devices 106). If the first power related parameter is not below the first power threshold then the power device 106 and power converter 300 may continue operating in a non-bypass configuration, and not change to a bypass configuration. If the first power related parameter is below the first power threshold then a controller 116 associated with the power device 106 and/or the system power device 110 may change the power device 106 and power converter 300 to a bypass configuration. The controller 116 associated with the power device 106 may then obtain a second output current value. The second output current value may be indicative of the current at an output terminal of the converter 300 of the power device 106. The controller 116 associated with the power device 106 may determine whether the second output current value is greater than a second current threshold. If the second output current value is not above the second current threshold then the power device 106 and power converter 300 may continue operating in the bypass configuration, and not change to a shutdown configuration. If the second output current value is above the second current threshold then the controller 116 associated with the system power device 110 may determine whether a second power related parameter (e.g., an output power of the power device 106) is less than a second power threshold (e.g., related to a total output power of a plurality of power devices 106). The second power threshold may be less than the first power threshold. If the second power related parameter value is not below the second power threshold then the power device 106 and power converter 300 may continue operating in the bypass configuration, and not change to a shutdown configuration. If the second power related parameter is below the second power threshold then the controller 116 associated with the power device 106 and/or the system power device 110 may change the power device 106 and power converter 300 to a shutdown configuration.

Figure 24:
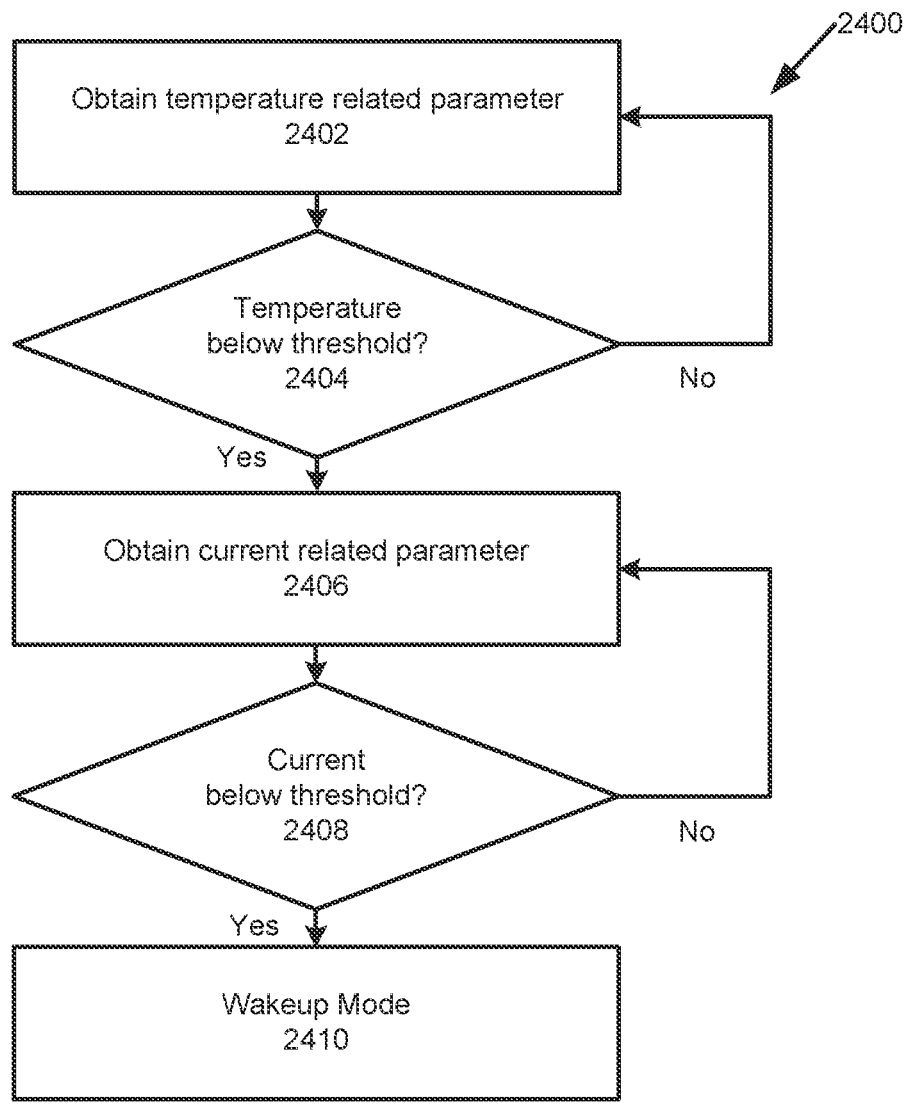
FIG. 24 shows a flow chart of a method for changing to a wakeup mode of operation.

With reference to FIG. 24, a method 2400 is shown for changing the mode of operation of a power device to a wakeup mode of operation. For example, the power device may be changed to the wakeup mode of operation after operating in a shutdown mode of operation, or at the beginning of the day. In some examples wakeup may be dependent on a time related parameter (e.g., time of day, or after a time delay following shutdown), a temperature related parameter (e.g., temperature or current, such as, an output current indicative of a temperature), a power related parameter (e.g., an output current and/or output voltage indicative of an output power), and/or any other relevant electrical parameter related to the power system. The example of FIG. 24 may be in the case where the power device has no output bypass diode, so that a current may flow through the low side MOSFETs. In such a case, the power device may not be able to wake up to a relatively high current. For example, if the power device were to wake up to a relatively high current it may revert relatively quickly to shutdown. In some examples there may be a hysteretic wakeup configuration to avoid constant shutdowns.

In step 2402, a temperature related parameter may be obtained. This step may be performed using a power device 106 and/or a controller 116 of the power system 100. The temperature related parameter may be a temperature or relate to a temperature of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may be an electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106.

In step 2404, a decision may be made whether the temperature related parameter indicates a temperature value below a threshold. This step may be performed using a power device 106 and/or a controller 116 of the power system 100. As an example, the temperature related parameter may be a temperature of a switch Q of the power device 106 and the value of the temperature may be below a threshold. As another example, the temperature related parameter may be a current at an output of the inductor and the value of the current may indicate that a temperature related to the inductor is below a threshold. The temperature value being below the threshold may positively affect the performance of the power device, or element of the power device (e.g., inductor).

When in step 2404, if the decision is that the temperature value is not below the threshold, then there may be a return to step 2402.

When in step 2404, if the decision is that the temperature value is below the threshold, then the next step may be step 2406.

In step 2406, a current related parameter may be obtained. This step may be performed using a power device 106 and/or a controller 116 of the power system 100. The current related parameter may be a current or relate to a current of one or more elements of the power system 100. For example, the one or more sensors 118 may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). The value or parameter may be an electrical parameter, such as a: current, voltage, power, irradiance, etc. The one or more elements of the power system 100 may be a switch Q or an inductor L of the power device 106. The one or more sensors 118 may be configured to detect the physical phenomenon either at an input or an output of the power device 106 or the element of the power device 106. As an example, the parameter may be an output current of the power device 106.

In step 2408, a decision may be made whether the current related parameter indicates a current value below a current threshold. This step may be performed using a power device 106 and/or a controller 116 of the power system 100. For example, the current threshold of step 2408 may be the same current threshold as step 504 or the same current threshold as step 512 of method 500. As an example, the current related parameter may be an output current of the power device 106 that is above or below the current threshold. As another example, the current related parameter may be a voltage of the power device 106 (e.g., an output voltage) and the value of the voltage may indicate that a current related to the power device 106 is above or below a threshold. The current value being above the threshold may indicate that the temperature related to the power device 106 may need to be managed by not changing the power device 106 to a wakeup mode of operation. This may be after the power device was changed to operate in a shutdown mode of operation. The current value being below the threshold may indicate that the temperature related to the power device 106 may not need to be managed by the power device remaining in the shutdown mode of operation, and the power device 106 may proceed to operate in the wakeup mode of operation. As an example, when the current value is below one threshold but above a different threshold then the power device may proceed to the wakeup mode of operation but may thereafter change to the power reduction mode of operation (e.g., a temperature management mode of operation, as opposed to a power tracking mode of operation).

When in step 2408, if the decision is that the current value is not below the current threshold, then there may be a return to step 2406. In some examples there may be a return to step 2402.

When in step 2408, if the decision is that the current value is below the current threshold, then the next step may be step 2410.

In step 2410, the mode of operation of the power device may be changed to the wakeup mode of operation. This step may be performed using a power device 106 and/or a controller 116 of the power system 100. Changing the mode of operation of the power device 106 to the wakeup mode of operation may be done after reducing the temperature of one or more elements of the power device. For example, in step 2410 the power device 106 may be changed to the wakeup mode of operation by turning ON one or more switches Q of the power converter 300. After the wakeup mode of operation the power device 106 may be operated in a power tracking mode of operation (e.g., a non-temperature management mode of operation, as opposed to a temperature management mode of operation). For example, in the power tracking mode of operation a voltage or current of the power device 106 (e.g., at the input or output of the power device 106) may be controlled according to an algorithm (e.g. a maximum power point tracking [MPPT] algorithm).

As an example, a controller 116 associated with a power device 106 having a power converter 300 may obtain a temperature value (e.g., from a device such as: a sensor, a memory associated with a processor, etc.). The temperature value may be indicative of the temperature of one or more elements of the power device 106. The temperature value may be a sensed temperature value related to an ambient temperature around one or more elements of the power device 106. The controller 116 associated with the power device 106 may determine whether the temperature value is less than a temperature threshold. The temperature threshold may be set in order to prevent a degraded operation of the power device 106, or to prevent inoperability of the power device 106 (e.g., due to overheating or even destruction of one or more elements of the power device due to excessive heat). If the temperature value is not less than the temperature threshold then the power device 106 and power converter 300 may continue to remain in a shutdown configuration, and not change to a wakeup configuration. If the temperature value is below the temperature threshold then the controller 116 may obtain a current related parameter (e.g., from a device such as: a sensor, a memory associated with a processor, etc.). The first current related parameter may be indicative of the current flowing through one or more elements of the power device 106. The controller 116 associated with the power device 106 may determine whether the current related parameter is less than a current threshold. The current threshold may be set in order to prevent a degraded operation of the power device 106, or to prevent inoperability of the power device 106 (e.g., due to overheating or even destruction of one or more elements of the power device due to excessive heat). If the current related parameter is not less than the current threshold then the power device 106 and power converter 300 may remain in a shutdown configuration, and not change to a wakeup configuration. If the current related parameter is less than the current threshold then the controller 116 may change the power device 106 and power converter 300 to a wakeup configuration.

Figure 50:
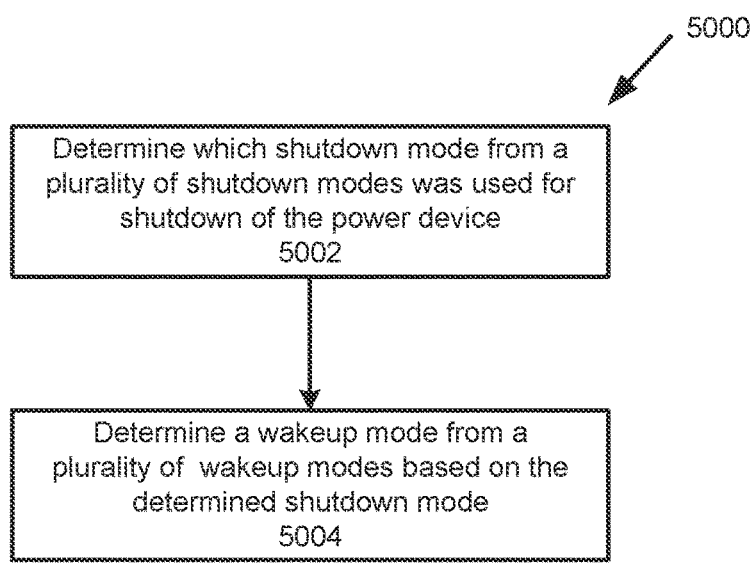
FIG. 50 shows a flow chart of a method for determining a wakeup mode of operation.

With reference to FIG. 50, a method 5000 is shown for determining a wakeup mode of operation of a power device. For example, the power device may have a plurality of wakeup modes of operation. As an example the wakeup modes of operation may include a wakeup mode of operation where an input voltage is decreased and/or an input current is increased (also referred to herein as "wakeup from the right", since the operating point of the power device starts on the right side of the I-V curve and moves towards the left side of the I-V curve). The wakeup modes of operation may include a wakeup mode of operation where an input voltage is increased and/or an input current is decreased (also referred to herein as "wakeup from the left", since the operating point of the power device starts on the left side of the I-V curve and moves towards the right side of the I-V curve). The power device may also have a plurality of shutdown modes of operation. As an example the shutdown modes of operation may include a shutdown mode of operation where an input voltage is increased and/or an input current is decreased until the input voltage is about an open circuit voltage and the input current is about zero (also referred to herein as "shutdown to the right", since the operating point of the power device moves to the right end of the I-V curve during shutdown). The shutdown modes of operation may include a shutdown mode of operation where an input voltage is decreased and/or an input current is increased until the input voltage is about zero and the input current is about a short circuit current (also referred to herein as "shutdown to the left", since the operating point of the power device moves to the left end of the I-V curve during shutdown). The power device may be changed to one of the wakeup modes of operation after operating in one of the shutdown modes of operation, or at the beginning of the day. The example of FIG. 50 may be part of other methods shown herein. For example, method 5000 may be included in step 2410 of FIG. 24.

In step S002, a determination may be made regarding which shutdown mode was last used to shutdown the power device. This step may be performed using a power device 106 and/or a controller 116 of the power system 100. For example, the controller 116 may include memory that stores information regarding which shutdown mode was last used to shutdown the power device 106 (e.g., shutdown to the left, shutdown to the right, etc.). The term "last used" (e.g., "last used shutdown mode") may be used interchangeably herein with the term "previous" (e.g., "previous shutdown mode") or the term "most recent" (e.g., "most recent shutdown mode").

In step S004, a determination may be made regarding which wakeup mode is to be used to wake up the power device. The determination in step S004 may be based on the shutdown mode determined in step S002. This step may be performed using a power device 106 and/or a controller 116 of the power system 100. For example, the controller 116 may include a processor that processes information regarding which wakeup mode to use based on which shutdown mode was last used to shutdown the power device 106 (e.g., wakeup from the left, wakeup to the right, etc.). As an example, wakeup from the left may be selected if the last used shutdown was shutdown to the left. Wakeup from the right may be selected if the last used shutdown was shutdown to the right. As another example, wakeup from the left may be selected if the last used shutdown was shutdown to the right. Wakeup from the right may be selected if the last used shutdown was shutdown to the left. The determination of which wakeup mode is selected may also be based on other factors.

As an example, a controller 116 associated with a power device 106 having a power converter 300 may determine a shutdown mode of operation that was last used to shutdown the power device 106. The controller 116 may then select a wakeup mode of operation to wake up the power device 106 based on the shutdown mode of operation that was last used to shut down the power device 106.

In some examples the wakeup mode of operation may be selected based on an input current and/or an input voltage. For example, if the input current is about a short circuit current and/or the input voltage is about zero then wakeup from the left may be selected. If the input current is about zero and/or the input voltage is about an open circuit voltage then wakeup from the right may be selected.

In some examples, the shutdown mode of operation may be selected based on another mode of operation of the power device (e.g., boost mode, buck mode, bypass mode, etc.) that is used prior to the shutdown mode of operation. For example, the last used conversion mode may be determined to select the shutdown mode of operation. As an example, if the last used conversion mode was boost mode then shutdown to the left may be selected and if the last used conversion mode was buck mode then shutdown to the right may be selected, or vice versa. As another example, if the last used mode of operation was bypass mode then shutdown to the left may be selected. As another example, if the last used mode of operation was bypass mode then shutdown to the right may be selected.

In some examples, the shutdown mode of operation may be selected based on a power reduction mode of operation of the power device that is used prior to the shutdown mode of operation. For example, the last used power reduction mode may be determined to select the shutdown mode of operation. As an example, if the last used conversion mode was a power reduction mode arranged to reduce power by reducing an input current or increasing an input voltage then shutdown to the left may be selected and if the last used conversion mode was a power reduction mode arranged to reduce power by reducing an input voltage or increasing an input current then shutdown to the right may be selected, or vice versa.

FIGS. 25-42 show examples of various graphs of the current and voltage curve 700 (I-V curve) of a power device according to examples of the present subject matter.

Figure 25:
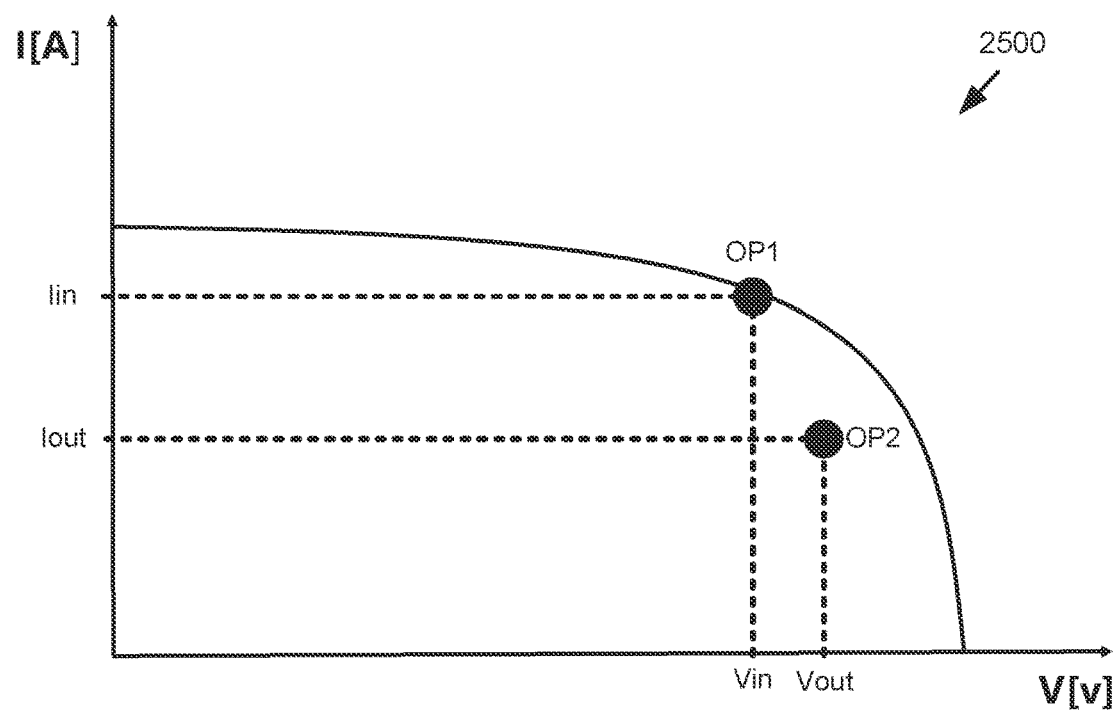
FIG. 25 shows an example graph of a current and voltage curve.

FIG. 25 shows an example of the power device operating in a non-bypass mode of operation. For example, the power device 106 may be operating in a power reduction mode of operation (as opposed to a power tracking mode of operation). For example, the power device 106 may be operating in a power conversion mode of operation (whereas the bypass mode of operation and the shutdown mode of operation are non-power conversion modes of operation). In the example of FIG. 25 the power device 106 is operating in a boost mode of power conversion. The output voltage (Vout) is greater than the input voltage (Vin), and the output current (Iout) is less than the input current (Iin). The operating point OP1 (Vin, Iin) may be controlled to try to reduce a power related to the power device 106 in order to try to reduce a temperature related to the power device 106 (this may differ from the power tracking mode of power conversion where the operating point may be controlled according to a power tracking algorithm, such as, an MPPT algorithm).

Figure 26:
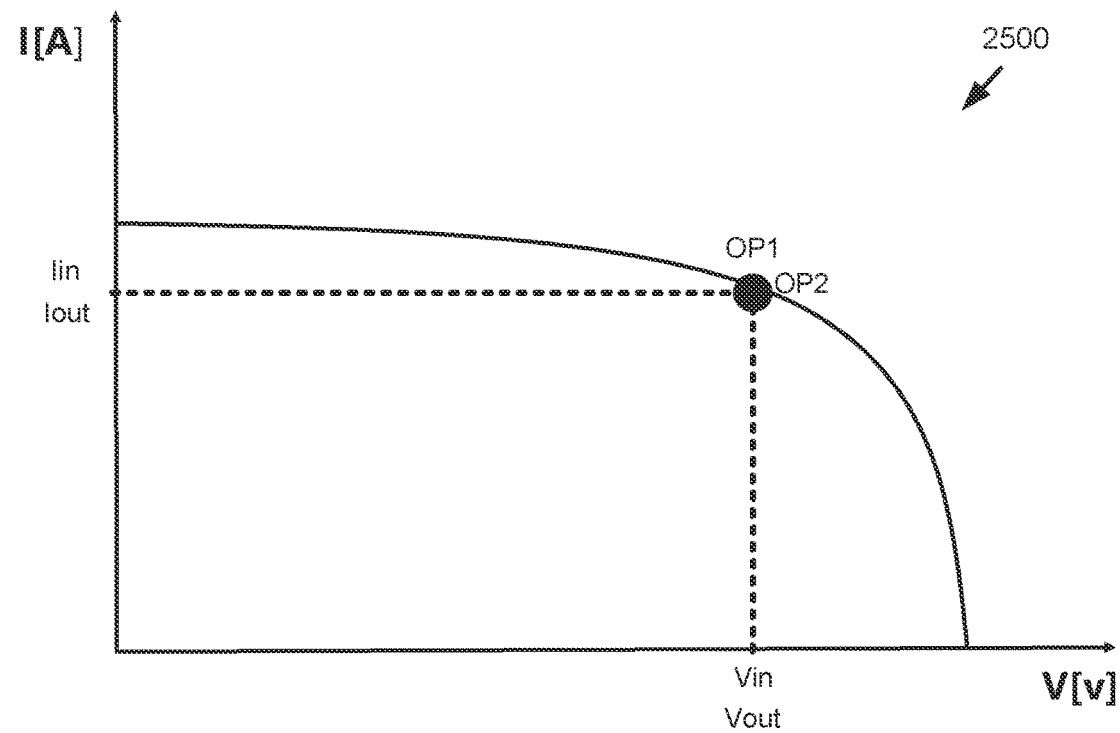
FIG. 26 shows an example graph of a current and voltage curve.

FIG. 26 shows an example of the power device operating in a bypass mode of operation (as opposed to a power tracking mode of operation, power reduction mode of operation, or shutdown mode of operation). For example, the power device 106 may be operating in a non-power conversion mode of operation. For example, after an increase of output current Iout (e.g., due to one or more elements of the power system 100, e.g., one or more other power devices 106) there may be an increase of a temperature related to one or more elements of the power device 106. After a determination that the temperature value is above a threshold (as shown in step 1904) and a determination that the power device 106 should change mode of operation (as shown in step 1906), then the power device 106 may be changed to a bypass mode of operation (as shown in step 1908). As a result the operating point OP1 (Iin, Vin) will be about equal to the operating point OP2 (Iout, Vout). The input voltage Vin and input current Iin may be about equal to the output voltage Vout and the output current Iout, respectively, in bypass mode (which as mentioned above may be a non-power conversion mode of operation). For example, the determination that the power device 106 should change mode of operation (as shown in step 1906) may include obtaining at least one first parameter related to the power device 106 (as shown in step 2302), determining that a current value (e.g., related to the output current Iout) is above a first current threshold, such as, a bypass current threshold (e.g., as shown in step 2304, and as shown in FIG. 26 where the output current Iout is greater than the output current Iout in FIG. 25). The determination that the power device 106 should change mode of operation may include determining that a power (e.g., the output power Pout) is substantially less than a total power (e.g., as shown in step 2306). Changing the mode of operation of the power device 106 to a bypass mode of operation (as shown in step 2308) may include turning ON a plurality of switches (e.g., the high side switches Q1 and Q4) of the power converter 300 (as shown in FIG. 3C). Controlling the power device 106 to operate in the bypass mode of operation may be done to reduce the temperature related to one or more elements of the power device 106.

Changing the power device 106 to the bypass mode of operation may include transmitting one or more communication signals to one or more other power devices 106 or one or more system power devices 110. The one or more communication signals may be a bypass signal that includes an indication (e.g., one or more bits) that indicate the power device 106 is changing to the bypass mode of operation.

Figure 27:
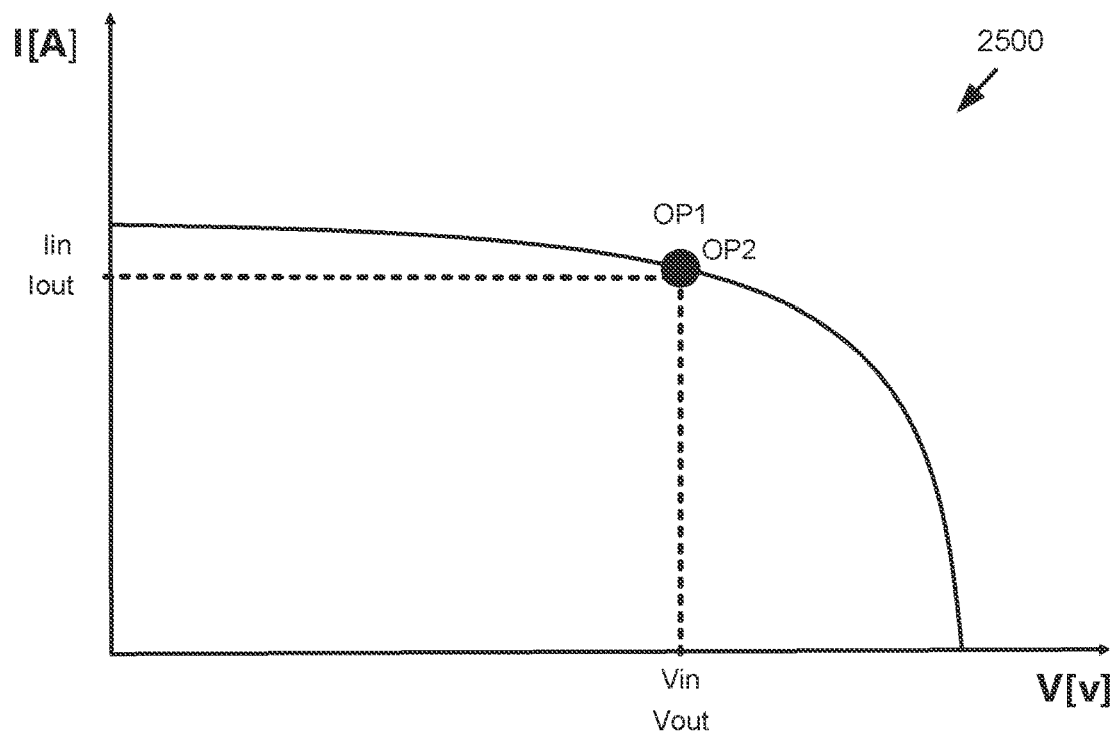
FIG. 27 shows an example graph of a current and voltage curve.

FIG. 27 shows an example of when the power device continues operating in the bypass mode of operation. In the bypass mode of operation the operating point OP1 may be set by string parameters and/or system level parameters. For example, in the case that the power device 106 is part of a serial string of a plurality of power devices 106 that are connected in series, the input current of the power device 106 and the output current of the power device 106 may be about equal to the string current of the plurality of series connected power devices 106 (e.g., Iin=Iout=Istring). For example, after a determination to operate in the bypass mode of operation (as shown in step 2308) at least one second parameter related to the power device may be obtained (as shown in step 2310), and a determination may be made that a current value (e.g., related to the output current Iout) is not above a second current threshold, such as, a shutdown current threshold (as shown in step 2312), but is above the first current threshold, such as, the bypass current threshold (e.g., as shown in step 2304, and as shown in FIG. 27 where the output current Iout is greater than the output current Iout in FIG. 26). So, the power device 106 may continue to operate in the bypass mode of operation (as shown in step 2308) even though the output current Iout increased. In some examples, the first parameter may be the same as the second parameter. Controlling the power device 106 to continue to operate in the bypass mode of operation may be done to reduce a temperature related to one or more elements of the power device 106.

Figure 28:
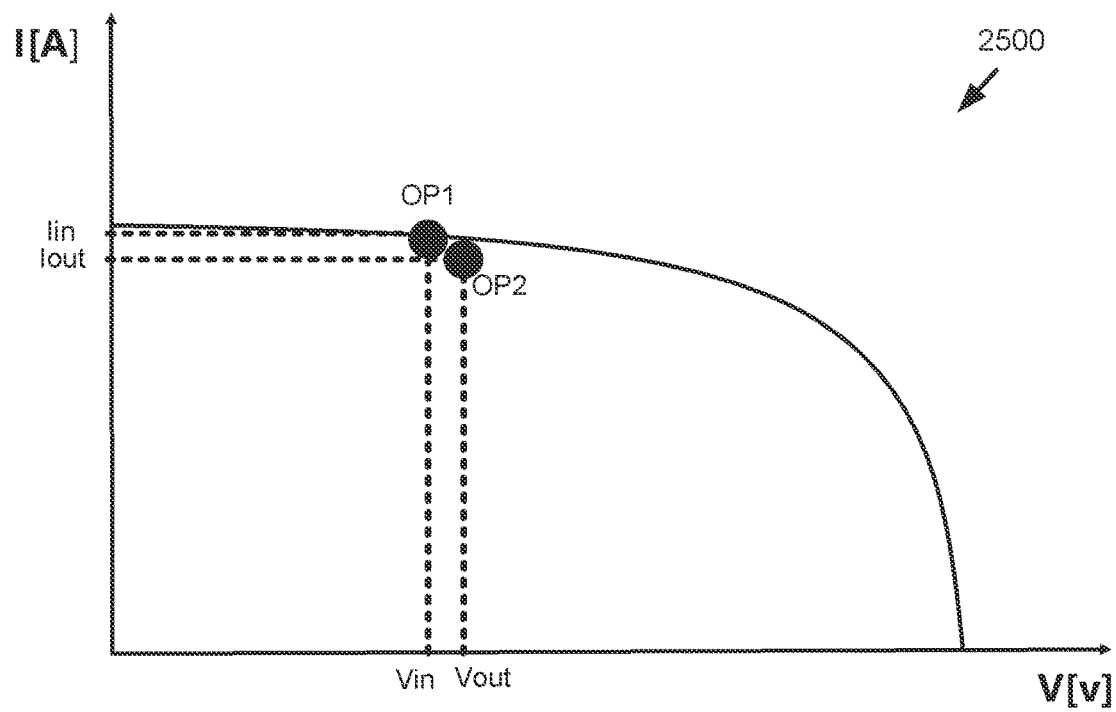
FIG. 28 shows an example graph of a current and voltage curve.

FIG. 28 shows an example of the power device operating in a power reduction mode of operation. For example, when the output current Iout increases, then before changing to the shutdown mode of operation the power device 106 may first attempt to reduce a temperature by operating in a power reduction mode of operation. For example, the power device 106 may control a voltage (e.g., the input voltage Vin) or a current (e.g., the input voltage Iin) to try to reduce a power related to the power device 106 in order to try to reduce the temperature related to the power device 106. FIG. 28, shows an increased output current Iout relative to the output current Iout of FIG. 28. In the power reduction mode of operation the power device 106 may be operating in a buck mode of operation, in a boost mode of operation, in a buck-boost mode of operation, or in a bypass mode of operation. For example, the power device may be bucking (reducing) the output voltage Vout relative to the input voltage Vin, or boosting (increasing) the output voltage Vout relative to the input voltage Vin, or maintaining the output voltage at a level about the same level as the input voltage. In the example of FIG. 27 the power device 106 is operating in a boost mode of operation. The output voltage (Vout) is greater than the input voltage (Vin), and the output current (Iout) is less than the input current (Iin). The operating point OP1 (Vin, Iin) may be controlled to try to reduce a power related to the power device 106 in order to try to reduce a temperature related to the power device 106

Figure 29:
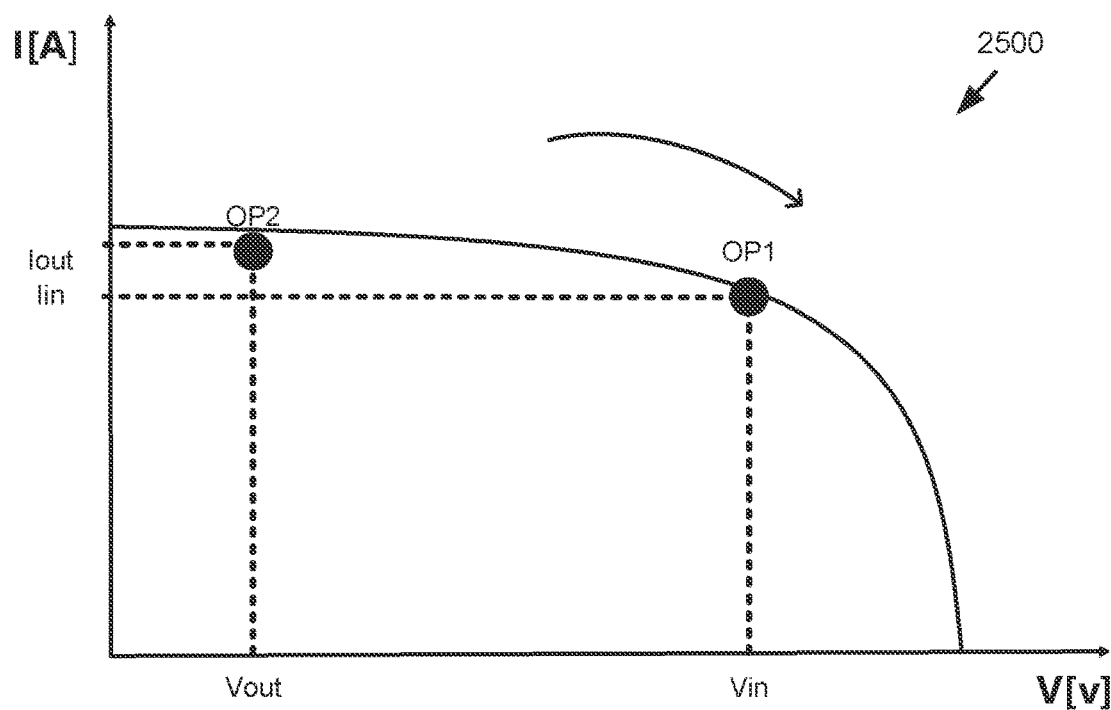
FIG. 29 shows an example graph of a current and voltage curve.

FIG. 29 shows an example of the power device changing to a shutdown mode of operation.

For example, after a determination to operate in a bypass mode of operation (as shown in step 2308) at least one second parameter related to the power device may be obtained (as shown in step 2310), and a determination may be made that a current value (e.g., related to the output current Iout) is above a second current threshold, such as, a shutdown current threshold (e.g., as shown in step 2312, and as shown in FIG. 29 where the output current Iout is greater than the output current Iout in FIG. 28). So, the power device 106 may change to operate in the shutdown mode of operation (as shown in step 2316). In some examples, the first parameter may be the same as the second parameter. The determination that the power device 106 should change mode of operation may include determining that a power (e.g., the output power Pout) is substantially less than a total power (e.g., as shown in step 2314). Changing the mode of operation of the power device 106 to a shutdown mode of operation (as shown in step 2316) may include turning OFF a plurality of switches Q of the power converter 300 (as shown in FIG. 3B). Controlling the power device 106 to operate in the shutdown mode of operation may be done to reduce the temperature related to one or more elements of the power device 106. Changing the power device 106 to the shutdown mode of operation may include reducing an input current Iin (towards about zero current) or increasing an input voltage Vin to an open circuit voltage (Voc). Changing the power device 106 to the shutdown mode of operation may include transmitting one or more communication signals to one or more other power devices 106 or one or more system power devices 110. The one or more communication signals may be a shutdown signal that includes an indication (e.g., one or more bits) that indicate the power device 106 is changing to the shutdown mode of operation.

Figure 30:
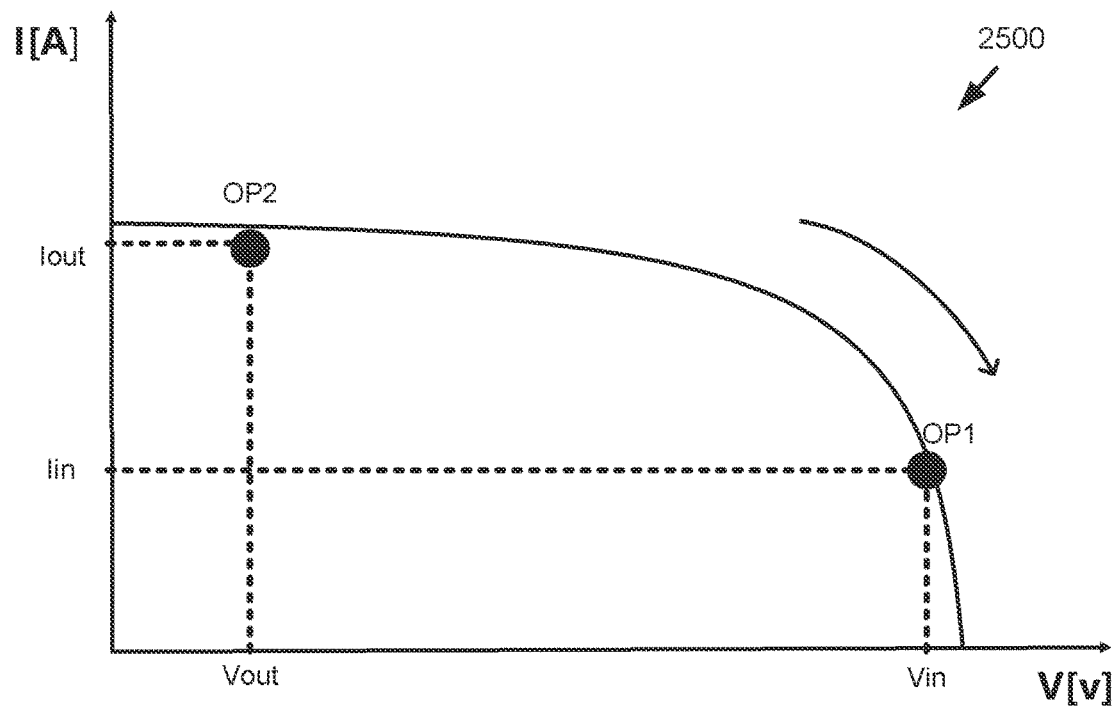
FIG. 30 shows an example graph of a current and voltage curve.
Figure 31:
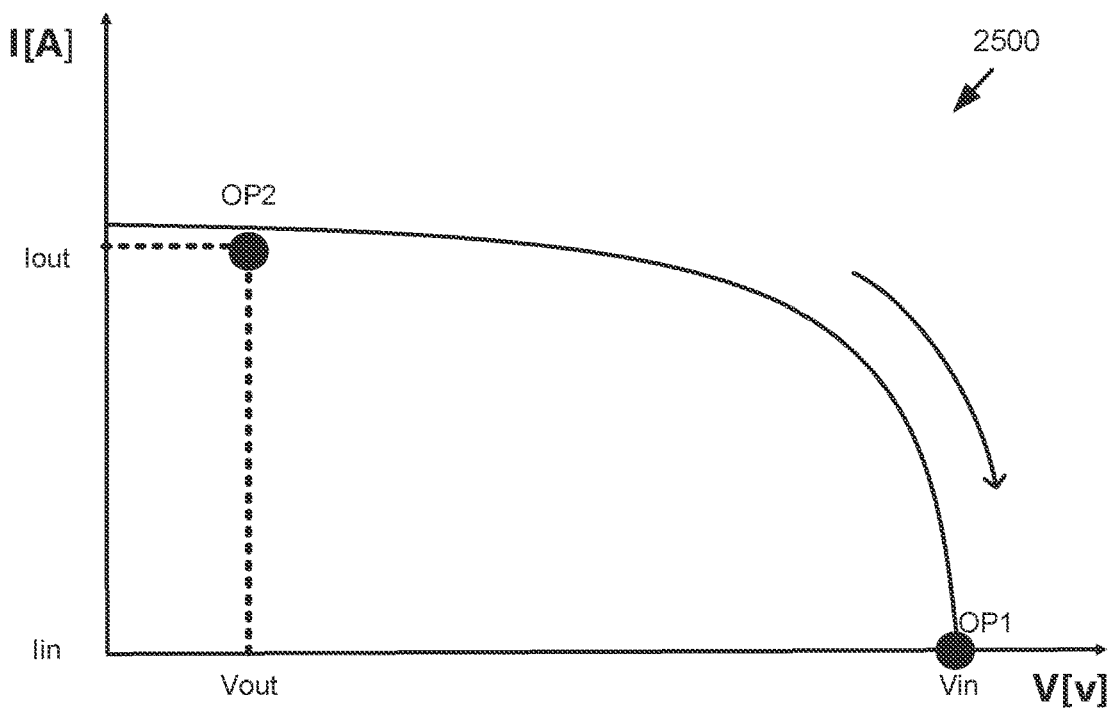
FIG. 31 shows an example graph of a current and voltage curve.

FIG. 30 and FIG. 31 show examples of the power device continuing to change to a shutdown mode of operation. Continuing to change the power device 106 to the shutdown mode of operation may include further reducing the input current Iin (towards about zero current) or further increasing the input voltage Vin to an open circuit voltage (Voc).

Figure 32:
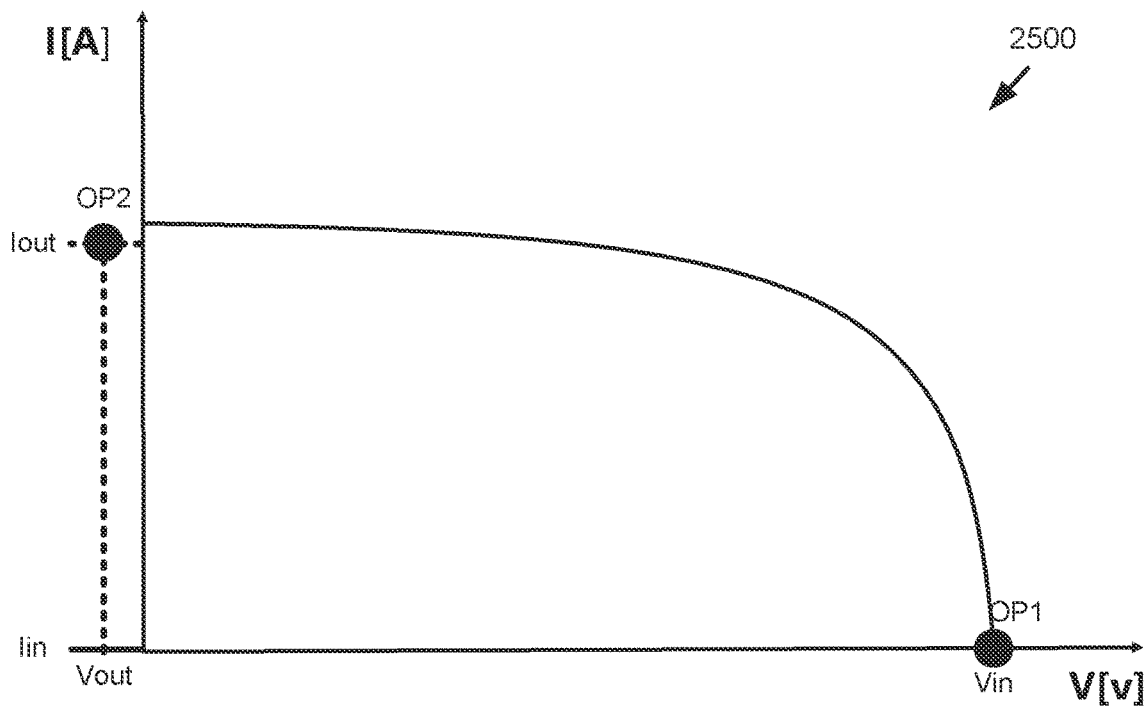
FIG. 32 shows an example graph of a current and voltage curve.

FIG. 32 shows an example of the power device in the shutdown mode of operation. In the shutdown mode of operation input current Iin may be about zero and the input voltage Vin may be an open circuit voltage (Voc). The output voltage may be about −0.7 volts in the shutdown mode since the power device 106 may include one or more bypass diodes for bypassing the string current Istring of one or more other power devices 106 of the power system. In some examples, one or more diodes related to the switches Q (e.g., one or more body diodes) may serve as the bypass diode. In some examples, the power device 106 or associated one or more power sources 102 may include one or more dedicated bypass diodes. The one or more bypass diodes may have an operating voltage of about 0.7 volts.

Figure 33:
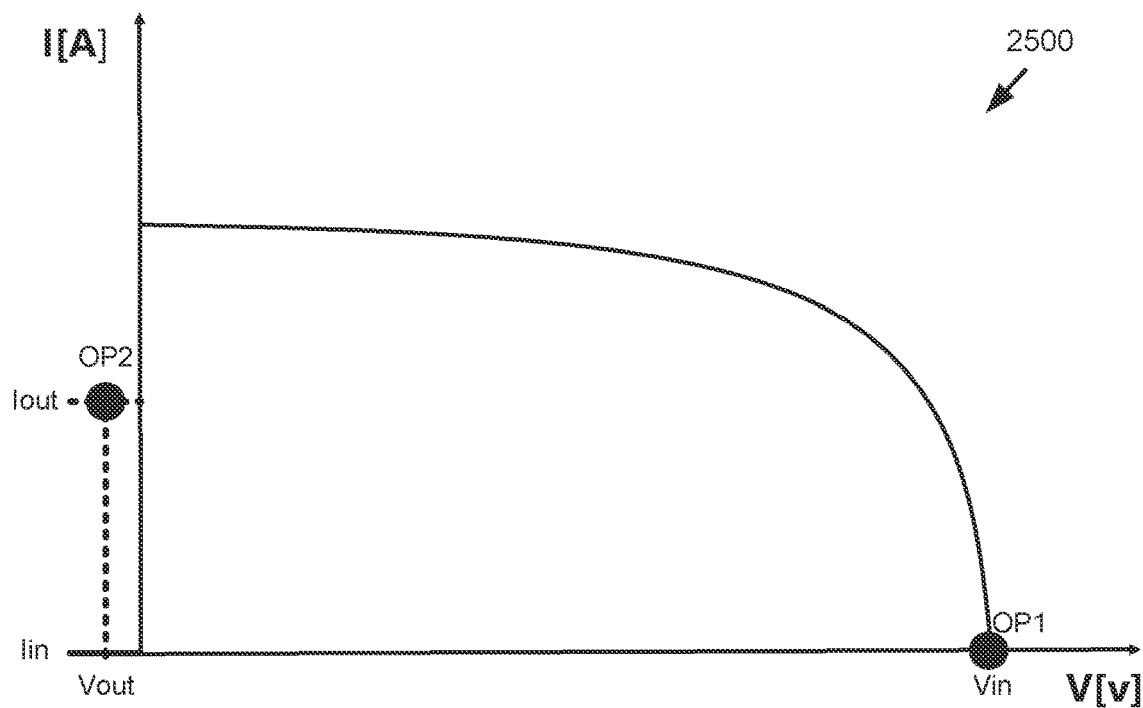
FIG. 33 shows an example graph of a current and voltage curve.

FIG. 33 shows that while in shutdown mode a current (e.g., the output current Iout) may decrease which may lead to the power device changing to a wakeup mode of operation.

Figure 34:
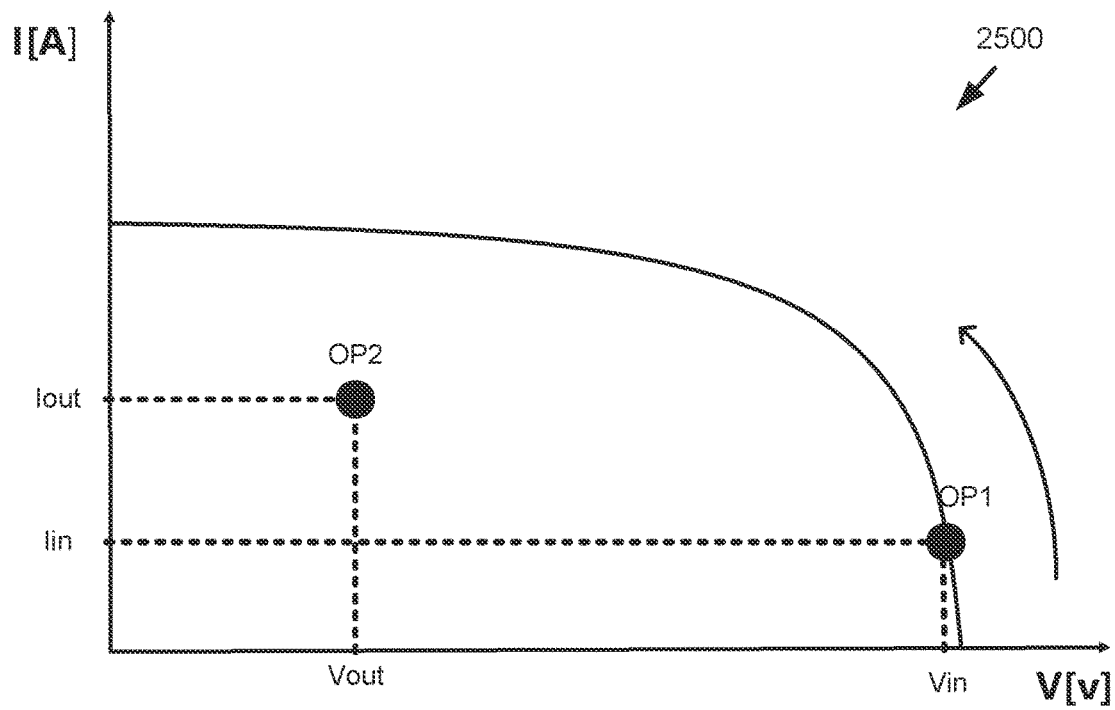
FIG. 34 shows an example graph of a current and voltage curve.

FIG. 34 shows the power device in a wakeup mode of operation. For example, after a decrease of output current Iout there may be a decrease of a temperature related to one or more elements of the power device 106. After a determination that a current value (e.g., related to the output current Iout) is below a first current threshold, such as the bypass current threshold (e.g., as shown in step 2408, and as shown in FIG. 33 where the output current Iout is less than the output current Iout in FIG. 31), the power device 106 may be changed to a wakeup mode of operation (as shown in step 2410). Changing the mode of operation of the power device 106 to a wakeup mode of operation (as shown in step 2410) may include turning ON one or more switches of the power converter 300. In some examples, controlling the power device 106 to operate in the wakeup mode of operation may be done to reduce the temperature related to one or more elements of the power device 106. For example, the power device 106 may wake up to a power reduction mode of operation (as opposed to a power tracking mode of operation, depending on the temperature).

In the example of FIG. 34, the wakeup mode of operation may include reducing an input voltage Vin or increasing an input current Iin. In this example, the wakeup mode of operation begins with an input voltage Vin of about the open circuit voltage (Voc) and an input current Iin of about zero. The input voltage Vin may be reduced or the input current Iin may be increased according to a power tracking mode of operation, e.g., according to a power tracking algorithm (such as, an MPPT algorithm). For example, the voltage may be reduced towards a voltage value of a desired operating point. The wakeup mode of operation may be selected based on the shutdown mode of operation (e.g., as shown in steps S002 and S004). As another example, the wakeup mode of operation may be selected based on the input current and/or the input voltage.

Figure 35:
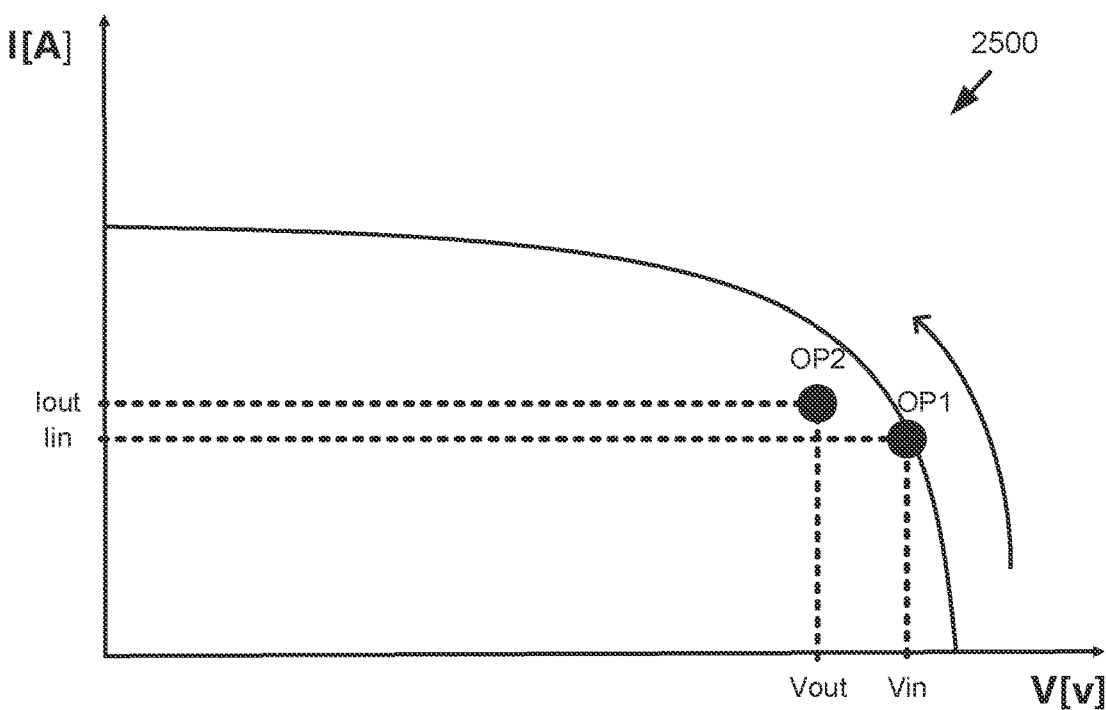
FIG. 35 shows an example graph of a current and voltage curve.

FIG. 35 shows the power device continuing in the wakeup mode of operation. The operating point OP1 (Iin, Vin) may be controlled according to power tracking algorithm. The input voltage Vin may be further reduced or the input current Iin may be further increased towards a desired operating point (e.g., a maximum power point).

Figure 36:
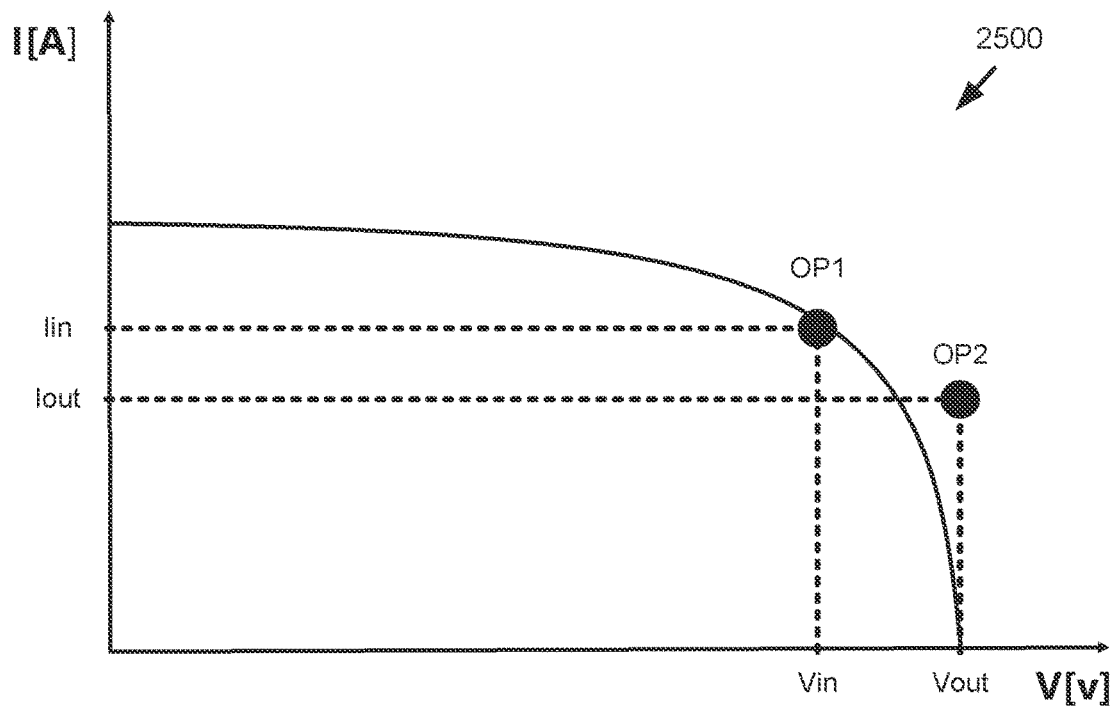
FIG. 36 shows an example graph of a current and voltage curve.

FIG. 36 shows an example of the power device operating in a power tracking mode of operation (as opposed to a power reduction mode of operation). For example, the power device 106 may be operating in a power conversion mode of operation. As shown in FIG. 18, the power device 106 is operating in a boost mode of conversion. The output voltage (Vout) is greater than the input voltage (Vin), and the input current (Iin) is greater than the output current (Iout). The operating point OP1 (Vin, Iin) may be determined by an algorithm such as an MPPT algorithm. When the temperature value is below the threshold, then it may not negatively affect the operation of the power device to the same degree as a temperature value above the threshold. Therefore, power reduction mode may no longer be beneficial and the power device may operate relatively effectively in the power tracking mode of operation. As mentioned above, in some cases after the wakeup mode of operation, when the temperature value is still above the threshold, then the power device 106 may operate in a power reduction mode of operation instead of the power tracking mode of operation. The power device 106 may operate in the power reduction mode of operation to reduce the temperature related to one or more elements of the power device 106.

Figure 37:
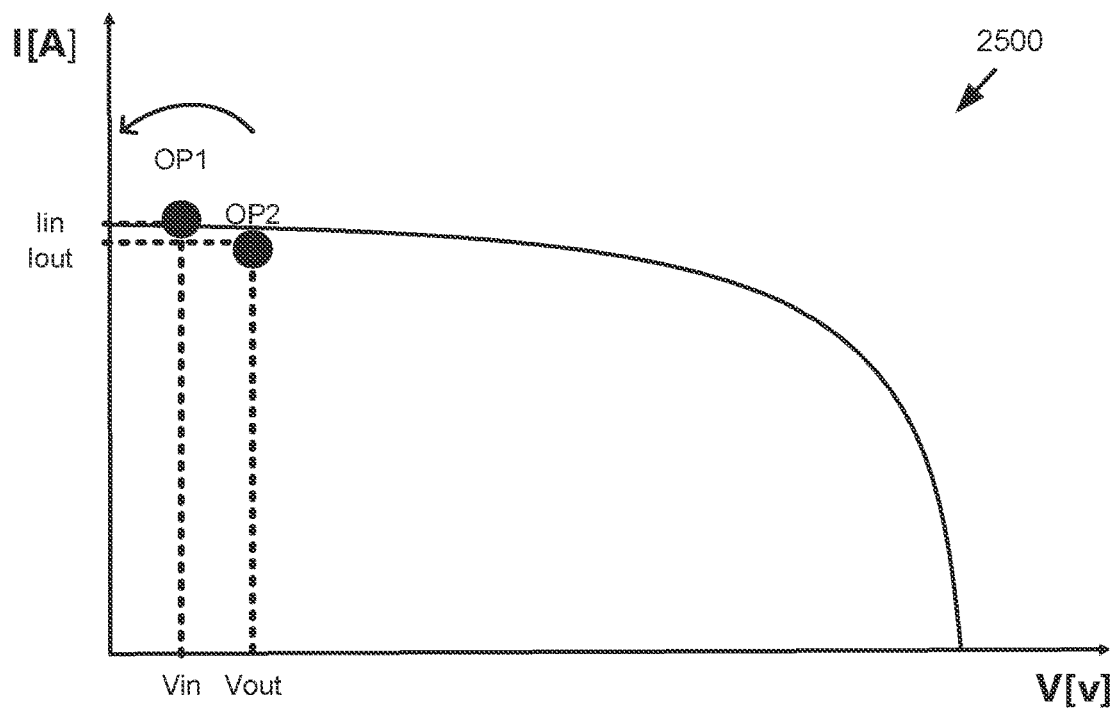
FIG. 37 shows an example graph of a current and voltage curve.

FIG. 37 shows an example of the power device changing to a shutdown mode of operation. For example, after a determination to operate in a bypass mode of operation (as shown in step 2308) at least one second parameter related to the power device may be obtained (as shown in step 2310), and a determination may be made that a current value (e.g., related to the output current Iout) is above a second current threshold, such as, a shutdown current threshold (e.g., as shown in step 2312, and as shown in FIG. 29 where the output current Iout is greater than the output current Iout in FIG. 28). So, the power device 106 may change to operate in the shutdown mode of operation (as shown in step 2316). In some examples, the first parameter may be the same as the second parameter. The determination that the power device 106 should change mode of operation may include determining that a power (e.g., the output power Pout) is substantially less than a total power (e.g., as shown in step 514). Changing the mode of operation of the power device 106 to a shutdown mode of operation (as shown in step 2316) may include turning OFF a plurality of switches Q of the power converter 300 (as shown in FIG. 3B). Controlling the power device 106 to operate in the shutdown mode of operation may be done to reduce the temperature related to one or more elements of the power device 106. Changing the power device 106 to the shutdown mode of operation may include reducing an input current Iin (towards about zero current) or increasing an input voltage Vin to an open circuit voltage (Voc). Changing the power device 106 to the shutdown mode of operation may include transmitting one or more communication signals to one or more other power devices 106 or one or more system power devices 110. The one or more communication signals may be a shutdown signal that includes an indication (e.g., one or more bits) that indicate the power device 106 is changing to the shutdown mode of operation.

Figure 38:
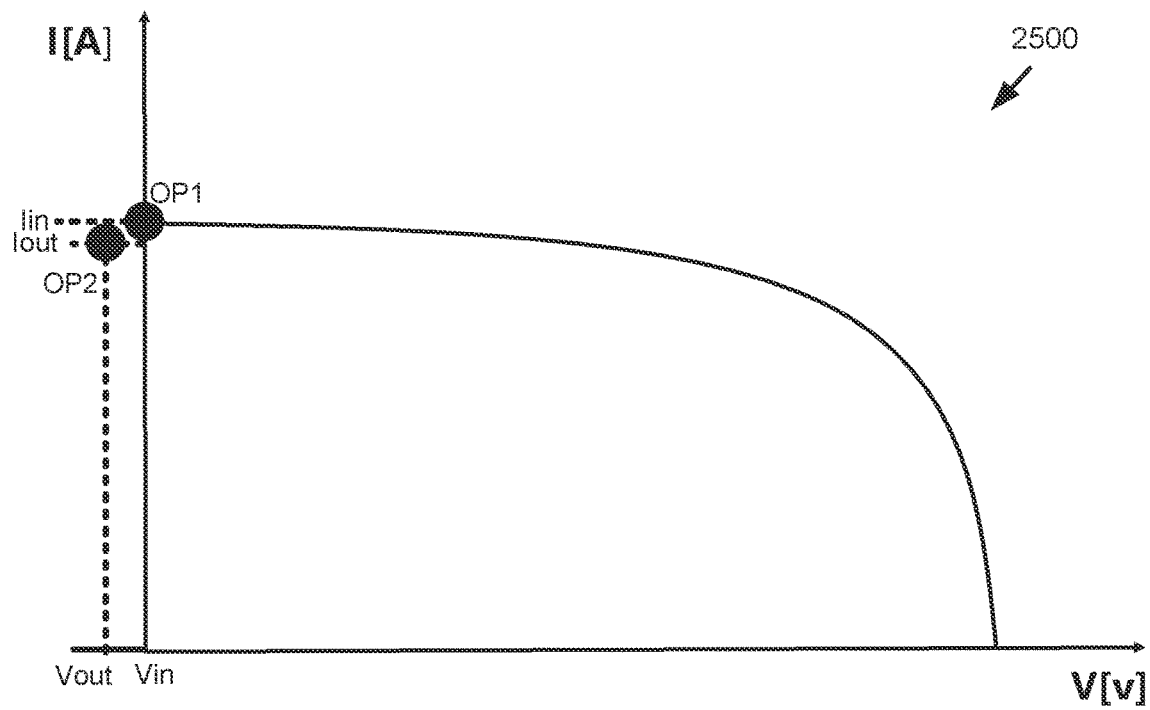
FIG. 38 shows an example graph of a current and voltage curve.

FIG. 38 shows an example of the power device in a shutdown mode of operation.

The changing to shutdown mode may include moving to the right side of the I-V curve (e.g., by disconnecting from one or more power sources) or moving to the left side of the I-V curve (e.g., by short circuiting a connection to the one or more power sources). Which option is used may depend on which mode of operation the converter is operating in prior to shutdown (e.g., buck mode or boost mode). Which shutdown is done may dictate which wakeup is done. For example, if shutdown is done to the left then wakeup may be to the right and vice versa. Also the shutdown may be a gradual shutdown or soft shutdown where a current or voltage is controlled to relatively gradually shut down the power device. Or the shutdown may be a quick/almost immediate shutdown or hard shutdown where the power device is changed directly to the shutdown mode (e.g., by turning off all of the switches of the power device). The type of shutdown may depend on a temperature value related to the power device. A higher temperature may dictate a more drastic and immediate hard shutdown whereas a lower temperature may dictate a slower more gradual soft shutdown.

In some cases bypass or shut down may be dependent upon temperature and not current. In some cases a frequency of the power device may be used to lower the temperature of the power device.

Figure 39:
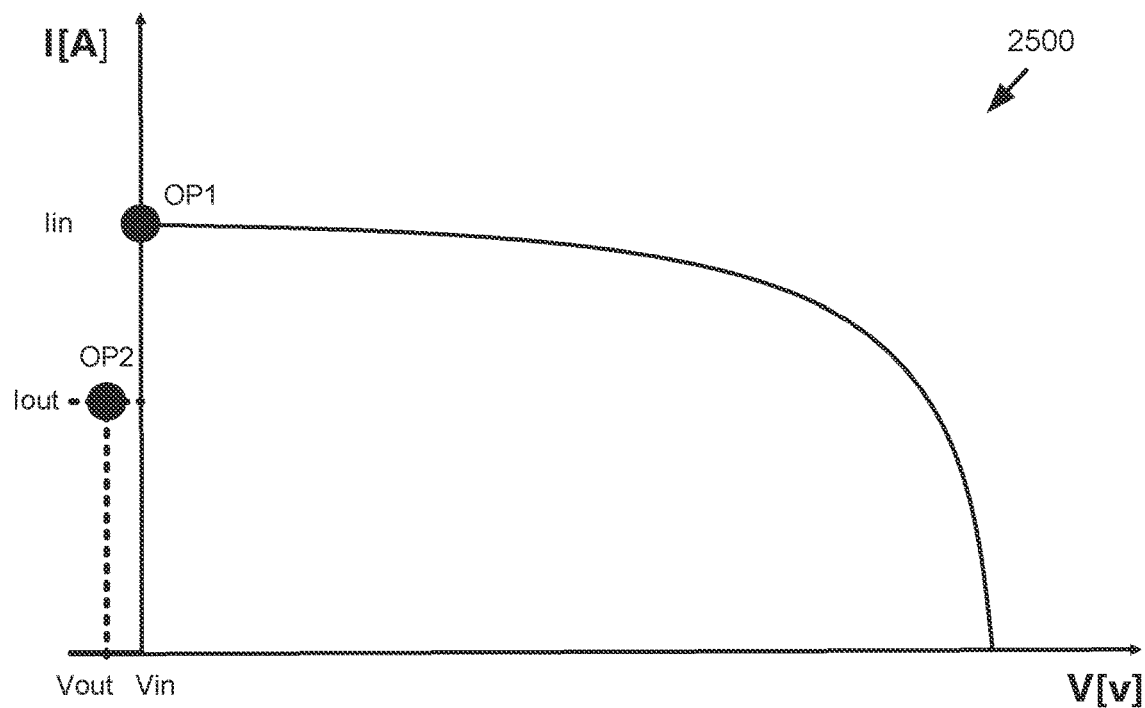
FIG. 39 shows an example graph of a current and voltage curve.

FIG. 39 shows the power device in a wakeup mode of operation. For example, after a decrease of output current Iout there may be a decrease of a temperature related to one or more elements of the power device 106. After a determination that a current value (e.g., related to the output current Iout) is below a first current threshold, such as the bypass current threshold (e.g., as shown in step 2408, and as shown in FIG. 39 where the output current Iout is less than the output current Iout in FIG. 38), the power device 106 may be changed to a wakeup mode of operation (as shown in step 2410). Changing the mode of operation of the power device 106 to a wakeup mode of operation (as shown in step 2410) may include turning ON one or more switches Q of the power converter 300. In some examples, controlling the power device 106 to operate in the wakeup mode of operation may be done to reduce the temperature related to one or more elements of the power device 106. For example, the power device 106 may wake up to a power reduction mode of operation (as opposed to a power tracking mode of operation, depending on the temperature).

Figure 40:
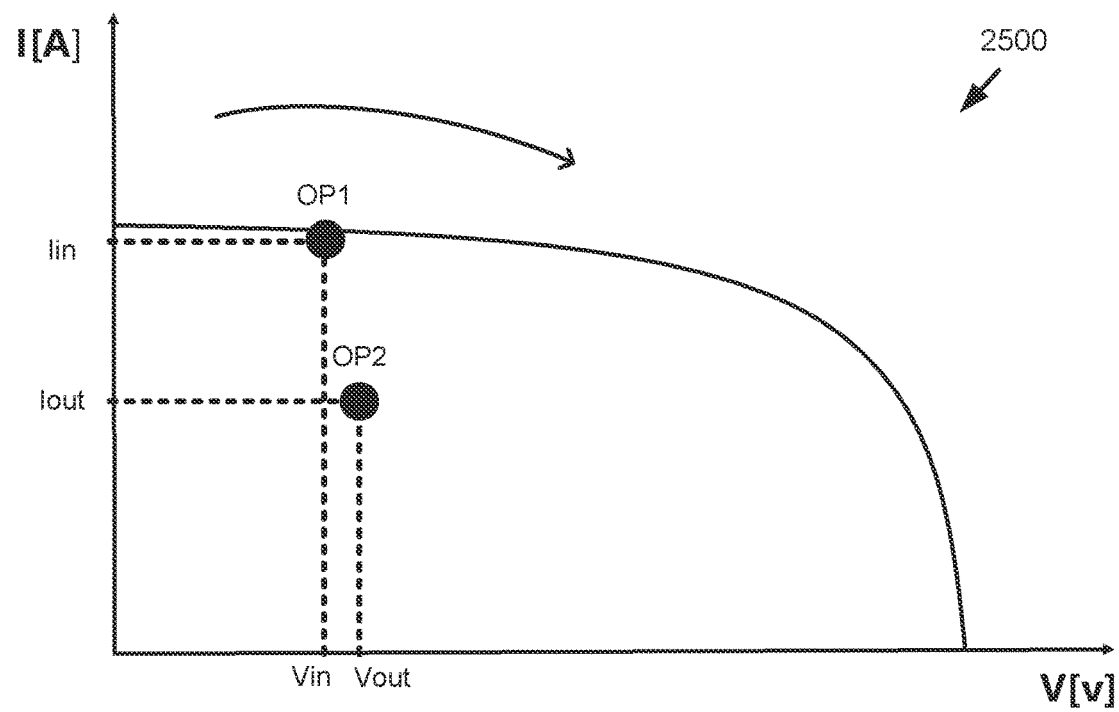
FIG. 40 shows an example graph of a current and voltage curve.

In the example of FIG. 40, the wakeup mode of operation includes increasing an input voltage Vin or decreasing an input current Iin. In this example, the wakeup mode of operation begins with an input voltage Vin of about zero and an input current Iin of about a short circuit current (Isc). The input voltage Vin may be increased or the input current Iin may be reduced according to a power tracking mode of operation, e.g., according to a power tracking algorithm (such as, an MPPT algorithm). For example, the voltage may be increased towards a voltage value of a desired operating point. The wakeup mode of operation may be selected based on the shutdown mode of operation (e.g., as shown in steps S002 and S004). As another example, the wakeup mode of operation may be selected based on the input current and/or the input voltage As an example, the operating point OP1 for the wakeup mode of operation may have an input voltage Vin of about zero and an input current Iin of about a short circuit current (Isc) by short circuiting a connection between the power device 106 and the one or more associated power sources 102 (e.g. one or more PV modules). In some examples, one or more elements of the power system 100 may receive an amount of electrical energy when the power device 106 changes to the wakeup mode of operation. For example, one or more capacitors (e.g., capacitor C1) may discharge onto one or more other capacitors (e.g., capacitor C2). As an example, the power system 100 may include one or more electrical energy storage devices (e.g., batteries) for receiving the electrical energy.

Figure 41:
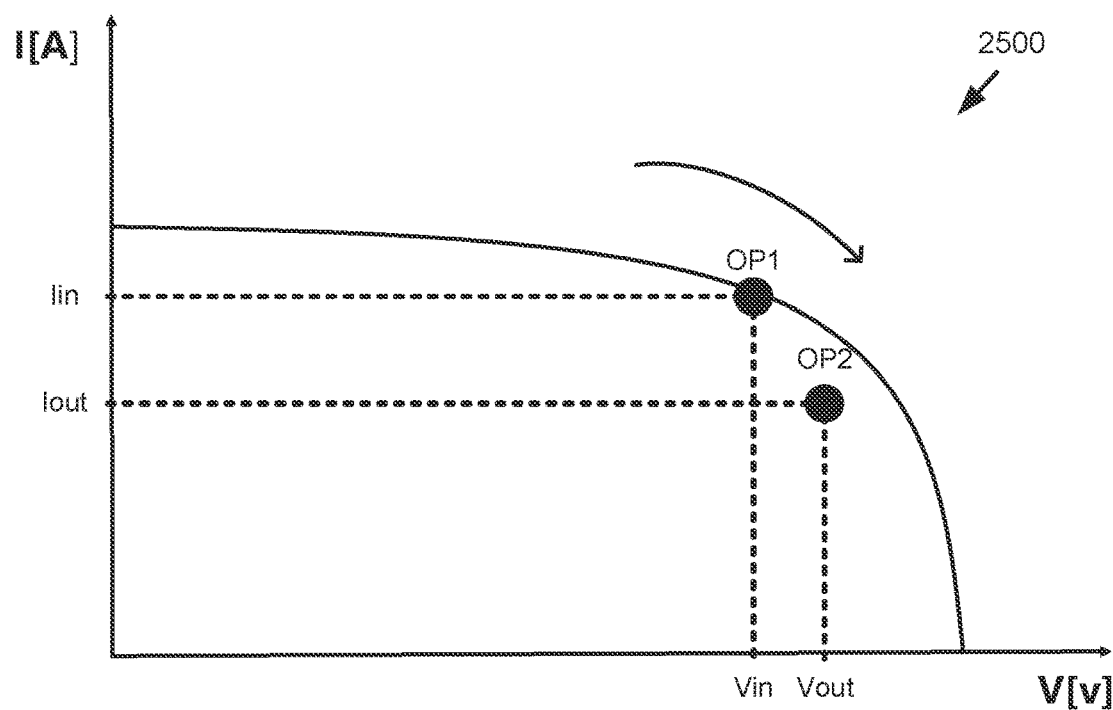
FIG. 41 shows an example graph of a current and voltage curve.

FIG. 41 shows the power device continuing in the wakeup mode of operation. The operating point OP1 (Iin, Vin) may be controlled according to power tracking algorithm. The input voltage Vin may be further increased or the input current Iin may be further reduced towards a desired operating point (e.g., a maximum power point).

Figure 42:
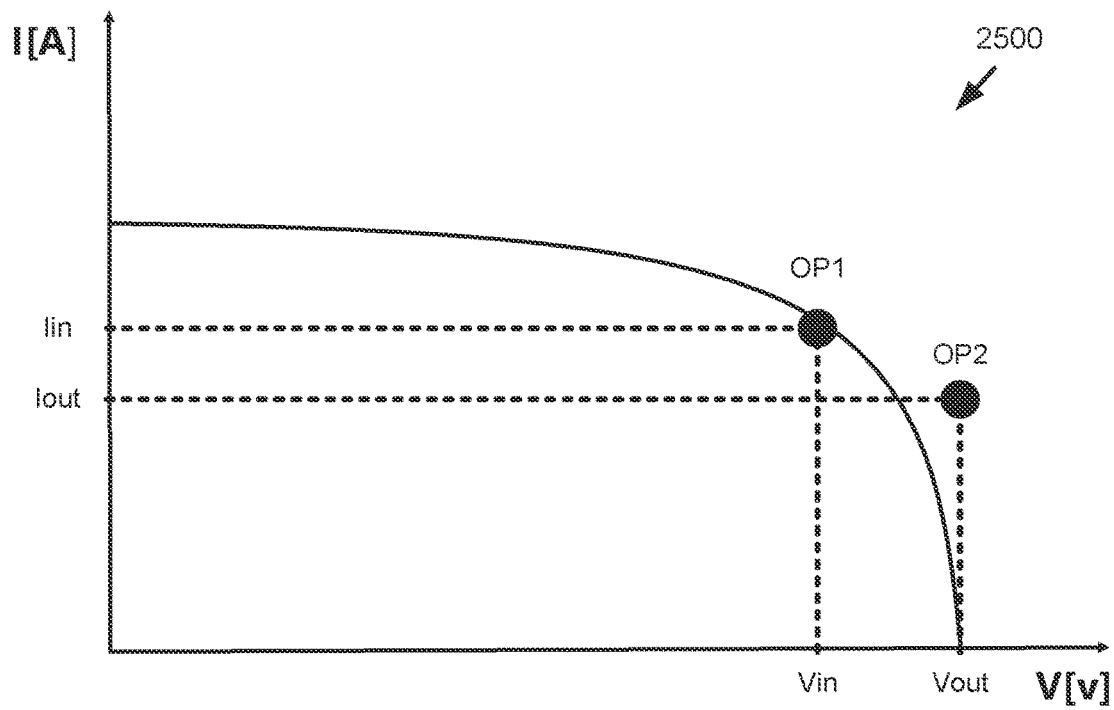
FIG. 42 shows an example graph of a current and voltage curve.

FIG. 42 shows an example of the power device operating in a power tracking mode of operation (as opposed to a power reduction mode of operation). For example, the power device 106 may be operating in a power conversion mode of operation. As shown in FIG. 42, the power device 106 is operating in a boost mode of conversion. The output voltage (Vout) is greater than the input voltage (Vin), and the input current (Iin) is greater than the output current (Iout).

The operating point OP1 (Vin, Iin) may be determined by an algorithm, such as, an MPPT algorithm. When the temperature value is below the threshold, then it may not negatively affect the operation of the power device to the same degree as a temperature value above the threshold. Therefore, power reduction mode may no longer be beneficial and the power device may operate relatively effectively in the power tracking mode of operation. As mentioned above, in some cases after the wakeup mode of operation, when the temperature value is still above the threshold then the power device 106 may operate in a power reduction mode of operation instead of the power tracking mode of operation. The power device 106 may operate in the power reduction mode of operation to reduce the temperature related to one or more elements of the power device 106.

FIGS. 43 to 49 show examples of various graphs related to the shutdown of a power device according to examples of the present subject matter.

Figure 43:
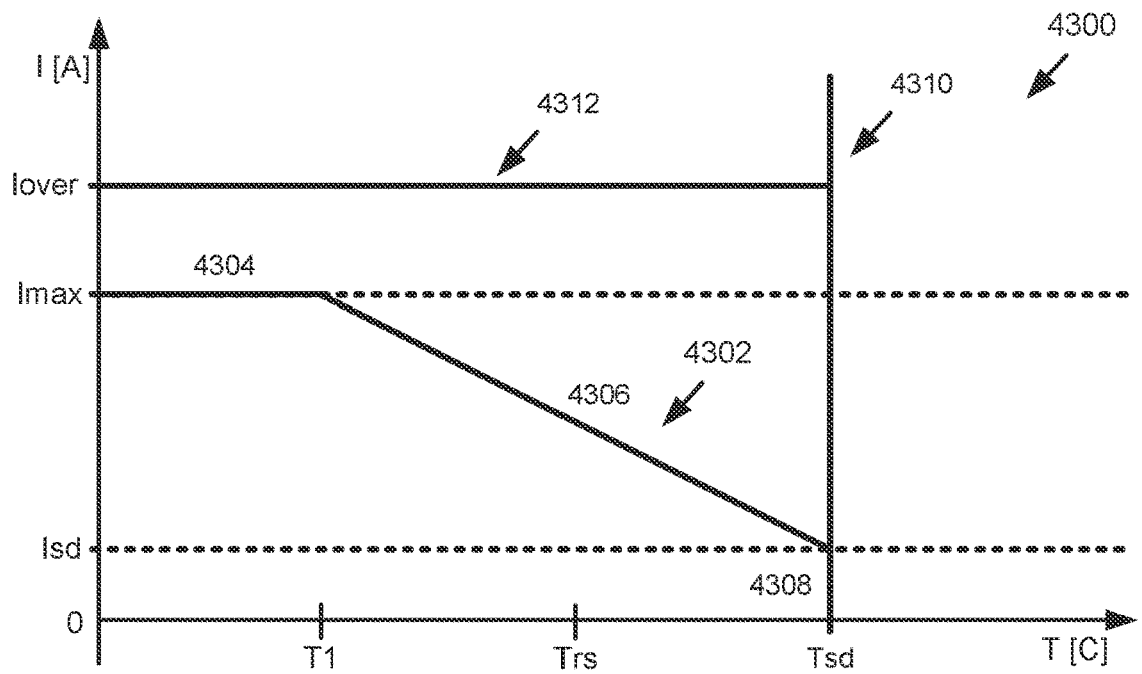
FIG. 43 shows an example graph of current and temperature curves.

FIG. 43 shows an example of current-temperature graph 4300 that may be used to control the power device. Graph 4300 includes derating curve 4302 that may be used to control the power device in a temperature management/power reduction mode of operation.

Graph 4300 also includes a temperature shutdown threshold 4310 that may be used to control the power device regarding the shutdown mode of operation. Graph 4300 also includes a current shutdown threshold 4312 that may be used to control the power device regarding the shutdown mode of operation. The current of graph 4300 may be a current related to one or more elements of the power system 100, for example, a current value IL related to a current value of one or more inductor L of the converter 300. Derating curve 4302 may include a portion 4304 that dictates a maximum current Imax when the temperature is in a range of about 0 to about a first temperature T1, a linear portion 4306 that dictates a variable current I between the range of about the maximum current Imax and about the shutdown current Isd when the temperature is in a range of about the first temperature T1 and about the shutdown temperature Tsd, and a portion 4308 that dictates a current in a range of about the shutdown current Isd and about 0 when the temperature is about the shutdown temperature Tsd. Derating curve 4302 may be what is known as a droop curve. Current I may be the output current Iout of the power device 106. The temperature T may be the temperature related to one or more elements of the power device 106. Temperature shutdown threshold 4310 may dictate the shutdown of the power device 106 when the temperature value is about the shutdown temperature Tsd (e.g., the power device may be operated in the shutdown mode of operation according to a threshold as opposed to a curve). Current shutdown threshold 4312 may dictate the shutdown of the power device 106 when the current value is about the shutdown current Iover (e.g., the power device may be operated in the shutdown mode of operation according to a threshold as opposed to a curve).

Figure 44:
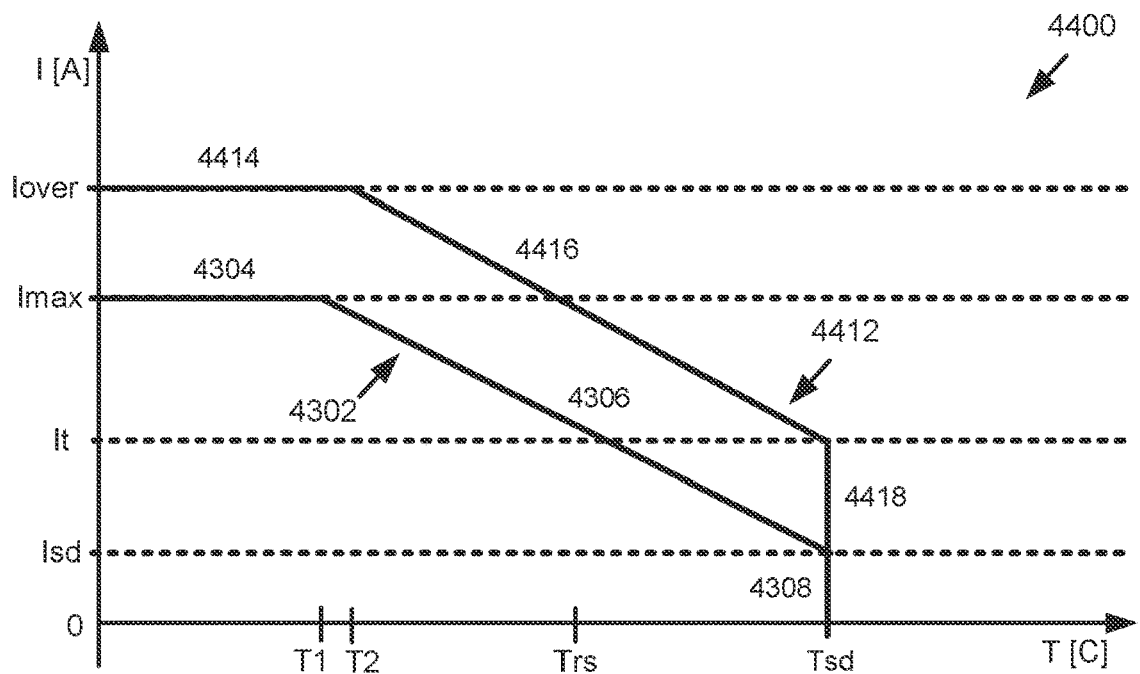
FIG. 44 shows an example graph of current and temperature curves.

FIG. 44 shows an example of current-temperature graph 4400 that may be used to control the power device. Similar to graph 4300, graph 4400 includes a derating curve 4302 that may be used to control the power device in a temperature management/power reduction mode of operation. Graph 4400 also includes a shutdown curve 4412 that may be used to control the power device regarding the shutdown mode of operation. Shutdown curve 4412 may include a portion 4414 that dictates a maximum current Iover when the temperature is in a range of about 0 to about a first temperature T2, a linear portion 4416 that dictates a variable current I between the range of about the maximum current Iover and about the current It when the temperature is in a range of about the first temperature T2 and about the shutdown temperature Tsd, and a portion 4418 that dictates a current in a range of about the current It and about 0 when the temperature is about the shutdown temperature Tsd. Shutdown curve 4412 may be what is known as a droop curve. Current I may be the output current Iout of the power device 106. The temperature T may be the temperature related to one or more elements of the power device 106. Temperature T2 may be the same as temperature T1. Shutdown curve 4412 may dictate a relatively gradual shutdown of the power device 106 as opposed to a shutdown threshold 4310, 4312. Shutdown curve 4412 may also help prevent the power device 106 from operating in relatively dangerous operation points that may be possible when using a shutdown threshold 4310, 4312. Shutdown curve 4412 may also help prevent one or more elements of the power device 106 from reaching relatively high temperatures which may protect the one or more elements of the power device 106 and may help increase their longevity. In some examples, the shutdown curve may be controlled by changing one or more values of the curve. For example, controlling the value set for current It and the value set for temperature Tsd may produce a different shutdown curve.

Figure 45:
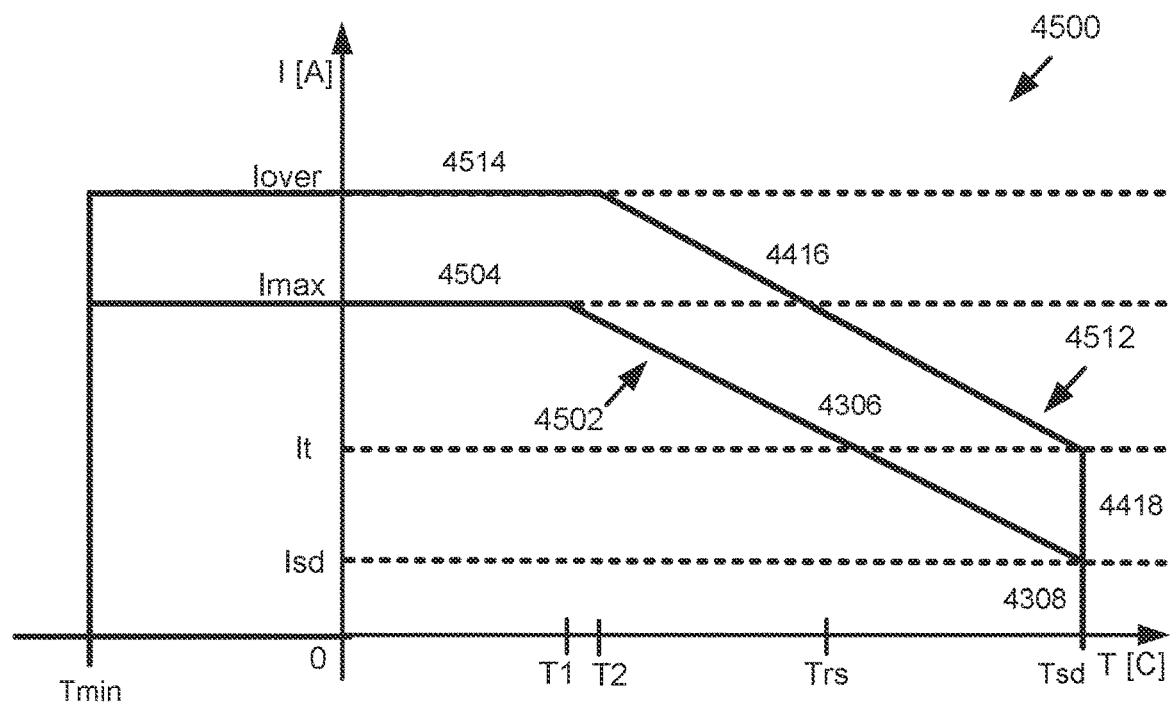
FIG. 45 shows an example graph of current and temperature curves.

FIG. 45 shows an example of current-temperature graph 4500 that may be used to control the power device. In the example of FIG. 45 there is also shutdown or bypass if the temperature reaches a negative temperature value Tmin.

Figure 46:
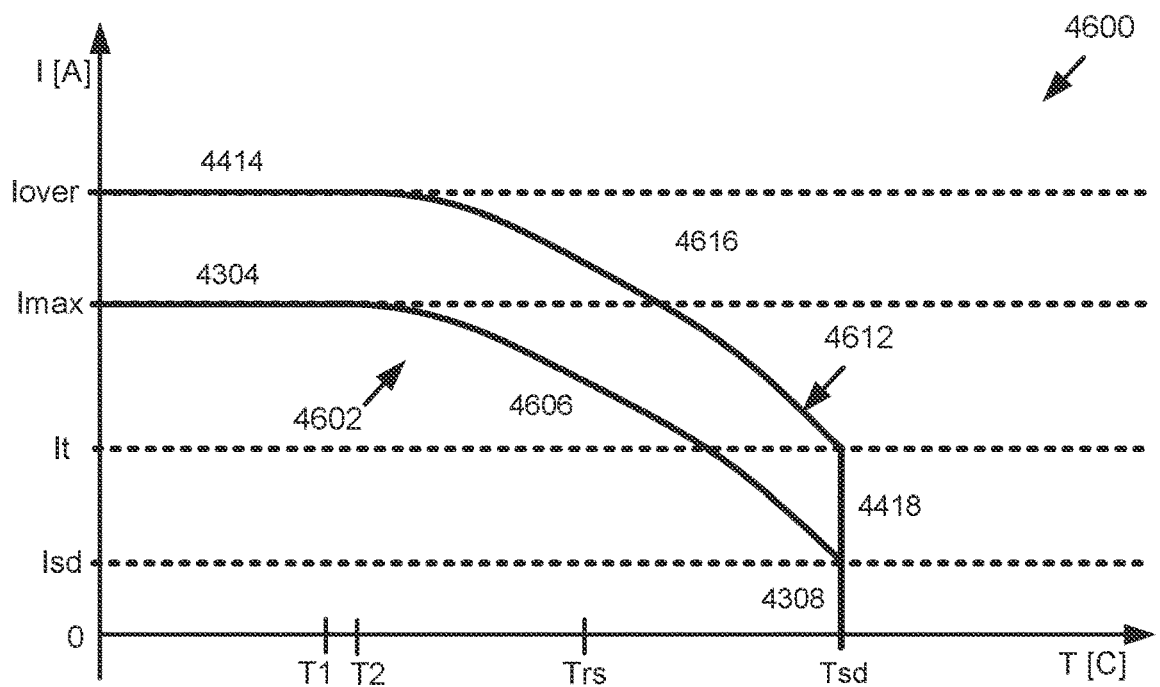
FIG. 46 shows an example graph of current and temperature curves.

FIG. 46 shows an example of current-temperature graph 4600 that may be used to control the power device. In the example of FIG. 46 the shutdown curve and the bypass curve each include one or more non-linear portions.

Figure 47:
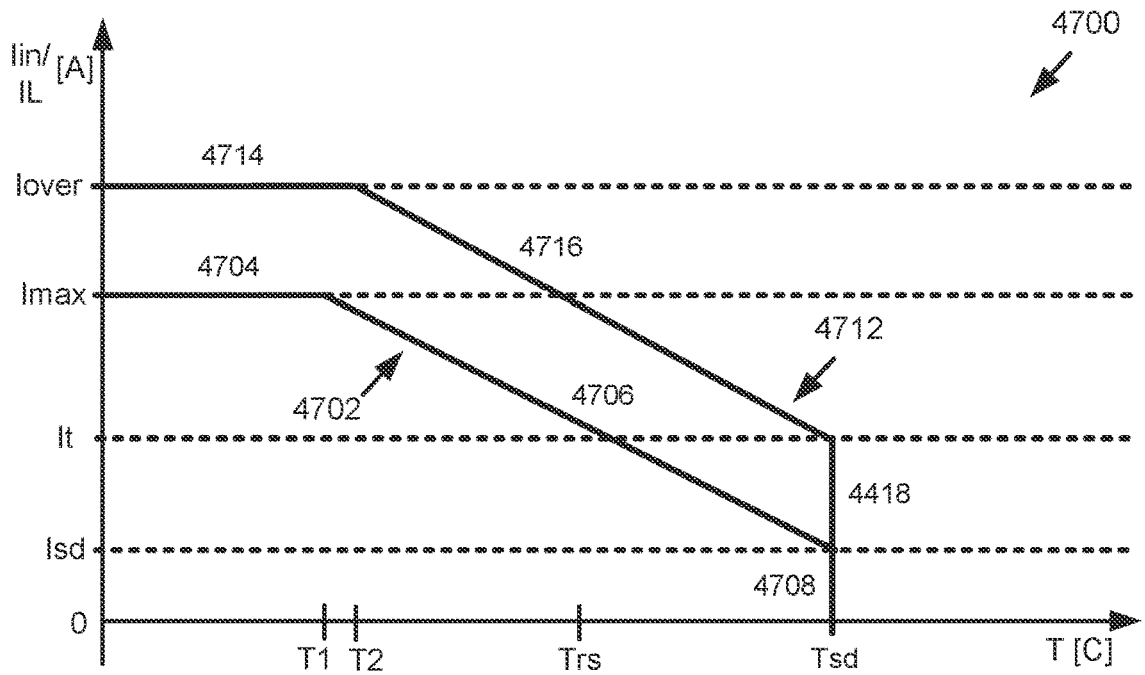
FIG. 47 shows an example graph of current and temperature curves.

FIG. 47 shows an example of current-temperature graph 4700 that may be used to control the power device. In the example of FIG. 47, the curves may be dependent on the mode of operation of the power device. For example, the curves of FIG. 47 may be used to control bypass or shutdown when the power device is in a boost mode of operation. The current value may be an input current value Iin divided by an inductor current value IL. The temperature value may be the temperature of one or more elements of the power device (e.g., the inductor, a transistor, a housing, etc.).

Figure 48:
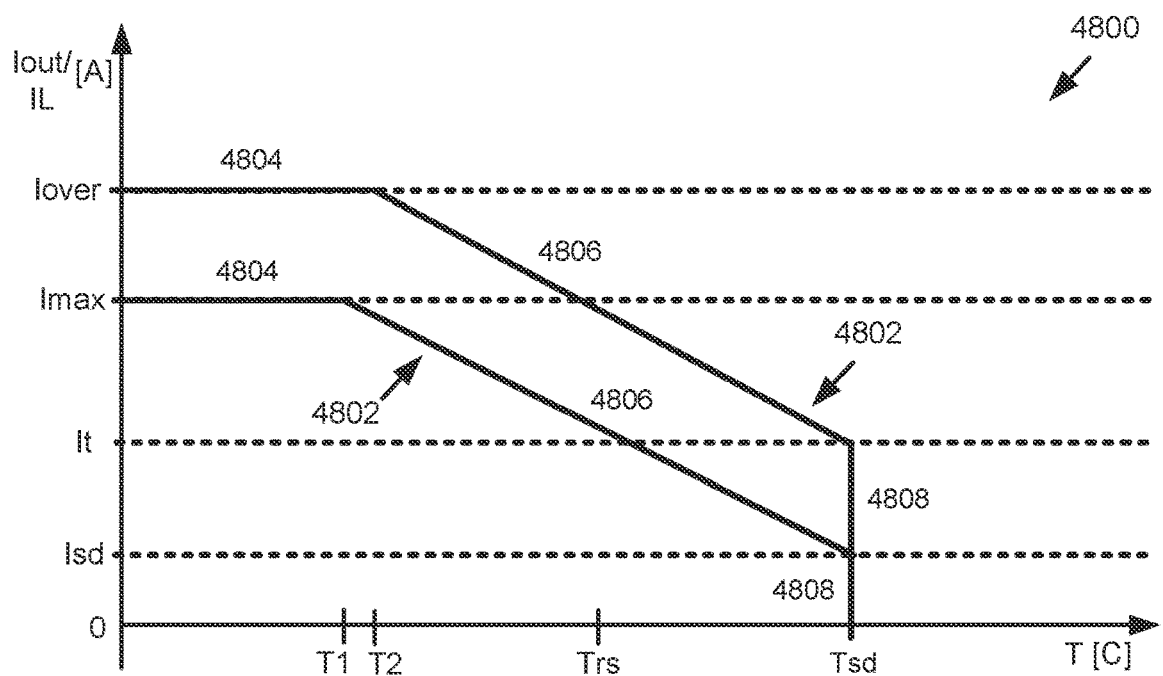
FIG. 48 shows an example graph of current and temperature curves.

FIG. 48 shows an example of current-temperature graph 4800 that may be used to control the power device. In the example of FIG. 48, the curves may be dependent on the mode of operation of the power device. For example, the curves of FIG. 48 may be used to control bypass or shutdown when the power device is in a buck mode of operation. The current value may be an output current value Iout divided by an inductor current value IL. The temperature value may be the temperature of one or more elements of the power device (e.g., the inductor, a transistor, a housing, etc.).

Figure 49:
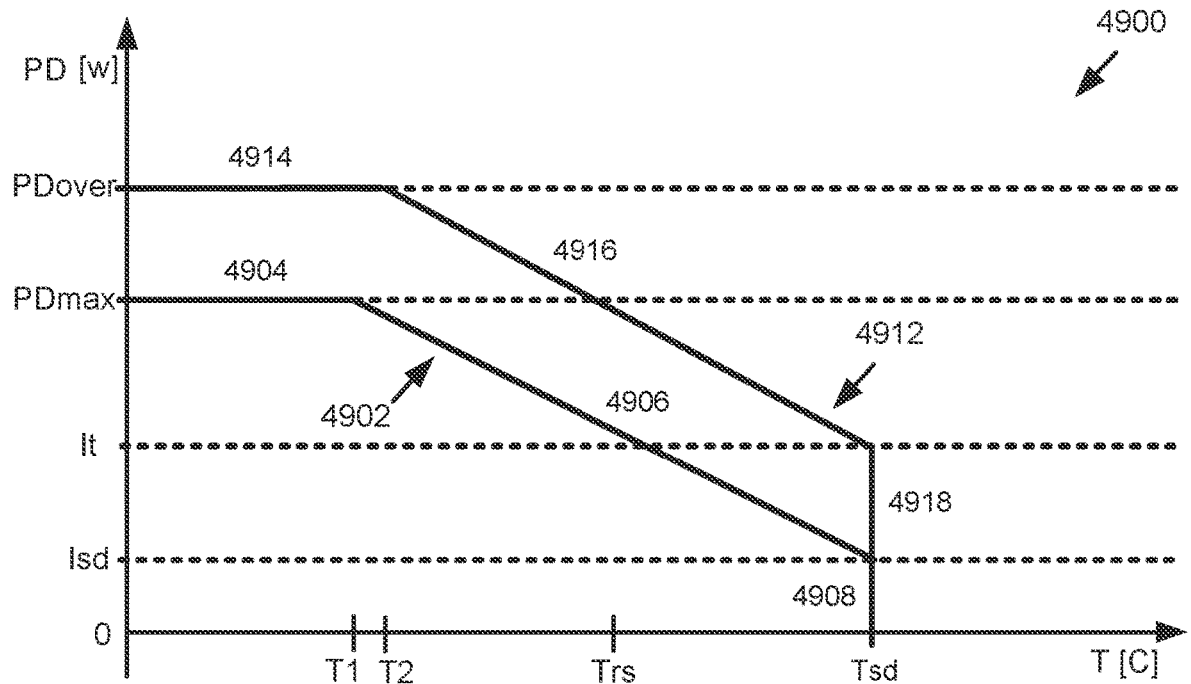
FIG. 49 shows an example graph of power and temperature curves.

FIG. 49 shows an example of power-temperature graph 4900 that may be used to control the power device. In the example of FIG. 49, a power bypass curve 4902 and a power shutdown curve 4912 may be used to control bypass or shutdown of the power device. The power value may be a power dissipation value PD. The temperature value may be the temperature of one or more elements of the power device (e.g., the inductor, a transistor, a housing, etc.).

In the examples above, one or more lookup tables may be used to control the bypass or shutdown of the power device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

Further disclosed are the following examples:

1. An apparatus comprising:
   a power converter configured to operate at least one of a buck mode of operation or a boost mode of operation;
   at least one sensor configured to obtain at least one parameter related to a temperature of the power converter;
   a controller configured to determine if the at least one parameter is above a threshold, and to determine the mode of operation of the power converter;
   wherein the controller is further configured to control the power converter to reduce a power related to the power converter in response to the at least one parameter being above the threshold; and
   wherein the controller is further configured to control the power converter to reduce the power related to the power converter based on the mode of operation of the power converter.

2. The apparatus of clause 1, wherein the power related to the power converter is an input power at an input of the power converter.

3. The apparatus of any one of clause 1 or clause 2, wherein, when the power converter is in a buck mode of operation, the controller is configured to control the power converter to reduce an input voltage at the input of the power converter to reduce the power related to the power converter.

4. The apparatus of any one of clause 1 or clause 2, wherein, when the power converter is in a boost mode of operation, the controller is configured to control the power converter to reduce an input current at the input of the power converter to reduce the power related to the power converter.

5. The apparatus of any one of clause 1 or clause 2, wherein, when the power converter is in a buck mode of operation, the controller is configured to control the power converter to increase an input current at the input of the power converter to reduce the power related to the power converter.

6. The apparatus of any one of clause 1 or clause 2, wherein, when the power converter is in a boost mode of operation, the controller is configured to control the power converter to increase an input voltage at the input of the power converter to reduce the power related to the power converter.

7. The apparatus of any one of the preceding clauses, wherein the at least one parameter is related to a temperature of at least one switch of the power converter.

8. The apparatus of clause 7, wherein the at least one switch is at least one Metal Oxide Semiconductor Field Effect Transistor (MOSFET).

9. The apparatus of any one of clauses 1 to 6, wherein the at least one parameter is related to a temperature of an inductor of the power converter.

10. The apparatus of any one of the preceding clauses, wherein the power converter is further configured to change the mode of operation of the power converter in response to a change of an output current at an output of the power converter.

11. The apparatus of any one of clause 1 to clause 10, wherein the power converter is further configured to reduce a frequency of the power converter to reduce the temperature of the power converter.

12. A method comprising:
    obtaining at least one parameter related to a temperature of a power converter configured to operate in a mode of operation, wherein the mode of operation comprises at least one of a buck mode of operation or a boost mode of operation;
    determining if the at least one parameter is above a threshold;
    determining the mode of operation of the power converter;
    reducing, based on the mode of operation of the power converter and the at least one parameter being above the threshold, a power related to the power converter.

13. The method of clause 12, wherein the power related to the power converter is an input power to the power converter.

14. The method of any one of clause 12 or clause 13 further comprising reducing, based on the power converter being in a buck mode of operation, the power related to the power converter comprises reducing an input voltage at an input of the power converter.

15. The method of any one of clause 12 or clause 13 further comprising reducing, based on the power converter being in a boost mode of operation, the power related to the power converter comprises reducing an input current at an input of the power converter.

16. The method of any one of clause 12 or clause 13 further comprising reducing, based on the power converter being in a buck mode of operation, the power related to the power converter comprises increasing an input current at an input of the power converter.

17. The method of any one of clause 12 or clause 13 further comprising, reducing, based on the power converter being in a boost mode of operation, the power related to the power converter comprises increasing an input voltage at an input of the power converter.

18. The method of any one of clause 12 to clause 17, wherein the at least one parameter is related to a temperature of at least one switch of the power converter.

19. The method of clause 18, wherein the at least one switch is at least one Metal Oxide Semiconductor Field Effect Transistor (MOSFET).

20. The method of any one of clause 12 to clause 17, wherein the at least one parameter is related to a temperature of an inductor of the power converter.

21. The method of any one of clause 12 to clause 20, further comprising changing the mode of operation of the power converter in response to a change of an output current.

22. The method of any one of clause 12 to clause 21, further comprising reducing a frequency of the power converter to reduce the temperature of the power converter 23. An apparatus comprising:
    a power converter configured to operate in a plurality of modes of operation, the plurality of modes of operation comprises: a buck mode of operation, and a boost mode of operation;
    at least one sensor configured to obtain at least one parameter related to a temperature of the power converter;
    a controller configured to determine if the at least one parameter is above a threshold, and to determine a mode of operation of the power converter from the plurality of modes of operation;
    wherein the controller is further configured to control the power converter to reduce a power related to the power converter in response to the at least one parameter being above the threshold;
    wherein the controller is further configured to control the power converter to reduce the power related to the power converter based on the determined mode of operation of the power converter; and wherein the power converter is further configured to change the mode of operation of the power converter from the determined mode of operation to a different mode of operation in response to a change of an output current at an output of the power converter.

24. A method comprising:

obtaining at least one parameter related to a temperature of a power converter configured to operate in a plurality of modes of operation, wherein the plurality of modes of operation comprises: a buck mode of operation, and a boost mode of operation;

determining if the at least one parameter is above a threshold;

determining the mode of operation of the power converter from the plurality of modes of operation;

reducing, based on the determined mode of operation of the power converter and based on the at least one parameter being above the threshold, a power related to the power converter; and changing the mode of operation of the power converter from the determined mode of operation to a different mode of operation in response to a change of an output current.

25. An apparatus comprising:

a power converter configured to operate in a plurality of shutdown modes of operation and a plurality of wakeup modes of operation;

a controller configured to determine a last used shutdown mode of operation of the plurality of shutdown modes of operation, wherein the last used shutdown mode of operation was last used to set the power converter in a shutdown mode of operation; and wherein the controller is further configured to determine a wakeup mode of operation of the plurality of wakeup modes of operation to set the power converter in a wakeup mode of operation based on the last used shutdown mode of operation.

26. The apparatus of clause 25, wherein the plurality of shutdown modes of operation comprise:

a first shutdown mode of operation wherein the power converter is configured to reduce an input current of the power converter to about zero, and a second shutdown mode of operation wherein the power converter is configured to reduce an input voltage of the power converter to about zero.

27. The apparatus of any one of clauses 25-26, wherein the plurality of wakeup modes of operation comprise:

a first wakeup mode of operation wherein the power converter is configured to increase an input current of the power converter from about zero, and a second wakeup mode of operation wherein the power converter is configured to increase an input voltage of the power converter from about zero.

28. The apparatus of clause 27, wherein the controller is configured to select the first wakeup mode of operation based on the last used shutdown mode of operation being the first shutdown mode of operation.

29. The apparatus of clause 27, wherein the controller is configured to select the second wakeup mode of operation based on the last used shutdown mode of operation being the second shutdown mode of operation.

30. The apparatus of clause 27, wherein the controller is configured to select the first wakeup mode of operation based on the last used shutdown mode of operation being the second shutdown mode of operation.

31. The apparatus of clause 27, wherein the controller is configured to select the second wakeup mode of operation based on the last used shutdown mode of operation being the first shutdown mode of operation.

32. The apparatus of any one of clauses 25-31, wherein the controller is configured to select a shutdown mode of operation of the plurality of shutdown modes of operation based on a last used conversion mode of operation of the power converter.

33. The apparatus of clause 26, wherein the controller is configured to select the first shutdown mode of operation based on a last used conversion mode of the power converter being a boost mode of conversion.

34. The apparatus of clause 26, wherein the controller is configured to select the first shutdown mode of operation based on a last used conversion mode of the power converter being a buck mode of conversion.

35. The apparatus of clause 26, wherein the controller is configured to select the second shutdown mode of operation based on a last used conversion mode of the power converter being a boost mode of conversion.

36. The apparatus of clause 26, wherein the controller is configured to select the second shutdown mode of operation based on a last used conversion mode of the power converter being a boost mode of conversion.

37. The apparatus of any one of clauses 25-36, wherein the controller is configured to select a shutdown mode of operation of the plurality of shutdown modes of operation based on a last used power reduction mode of operation of the power converter.

38. The apparatus of clause 26, wherein the controller is configured to select the first shutdown mode of operation based on a last used power reduction mode of the power converter.

39. The apparatus of clause 38, wherein the last used power reduction mode of the power converter is power reduction mode arranged to reduce power by reducing an input current or increasing an input voltage.

40. The apparatus of clause 26, wherein the controller is configured to select the second shutdown mode of operation based on a last used power reduction mode.

41. The apparatus of clause 40, wherein the last used power reduction mode of the power converter is a power reduction mode arranged to reduce power by reducing an input current or increasing an input voltage.

42. The apparatus of any one of clauses 25-41, wherein the controller is configured to select a shutdown mode of operation of the plurality of shutdown modes of operation based on a last used mode of operation of the power converter being a bypass mode of operation.

43. An apparatus comprising:

a power converter configured to operate in a power conversion mode of operation and a bypass mode of operation;

at least one first sensor configured to obtain at least one first parameter indicating a temperature of the power converter;

at least one second sensor configured to obtain at least one second parameter indicating an output current of the power converter;

a controller configured to determine when the temperature is above a temperature threshold and the output current is above a current threshold;

wherein the controller is further configured to control the power converter to operate in the bypass mode of operation when the temperature is above the temperature threshold and the output current is above the current threshold.

44. The apparatus of clause 43, wherein the power converter comprises at least one of: a buck converter, a boost converter, a buck/boost converter, or a buck+boost converter.

45. The apparatus of any one of clauses 43-44, wherein the power converter has a plurality of switches.

46. The apparatus of any one of clauses 43-45, wherein in the bypass mode of operation the plurality of switches are turned ON to connect an input of the power converter to an output of the power converter.

47. The apparatus of any one of clauses 43-46, wherein the bypass mode of operation is a non-power conversion mode, and wherein an input power of the power converter is about equal to an output power of the power converter.

48. The apparatus of any one of clauses 43-47, wherein the at least one second parameter is indicating at least one of: an output current of the power converter, a string current of a plurality of power converters, an output power of the power converter, or a string power of a plurality of power converters.

49. The apparatus of any one of clauses 43-48, wherein the power converter is also configured to have a shutdown mode of operation.

50. The apparatus of any one of clauses 43-49, wherein the controller is further configured to control the power converter to operate in the shutdown mode of operation when the output current is above a second current threshold.

51. The apparatus of any one of clauses 43-50, wherein a shutdown of the power converter is controlled according to a droop curve.

52. The apparatus of any one of clauses 43-51, wherein an output of the power converter is connected to an output of a second power converter in series.

53. The apparatus of any one of clauses 43-52, wherein an output of the power converter is connected to a system power device.

54. The apparatus of any one of clauses 43-53, wherein the system power device is an inverter.

55. The apparatus of any one of clauses 43-54, wherein the system power device is connected to an electrical grid.

56. The apparatus of any one of clauses 43-55, further comprising a communication unit arranged to communicate with the system power device.

57. The apparatus of any one of clauses 43-56, wherein a communication unit is arranged to communicate with a second communication unit of a second apparatus.

58. The apparatus of any one of clauses 43-57, wherein a communication unit is arranged to transmit a communication signal when the power converter is controlled to operate in the bypass mode of operation.

59. The apparatus of any one of clauses 43-58, wherein a communication unit is arranged to transmit a second communication signal when the power converter is controlled to shut down.

60. The apparatus of any one of clauses 43-59, wherein the power converter is further configured to operate in a wakeup mode of operation, wherein in the wakeup mode of operation an input voltage of the power converter is increased to move the input voltage of the power converter towards a voltage value.

61. The apparatus of any one of clauses 43-60, wherein the power converter is further configured to operate in a wakeup mode of operation, wherein in the wakeup mode of operation an input voltage of the power converter is decreased to move the input voltage of the power converter towards a voltage value.

62. The apparatus of clause 61, wherein the wakeup mode of operation is dependent on the output current being below the current threshold.

63. The apparatus of any one of clauses 43-62, wherein the at least one first parameter is the same as the at least one second parameter.

64. The apparatus of any one of clauses 43-63, wherein the controller is further configured to control the power converter to operate in the bypass mode of operation when a power of the power converter is less than a power threshold.

65. A method comprising:
   obtaining at least one first parameter indicating a temperature of a power converter configured to operate in a power conversion mode of operation or a bypass mode of operation;
   obtaining at least one second parameter indicating an output current of the power converter;
   determining, based on the at least one first parameter, when the temperature is above a temperature threshold;
   determining, based on the at least one second parameter when the output current is above a current threshold;
   controlling the power converter to operate in the bypass mode of operation in response to the temperature being above the temperature threshold and the output current being above the current threshold.

66. The method of clause 65, wherein the power converter comprises at least one of: a buck converter, a boost converter, a buck/boost converter, or a buck+boost converter.

67. The method of any one of clauses 65-66, wherein the power converter has a plurality of switches.

68. The method of any one of clauses 65-67, wherein controlling the power converter to operate in the bypass mode of operation further comprises turning on the plurality of switches to connect an input of the power converter to an output of the power converter.

69. The method of any one of clauses 65-68, wherein the bypass mode of operation is a non-power conversion mode, and wherein an input power of the power converter is about equal to an output power of the power converter.

70. The method of any one of clauses 65-69, wherein the at least one second parameter indicates at least one of: an output current of the power converter, a string current of a plurality of power converters, an output power of the power converter, or a string power of a plurality of power converters comprising the power converter.

71. The method of any one of clauses 65-70, wherein the power converter is also configured to have a shutdown mode of operation.

72. The method of clause 71, further comprising controlling the power converter to operate in the shutdown mode of operation when the output current is above a second current threshold.

73. The method of any one of clauses 65-72, further comprising controlling shutdown of the power converter according to a droop curve.

74. The method of any one of clauses 65-73, further comprising connecting an output of the power converter to an output of a second power converter in series 75. The method of any one of clauses 65-74, further comprising connecting an output of the power converter to a system power device.

76. The method of clause 75, wherein the system power device is an inverter.

77. The method of any one of clauses 75-76, further comprising connecting the system power device to an electrical grid.

78. The method of any one of clauses 75-77, further comprising a communication unit arranged to communicate with the system power device.

79. The method of clause 78, wherein the communication unit is arranged to communicate with a second communication unit of a second power converter.

80. The method of any one of clauses 78-79, further comprising transmitting a communication signal using the communication unit when the power converter is controlled to operate in the bypass mode of operation.

81. The method of clause 80, further comprising transmitting a second communication signal using the communication unit when the power converter is controlled to shut down.

82. The method of any one of clauses 41-57, wherein the power converter is further configured to operate in a wakeup mode of operation, and further comprising, according to the wakeup mode of operation, increasing an input voltage of the power converter to move the input voltage of the power converter towards a voltage value.

83. The method of any one of clauses 65-82, wherein the power converter is further configured to operate in a wakeup mode of operation, and further comprising, according to the wakeup mode of operation, decreasing an input voltage of the power converter to move the input voltage of the power converter towards a voltage value.

84. The method of any one of clauses 82-83, wherein the wakeup mode of operation is dependent on the output current being below the current threshold.

85. The method of any one of clauses 65-84, wherein the at least one first parameter is the same as the at least one second parameter.

86. The method of any one of clauses 65-85, further comprising controlling the power converter to operate in the bypass mode of operation when a power of the power converter is less than a power threshold.

The invention claimed is:

1. An apparatus comprising:
   a power converter configured to:
      operate in a plurality of modes of operation, the plurality of modes of operation comprises:
         a buck mode of operation, and
         a boost mode of operation;
      operate in a plurality of shutdown modes of operation; and
      operate in a plurality of wakeup modes of operation;
   a sensor configured to obtain a parameter;
   a controller configured to:
      obtain the parameter from the sensor;
      determine a present mode of operation of the power converter from the plurality of modes of operation;
      reduce a power at an input of the power converter based on the parameter and the determined present mode of operation of the power converter, wherein:
         when the determined present mode of operation is the buck mode of operation, reduce an input voltage at the input of the power converter,
         when the determined present mode of operation is the boost mode of operation, increase an input voltage at the input of the power converter;
      determine a last used shutdown mode of operation of the plurality of shutdown modes of operation, wherein the last used shutdown mode of operation was last used to set the power converter in a shutdown mode of operation;
      determine, based on the last used shutdown mode of operation, a wakeup mode of operation of the plurality of wakeup modes of operation; and
      set the power converter in the determined wakeup mode of operation.

2. The apparatus of claim 1, wherein the power at the input of the power converter is produced by a photovoltaic power source.

3. The apparatus of claim 1, wherein the controller is further configured to:
   when the parameter is less than a threshold, operate the power converter in a power tracking configuration, and
   when the parameter is greater than the threshold, operate the power converter in a power reduction configuration.

4. The apparatus of claim 3, wherein the power tracking configuration comprises operating the power converter to increase the power at the input of the power converter, and the power reduction configuration comprises operating the power converter to reduce the power at the input of the power converter.

5. The apparatus of claim 1, wherein the controller is configured to: when the determined present mode of operation is the buck mode of operation, increase an input current at the input of the power converter, when the determined present mode of operation is the boost mode of operation, reduce the input current at the input of the power converter.

6. The apparatus of claim 1, wherein the parameter is related to a temperature of the power converter.

7. The apparatus of claim 1, wherein the parameter is related to a temperature of a switch of the power converter.

8. The apparatus of claim 1, wherein the parameter is related to a temperature of an inductor of the power converter.

9. The apparatus of claim 1, wherein the power converter is further configured to change from the determined present mode of operation to a different mode of operation in response to a change of an output current at an output of the power converter.

10. The apparatus of claim 1, wherein the power converter is further configured to reduce a frequency of the power converter to reduce a temperature of the power converter.

11. The apparatus of claim 1, wherein
   the apparatus further comprises a second sensor configured to obtain a second parameter indicating an output current of the power converter;
   the power converter is further configured to operate in a power conversion mode of operation and a bypass mode of operation; and
   the controller is further configured to:
      obtain the second parameter from the second sensor;
      determine when a temperature related to the power converter is above a temperature threshold and the output current is above a current threshold; and
      when the temperature is above the temperature threshold and the output current is above the current threshold, operate the power converter in the bypass mode of operation.

12. A method comprising:
   obtaining a parameter related to a power converter, wherein the power converter is configured to operate in a plurality of modes of operation, wherein the plurality of modes of operation comprises: a buck mode of operation, and a boost mode of operation, and wherein the power converter is further configured to operate in a plurality of shutdown modes of operation and a plurality of wakeup modes of operation;
determining a present mode of operation of the power converter from the plurality of modes of operation;
reducing, based on the determined present mode of operation of the power converter and based on the parameter, a power at an input of the power converter,
wherein reducing power at the input of the power converter comprises:
reducing, when the determined present mode of operation is the buck mode of operation, an input voltage at the input of the power converter,
increasing, when the determined present mode of operation is the boost mode of operation, an input voltage at the input of the power converter,
determining a last used shutdown mode of operation of the plurality of shutdown modes of operation, wherein the last used shutdown mode of operation was last used to set the power converter in a shutdown mode of operation;
determining, based on the last used shutdown mode of operation, a wakeup mode of operation of the plurality of wakeup modes of operation; and
setting the power converter in the determined wakeup mode of operation.

13. The method of claim 12, wherein the power at the input of the power converter is produced by a photovoltaic power source.

14. The method of claim 12, further comprising:
operating, when the parameter is less than a threshold, the power converter in a power tracking configuration, and
operating, when the parameter is greater than a threshold, the power converter in a power reduction configuration.

15. The method of claim 14, wherein the power tracking configuration comprises operating the power converter to increase the power at the input of the power converter, and the power reduction configuration comprises operating the power converter to reduce the power at the input of the power converter.

16. The method of claim 12, further comprising: increasing, when the determined present mode of operation is the buck mode of operation, an input current at the input of the power converter,
reducing, when the determined present mode of operation is the boost mode of operation, the input current at the input of the power converter.

17. The method of claim 12, wherein the parameter is related to a temperature of the power converter.

18. The method of claim 12, wherein the power converter is further configured to operate in a power conversion mode of operation or a bypass mode of operation, and wherein the parameter is a first parameter related to a temperature of the power converter, the method further comprising:
obtaining a second parameter indicating an output current of the power converter;
determining, based on the first parameter, when the temperature is above a temperature threshold;
determining, based on the second parameter, when the output current is above a current threshold; and
controlling, in response to the temperature being above the temperature threshold and the output current being above the current threshold, the power converter to operate in the bypass mode of operation.

19. The method of claim 12, further comprising: changing from the determined present mode of operation to a different mode of operation in response to a change of an output current at an output of the power converter.

20. The method of claim 12, further comprising: reducing a frequency of the power converter to reduce a temperature of the power converter.

* * * * *